US010638065B2

(12) United States Patent
Mitsunaga et al.

(10) Patent No.: US 10,638,065 B2
(45) Date of Patent: *Apr. 28, 2020

(54) IMAGE PICKUP DEVICE AND METHOD ENABLING CONTROL OF SPECTRAL SENSITIVITY AND EXPOSURE TIME

(71) Applicant: Sony Corporation, Tokyo (JP)

(72) Inventors: Tomoo Mitsunaga, Kanagawa (JP); Shun Kaizu, Tokyo (JP); Teppei Kurita, Kanagawa (JP); Toru Nishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/226,567

(22) Filed: Dec. 19, 2018

(65) Prior Publication Data

US 2019/0124281 A1    Apr. 25, 2019

Related U.S. Application Data

(63) Continuation of application No. 15/885,701, filed on Jan. 31, 2018, now Pat. No. 10,200,639, which is a
(Continued)

(30) Foreign Application Priority Data

Jul. 23, 2013 (JP) ................................. 2013-152898

(51) Int. Cl.
*H04N 5/355* (2011.01)
*H04N 9/04* (2006.01)
(Continued)

(52) U.S. Cl.
CPC ....... *H04N 5/35563* (2013.01); *H04N 5/2353* (2013.01); *H04N 5/2355* (2013.01);
(Continued)

(58) Field of Classification Search
CPC ................................................. H04N 5/35563
See application file for complete search history.

(56) References Cited

U.S. PATENT DOCUMENTS 7,825,969 B2    11/2010   Tico et al.
7,847,857 B2    12/2010   Saito et al.
(Continued)

FOREIGN PATENT DOCUMENTS

CN    101854488 A    10/2010
CN    102970488 A    3/2013
(Continued)

OTHER PUBLICATIONS

Japanese Office Action dated Oct. 9, 2018 in connection with Japanese Application No. 2015-528226, and English translation thereof.
(Continued)

*Primary Examiner* — Cynthia Segura
(74) *Attorney, Agent, or Firm* — Wolf, Greenfield & Sacks, P.C.

(57) ABSTRACT

[Object] The present technique relates to an image pickup device, an image pickup method, and a program that enables pixels having 4 types of spectral sensitivities to be controlled while changing exposure times.
[Solving Means] The present technique is applicable to an image pickup device including pixels having 4 types of spectral sensitivities, that include pixels having a panchromatic spectral sensitivity and are arranged on an image pickup surface, pixels that realize a first exposure and pixels that realize a second exposure different from the first exposure being arranged on the image pickup surface with respect to the 4 types of spectral sensitivities. Further, a first line in which first pixels having the panchromatic spectral sensitivity are arranged in a two-pixel cycle in a specific direction and a second line in which the first pixels are
(Continued)

arranged while deviating by one pixel from the first line in the specific direction are arranged alternately in a direction orthogonal to the specific direction, and pixels having spectral sensitivities different from the spectral sensitivity of the first pixels are arranged in a 2- or 4-pixel cycle in the specific direction for each of the spectral sensitivities and 2-dimensionally constitute a cyclic arrangement of 4×4 pixels in which the first spectral sensitivity pixels are arranged in a checkerboard arrangement.

15 Claims, 40 Drawing Sheets

Related U.S. Application Data continuation of application No. 14/905,794, filed as application No. PCT/JP2014/068543 on Jul. 11, 2014, now Pat. No. 10,015,417.

(51) Int. Cl.
  *H04N 5/3745* (2011.01)
  *H04N 5/235* (2006.01)
  *H04N 5/378* (2011.01)

(52) U.S. Cl.
  CPC ..... *H04N 5/35518* (2013.01); *H04N 5/35554* (2013.01); *H04N 5/378* (2013.01); *H04N 5/37457* (2013.01); *H04N 9/045* (2013.01)

(56) References Cited

U.S. PATENT DOCUMENTS

| | | | |
|---|---|---|---|
| 8,059,174 | B2 | 11/2011 | Mann et al. |
| 8,150,201 | B2 | 4/2012 | Kasai et al. |
| 8,174,603 | B2 | 5/2012 | Krymski |
| 8,514,322 | B2 | 8/2013 | Bai et al. |
| 8,749,646 | B2 | 6/2014 | Mitsunaga |
| 8,797,433 | B2 | 8/2014 | Kaizu et al. |
| 8,798,395 | B2 | 8/2014 | Jo |
| 8,803,985 | B2 | 8/2014 | Kaizu et al. |
| 8,848,063 | B2 | 9/2014 | Jo et al. |
| 9,036,060 | B2 | 5/2015 | Kaizu et al. |
| 9,060,134 | B2 | 6/2015 | Mitsunaga |
| 9,124,809 | B2 | 9/2015 | Kaizu et al. |
| 9,325,918 | B2 | 4/2016 | Mitsunaga |
| 9,344,637 | B2 | 5/2016 | Kasai et al. |
| 9,357,137 | B2 | 5/2016 | Mitsunaga |
| 9,628,725 | B2 | 4/2017 | Roh et al. |
| 9,699,429 | B2 * | 7/2017 | Kaizu .................. H04N 9/07 |
| 9,883,150 | B2 | 1/2018 | Hirota |
| 10,015,417 | B2 | 7/2018 | Mitsunaga et al. |
| 10,110,827 | B2 | 10/2018 | Mitsunaga |
| 10,200,639 | B2 | 2/2019 | Mitsunaga et al. |
| 2006/0017829 | A1 | 1/2006 | Gallagher |
| 2007/0285526 | A1* | 12/2007 | Mann ................ H04N 5/23245 |
| | | | 348/222.1 |
| 2008/0219585 | A1 | 9/2008 | Kasai et al. |
| 2009/0109306 | A1* | 4/2009 | Shan .................. H04N 5/235 |
| | | | 348/273 |
| 2009/0122170 | A1 | 5/2009 | Miyashita et al. |
| 2009/0135263 | A1* | 5/2009 | Sorek ................ H04N 5/35554 |
| | | | 348/218.1 |
| 2009/0185041 | A1 | 7/2009 | Kang et al. |
| 2009/0290052 | A1* | 11/2009 | Liu .................. H04N 5/35554 |
| | | | 348/277 |
| 2010/0053346 | A1 | 3/2010 | Mitsunaga |
| 2011/0122301 | A1 | 5/2011 | Yamura et al. |
| 2011/0285881 | A1 | 11/2011 | Izuha et al. |
| 2011/0310278 | A1* | 12/2011 | Bai .................. H04N 5/35554 |
| | | | 348/294 |
| 2012/0026370 | A1* | 2/2012 | Oike .................. H04N 5/2176 |
| | | | 348/298 |
| 2012/0218426 | A1 | 8/2012 | Kaizu et al. |
| 2012/0281111 | A1* | 11/2012 | Jo .................. H04N 5/217 |
| | | | 348/229.1 |
| 2012/0287294 | A1* | 11/2012 | Kaizu .................. H04N 5/2355 |
| | | | 348/208.4 |
| 2012/0314124 | A1 | 12/2012 | Kaizu et al. |
| 2013/0033616 | A1 | 2/2013 | Kaizu et al. |
| 2013/0050520 | A1 | 2/2013 | Takeuchi |
| 2013/0051700 | A1* | 2/2013 | Jo .................. H04N 5/23254 |
| | | | 382/284 |
| 2013/0076933 | A1 | 3/2013 | Ahn et al. |
| 2013/0113971 | A1* | 5/2013 | Okada .................. H04N 5/3742 |
| | | | 348/308 |
| 2013/0182154 | A1* | 7/2013 | Kimura ................ H04N 5/2353 |
| | | | 348/272 |
| 2013/0193311 | A1 | 8/2013 | Yoshida |
| 2013/0308021 | A1 | 11/2013 | Bai et al. |
| 2013/0308044 | A1 | 11/2013 | Mitsunaga |
| 2013/0329128 | A1 | 12/2013 | Kaizu et al. |
| 2014/0027613 | A1* | 1/2014 | Smith .................. H04N 5/2352 |
| | | | 250/208.1 |
| 2014/0192250 | A1* | 7/2014 | Mitsunaga ........... H04N 5/3535 |
| | | | 348/349 |
| 2014/0253766 | A1 | 9/2014 | Kiyota |
| 2014/0267828 | A1 | 9/2014 | Kasai et al. |
| 2014/0313400 | A1 | 10/2014 | Kaizu et al. |
| 2014/0340550 | A1 | 11/2014 | Kaizu et al. |
| 2014/0368697 | A1 | 12/2014 | Jo et al. |
| 2015/0015754 | A1* | 1/2015 | Fujita .................. H04N 5/367 |
| | | | 348/302 |
| 2015/0029358 | A1* | 1/2015 | Kaizu .................. H04N 9/07 |
| | | | 348/223.1 |
| 2015/0042848 | A1* | 2/2015 | Furukawa ........... H04N 5/2355 |
| | | | 348/242 |
| 2015/0146067 | A1 | 5/2015 | Roh et al. |
| 2015/0244916 | A1 | 8/2015 | Kang et al. |
| 2015/0244923 | A1* | 8/2015 | Lee .................. H04N 9/045 |
| | | | 348/234 |
| 2015/0296157 | A1* | 10/2015 | Shin .................. H04N 5/35554 |
| | | | 348/272 |
| 2016/0173793 | A1 | 6/2016 | Mitsunaga et al. |
| 2016/0205359 | A1 | 7/2016 | Hirota |
| 2016/0248956 | A1 | 8/2016 | Mitsunaga |
| 2017/0034460 | A9 | 2/2017 | Mitsunaga et al. |
| 2017/0251188 | A1 | 8/2017 | Kaizu |
| 2017/0256067 | A1* | 9/2017 | Yamada ................ G06T 7/285 |
| 2017/0339353 | A1* | 11/2017 | Banachowicz ........ H04N 5/369 |
| 2018/0084187 | A1 | 3/2018 | Park et al. |
| 2018/0160060 | A1 | 6/2018 | Mitsunaga et al. |
| 2018/0343404 | A1* | 11/2018 | Hwang ................ H04N 5/3559 |

FOREIGN PATENT DOCUMENTS

| | | |
|---|---|---|
| CN | 103053164 A | 4/2013 |
| CN | 103209308 A | 7/2013 |
| EP | 2 523 452 A1 | 11/2012 |
| EP | 2 565 843 A2 | 3/2013 |
| JP | 2007-135200 A | 5/2007 |
| JP | 2007-243334 A | 9/2007 |
| JP | 2012-257193 A | 12/2012 |
| JP | 2013-066142 A | 4/2013 |
| JP | 2013-143729 A | 7/2013 |

OTHER PUBLICATIONS

Chinese Office Action dated Mar. 5, 2018 in connection with Chinese Application No. 201480040407.5 and English translation thereof.

European Office Action dated Apr. 9, 2018 in connection with European Application No. 14830150.0.

* cited by examiner

FIG.1

| 0 | 0 | 0 | 0 | 0 | 0 | 0 | 0 | 0 |
|---|---|---|---|---|---|---|---|---|
| 0 | 1 | 0 | −9 | −16 | −9 | 0 | 1 | 0 |
| 0 | 0 | 0 | 0 | 0 | 0 | 0 | 0 | 0 |
| 0 | −9 | 0 | 81 | 144 | 81 | 0 | −9 | 0 |
| 0 | −16 | 0 | 144 | 256 | 144 | 0 | −16 | 0 |
| 0 | −9 | 0 | 81 | 144 | 81 | 0 | −9 | 0 |
| 0 | 0 | 0 | 0 | 0 | 0 | 0 | 0 | 0 |
| 0 | 1 | 0 | −9 | −16 | −9 | 0 | 1 | 0 |
| 0 | 0 | 0 | 0 | 0 | 0 | 0 | 0 | 0 |

FIG.23

| 1 | 2 | 2 | 2 | 2 | 2 | 2 | 2 | 1 |
|---|---|---|---|---|---|---|---|---|
| 2 | 4 | 4 | 4 | 4 | 4 | 4 | 4 | 2 |
| 2 | 4 | 4 | 4 | 4 | 4 | 4 | 4 | 2 |
| 2 | 4 | 4 | 4 | 4 | 4 | 4 | 4 | 2 |
| 2 | 4 | 4 | 4 | 4 | 4 | 4 | 4 | 2 |
| 2 | 4 | 4 | 4 | 4 | 4 | 4 | 4 | 2 |
| 2 | 4 | 4 | 4 | 4 | 4 | 4 | 4 | 2 |
| 2 | 4 | 4 | 4 | 4 | 4 | 4 | 4 | 2 |
| 1 | 2 | 2 | 2 | 2 | 2 | 2 | 2 | 1 |

FIG.24

|   | 600(1,2) | 600(1,3) | 600(1,4) | 600(1,5) | 600(1,6) | 600(1,7) | 600(1,8) |
|---|---|---|---|---|---|---|---|
| 600(1,1) | W | G | W | R | W | G | W | R |
| 600(2,1) | G | W | R | W | G | W | R | W |
| 600(3,1) | W | B | W | G | W | B | W | G |
| 600(4,1) | B | W | G | W | B | W | G | W |
| 600(5,1) | W | G | W | R | W | G | W | R |
| 600(6,1) | G | W | R | W | G | W | R | W |
| 600(7,1) | W | B | W | G | W | B | W | G |
| 600(8,1) | B | W | G | W | B | W | G | W |

|  | 610(1,2) | 610(1,3) | 610(1,4) | 610(1,5) | 610(1,6) | 610(1,7) | 610(1,8) |
|---|---|---|---|---|---|---|---|
| 610(1,1) | W | R | W | G | W | R | W | G |
| 610(2,1) | B | W | G | W | B | W | G | W |
| 610(3,1) | W | G | W | R | W | G | W | R |
| 610(4,1) | G | W | B | W | G | W | B | W |
| 610(5,1) | W | R | W | G | W | R | W | G |
| 610(6,1) | B | W | G | W | B | W | G | W |
| 610(7,1) | W | G | W | R | W | G | W | R |
| 610(8,1) | G | W | B | W | G | W | B | W |

IMAGE PICKUP DEVICE AND METHOD ENABLING CONTROL OF SPECTRAL SENSITIVITY AND EXPOSURE TIME

CROSS REFERENCE TO RELATED APPLICATIONS

This application is a continuation of U.S. patent application Ser. No. 15/885,701, filed on Jan. 31, 2018, now U.S. Pat. No. 10,200,639, which is a continuation of U.S. patent application Ser. No. 14/905,794, filed on Jan. 16, 2016, now U.S. Pat. No. 10,015,417, which claims the benefit under 35 U.S.C. § 371 as a U.S. National Stage Entry of International Application No. PCT/JP2014/068543, filed in the Japanese Patent Office as a Receiving Office on Jul. 11, 2014, which claims priority to Japanese Patent Application No. JP2013-152898, filed in the Japanese Patent Office on Jul. 23, 2013, each of which is hereby incorporated by reference in its entirety.

TECHNICAL FIELD

The present technique relates to an image pickup device, an image pickup method, and a program, more specifically, to an image pickup device, an image pickup method, and a program that are favorable for enlarging a dynamic range by reading out a plurality of pixels at a plurality of exposure timings.

BACKGROUND ART

In recent years, electronic apparatuses such as an image pickup apparatus, that each photograph a subject such as a person to generate an image (image data) and record the generated image (image data) as an image content (image file) have prevailed, the image pickup apparatus being exemplified by a digital still camera. As an image pickup device used in such electronic apparatuses, a CCD (Charge Coupled Sensor) sensor, a CMOS (Complementary Metal Oxide Semiconductor) sensor, and the like are widely used.

There is a dynamic range as one of performance axes of image sensors. The dynamic range is a width of brightness of incident light that can be converted into an effective image signal. The larger the dynamic range, the higher the performance is since dark light to bright light can be converted into image signals.

For example, Patent Document 1 proposes a system called SVE (Spatially Varying Exposure) for enlarging a dynamic range of an image sensor.

Pixels of normal image sensors include a photodiode (PD) that converts incident light into charges by a photoelectric conversion. Since an accumulable charge amount of the pixels is determined, a charge overflow occurs with respect to incident light that is too strong, and signals cannot be taken out no more. Further, due to noises generated in pixels and a circuit for reading, generated charges are buried in the noises so that signals cannot be taken out with respect to incident light that is too weak.

In this regard, the SVE system is a system in which pixels having different sensitivities are arranged in a predetermined arrangement pattern so that signals can be acquired from pixels having a high sensitivity in a dark part of a scene and pixels having a low sensitivity in a bright part of the scene. As a method of changing the sensitivity for each pixel, there is a method that uses an electronic shutter control mechanism of an image sensor in addition to a method of changing a pixel aperture ratio and a method that uses on-chip filters having different optical transmittances. Patent Document 1 proposes a method that uses an electronic shutter control mechanism in a CCD image sensor.

Patent Document 2 proposes an image sensor in which 4 types of pixels including pixels having a spectral sensitivity for acquiring luminance signals and pixels having 3 types of spectral sensitivities for acquiring color signals are arranged. As an example of such a color arrangement, Patent Document 2 discloses an arrangement in which pixels for acquiring luminance signals are arranged in a checkerboard arrangement and pixels having R, G, and B spectral sensitivities for acquiring color signals are arranged at remaining positions in the checkerboard arrangement.

Patent Document 3 discloses an example of an exposure pattern in a case where an image is taken using the SVE system in the pixel arrangement disclosed in Patent Document 2.

Patent Document 1: Japanese Patent Application Laid-open No. 2007-135200
Patent Document 2: Japanese Patent Application Laid-open No. 2007-243334
Patent Document 3: Japanese Patent Application Laid-open No. 2012-257193

SUMMARY OF INVENTION

Problems to be Solved by the Invention

Patent Document 1 describes a pixel control method for taking an image using the SVE system in the image sensor having a color arrangement of 3 colors of RGB (red, green, and blue). Patent Document 2 describes a technique of combining 1 pixel for acquiring a luminance signal and 3 pixels for acquiring color signals. Patent Document 3 describes an exposure pattern in the case where an image is taken using the SVE system in the pixel arrangement disclosed in Patent Document 2.

However, in the image sensor that uses the combination of 1 pixel for acquiring a luminance signal and 3 pixels for acquiring color signals, there is no description on the pixel control method or structure for realizing the image pickup using the SVE system. Even when using 4 pixels, pixel control for realizing the image pickup using the SVE system is desired. By enabling an image to be taken by the SVE system using 4 pixels, it is expected that the dynamic range will be enlarged, and performance will be additionally improved.

The present technique has been made in view of the circumstances as described above and therefore aims at enlarging a dynamic range and additionally improving performance.

Means for Solving the Problems

According to an aspect of the present technique, there is provided an image pickup device including pixels having 4 types of spectral sensitivities, that include pixels having a panchromatic spectral sensitivity and are arranged on an image pickup surface, pixels that realize a first exposure and pixels that realize a second exposure different from the first exposure being arranged on the image pickup surface with respect to the 4 types of spectral sensitivities.

A first line in which first pixels having the panchromatic spectral sensitivity are arranged in a two-pixel cycle in a specific direction and a second line in which the first pixels are arranged while deviating by one pixel from the first line in the specific direction may be arranged alternately in a direction orthogonal to the specific direction, and pixels having spectral sensitivities different from the spectral sensitivity of the first pixels may be arranged in a 2- or 4-pixel cycle in the specific direction for each of the spectral sensitivities and 2-dimensionally constitute a cyclic arrangement of 4×4 pixels in which the first spectral sensitivity pixels are arranged in a checkerboard arrangement.

The image pickup device may further include three pixel transfer control signal lines per line, each pixel transfer control signal line being used for controlling an exposure start timing and end timing of a plurality of pixels constituting the 1 line in the specific direction, a first pixel transfer control signal line out of the pixel transfer control signal lines in the first line may transmit a transfer control signal to the pixels that are arranged in the 2-pixel cycle in the first line and have the same spectral sensitivity, a second pixel transfer control signal line out of the pixel transfer control signal lines in the first line may transmit a transfer control signal to the pixels that are arranged in the 4-pixel cycle in the first line and have the same spectral sensitivity, a third pixel transfer control signal line out of the pixel transfer control signal lines in the first line may transmit a transfer control signal to the pixels that are arranged in the 4-pixel cycle in the first line and have the same spectral sensitivity, the first pixel transfer control signal line out of the pixel transfer control signal lines in the second line may transmit a transfer control signal to the pixels that are arranged in the 2-pixel cycle in the second line and have the same spectral sensitivity, the second pixel transfer control signal line out of the pixel transfer control signal lines in the second line may transmit a transfer control signal to the pixels that are arranged in the 4-pixel cycle in the second line and have the same spectral sensitivity, the third pixel transfer control signal line out of the pixel transfer control signal lines in the second line may transmit a transfer control signal to the pixels that are arranged in the 4-pixel cycle in the second line and have the same spectral sensitivity, and each of the pixel transfer control signal lines may transmit a pixel transfer control signal at a first timing to realize the first exposure or a second timing to realize the second exposure.

One A/D converter may be shared by two adjacent pixels in the specific direction, and exposure timings of the two adjacent pixels may be shifted using at least two of the pixel transfer control signal lines.

One floating diffusion may be shared by a pixel group constituted of a plurality of pixels.

The cyclic arrangement of 4×4 pixels may include the first line in which the first pixels and second pixels having a second spectral sensitivity are arranged alternately in the specific direction and the second line in which the first pixels are arranged in the 2-pixel cycle and third pixels having a third spectral sensitivity and fourth pixels having a fourth spectral sensitivity are arranged in the 4-pixel cycle at remaining pixel positions in the specific direction, the first line and the second line being arranged alternately in a direction orthogonal to the specific direction.

The first pixel transfer control signal line of the first line and the first pixel transfer control signal line of the second line may be controlled to transmit control signals at different timings, the second pixel transfer control signal line and the third pixel transfer control signal line of the first line may be controlled to transmit control signals at different timings, the second pixel transfer control signal line of the second line and the pixel transfer control signal line with respect to the third pixels in a fourth line may be controlled to transmit control signals at different timings, and the pixel transfer control signal line with respect to the fourth pixels in the second line and the pixel transfer control signal line with respect to the fourth pixels in the fourth line may be controlled to transmit control signals at different timings.

The image pickup device may further include, at each pixel position: a first processing section that calculates an interpolation value of signals for the first exposure of the first spectral sensitivity at the pixel position; a second processing section that calculates an interpolation value of signals for the second exposure of the first spectral sensitivity at the pixel position; a third processing section that calculates an interpolation value of signals for the first exposure of the second spectral sensitivity at the pixel position; a fourth processing section that calculates an interpolation value of signals for the second exposure of the second spectral sensitivity at the pixel position; a fifth processing section that calculates an interpolation value of signals for the first exposure of a third spectral sensitivity at the pixel position; a sixth processing section that calculates an interpolation value of signals for the second exposure of the third spectral sensitivity at the pixel position; a seventh processing section that calculates an interpolation value of signals for the first exposure of a fourth spectral sensitivity at the pixel position; and an eighth processing section that calculates an interpolation value of signals for the second exposure of the fourth spectral sensitivity at the pixel position.

The image pickup device may further include a ninth processing section that calculates, from the interpolation values of the signals for the first exposure or the second exposure of the first to fourth spectral sensitivities at the pixel position, that have been calculated by the first to eighth processing sections, a combined interpolation value of the second spectral sensitivity, the third spectral sensitivity, and the fourth spectral sensitivity.

The image pickup device may further include a conversion section that converts the interpolation value output from the ninth processing section into a Bayer arrangement.

The ninth processing section may include processing of converting signals read out from the pixels into a nonlinear gradation.

The processing of converting signals into a nonlinear gradation may include processing of converting signals based on upwardly-convex power function characteristics.

The processing of converting signals into a nonlinear gradation may include processing of converting signals based on logarithm gradation characteristics.

The image pickup device may further include: a logarithm conversion processing section that logarithmically converts signals from the pixels arranged on the image pickup surface; and a logarithm reverse conversion processing section that logarithmically reverse-converts the interpolation value output from the ninth processing section, and the first to eighth processing sections may carry out the processing using values obtained by the conversion of the logarithm conversion processing section.

The image pickup device may further include: a logarithm conversion processing section that logarithmically converts signals from the pixels arranged on the image pickup surface; and a logarithm reverse conversion processing section that logarithmically reverse-converts the interpolation value output from the conversion section, and the first to eighth processing sections may carry out the processing using values obtained by the conversion of the logarithm conversion processing section.

According to the aspect of the present technique, there is provided an image pickup method for an image pickup device including pixels having 4 types of spectral sensitivities, that include pixels having a panchromatic spectral sensitivity and are arranged on an image pickup surface, pixels that realize a first exposure and pixels that realize a second exposure different from the first exposure being arranged on the image pickup surface with respect to the 4 types of spectral sensitivities, a first line in which first pixels having the panchromatic spectral sensitivity are arranged in a two-pixel cycle in a specific direction and a second line in which the first pixels are arranged while deviating by one pixel from the first line in the specific direction being arranged alternately in a direction orthogonal to the specific direction, and pixels having spectral sensitivities different from the spectral sensitivity of the first pixels being arranged in a 2- or 4-pixel cycle in the specific direction for each of the spectral sensitivities and 2-dimensionally constituting a cyclic arrangement of 4×4 pixels in which the first spectral sensitivity pixels are arranged in a checkerboard arrangement, the method including the step of transmitting, to three pixel transfer control signal lines provided per line, each pixel transfer control signal line being used for controlling an exposure start timing and end timing of a plurality of pixels constituting the 1 line in the specific direction, a pixel transfer control signal at a first timing to realize the first exposure or a second timing to realize the second exposure.

According to the aspect of the present technique, there is provided a program that causes a computer to control an image pickup device including pixels having 4 types of spectral sensitivities, that include pixels having a panchromatic spectral sensitivity and are arranged on an image pickup surface, pixels that realize a first exposure and pixels that realize a second exposure different from the first exposure being arranged on the image pickup surface with respect to the 4 types of spectral sensitivities, a first line in which first pixels having the panchromatic spectral sensitivity are arranged in a two-pixel cycle in a specific direction and a second line in which the first pixels are arranged while deviating by one pixel from the first line in the specific direction being arranged alternately in a direction orthogonal to the specific direction, and pixels having spectral sensitivities different from the spectral sensitivity of the first pixels being arranged in a 2- or 4-pixel cycle in the specific direction for each of the spectral sensitivities and 2-dimensionally constituting a cyclic arrangement of 4×4 pixels in which the first spectral sensitivity pixels are arranged in a checkerboard arrangement, the program including processing including the step of transmitting, to three pixel transfer control signal lines provided per line, each pixel transfer control signal line being used for controlling an exposure start timing and end timing of a plurality of pixels constituting the 1 line in the specific direction, a pixel transfer control signal at a first timing to realize the first exposure or a second timing to realize the second exposure.

In the image pickup device, the image pickup method, and the program according to the aspect of the present technique, pixels having 4 types of spectral sensitivities, that include pixels having a panchromatic spectral sensitivity, are arranged on an image pickup surface, and pixels that realize a first exposure and pixels that realize a second exposure different from the first exposure are arranged on the image pickup surface with respect to the 4 types of spectral sensitivities, to realize the first exposure and the second exposure.

Effect of the Invention

According to the aspect of the present technique, the dynamic range can be enlarged, and the performance can be additionally improved.

BRIEF DESCRIPTION OF DRAWINGS

FIG. 1 A diagram showing an example of an arrangement of color filters mounted on a light reception section of an image pickup device.

FIG. 23 A diagram showing an example of interpolation filter coefficients used by a WL high-frequency interpolation section and a WS high-frequency interpolation section according to the fifth embodiment.

FIG. 24 A diagram showing an example of interpolation filter coefficients used by a WL low-frequency interpolation section, a WS low-frequency interpolation section, a GL low-frequency interpolation section, a GS low-frequency interpolation section, an RL low-frequency interpolation section, an RS low-frequency interpolation section, a BL low-frequency interpolation section, and a BS low-frequency interpolation section according to the fifth embodiment.

FIG. 31 A diagram showing another example of an arrangement of color filters mounted to a light reception section of an applicable image pickup device.

FIG. 32 A diagram showing another example of an arrangement of color filters mounted to a light reception section of an applicable image pickup device.

FIG. 33 A diagram showing an example of an exposure control pattern of an applicable image pickup device.

FIG. 35 A diagram showing an example of an exposure control pattern of an applicable image pickup device.

FIG. 36 A diagram showing an example of an exposure control pattern of an applicable image pickup device.

FIG. 37 A diagram showing an example of an exposure control pattern of an applicable image pickup device.

FIG. 38 A diagram showing an example of an exposure control pattern of an applicable image pickup device.

FIG. 39 A diagram showing an example of an exposure control pattern of an applicable image pickup device.

MODES FOR CARRYING OUT THE INVENTION

Figure 2:
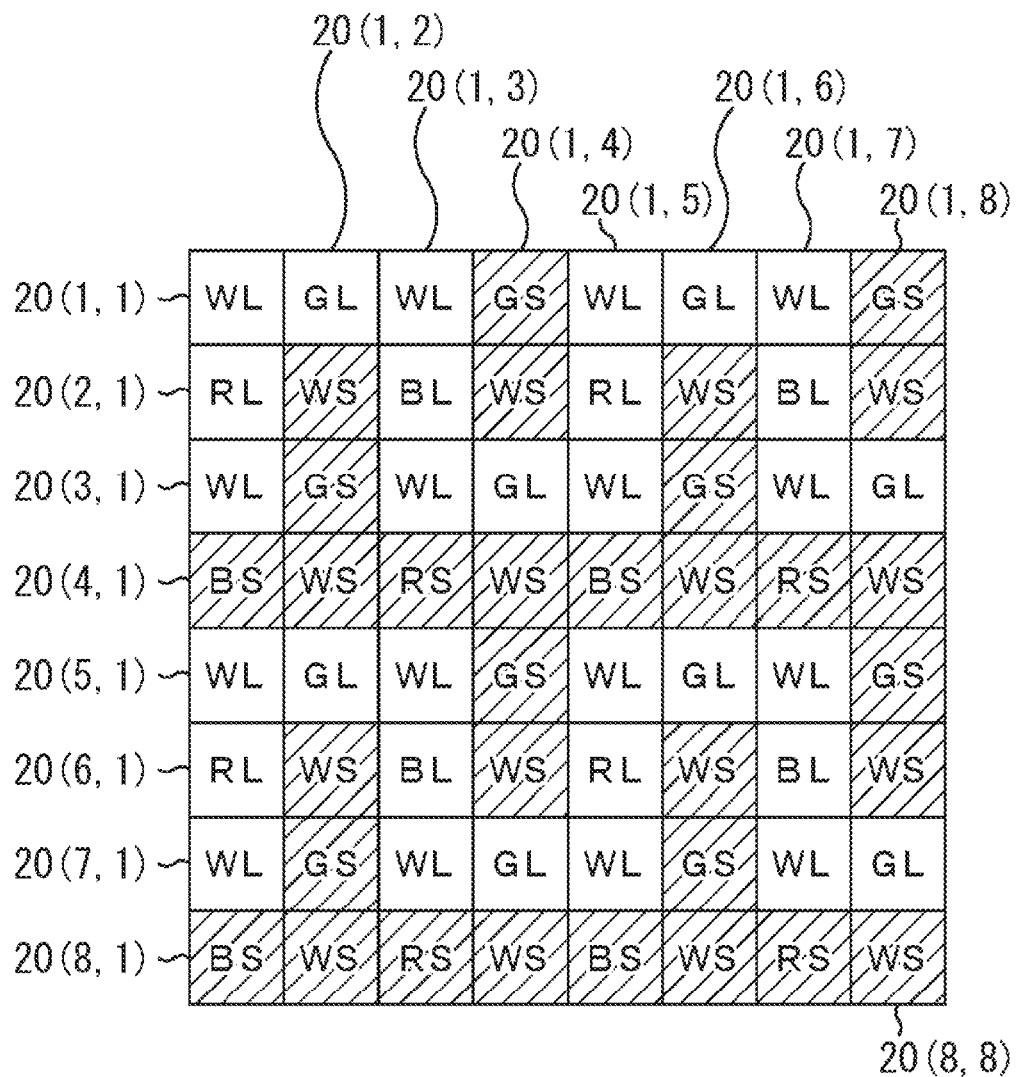
FIG. 2 A diagram showing a pixel arrangement regarding the color filters mounted to the light reception section of the image pickup device and exposure times according to an embodiment to which the present technique is applied.

Hereinafter, structures for embodying the present technique (hereinafter, referred to as embodiments) will be described. It should be noted that the descriptions will be given in the following order.

1. First embodiment (example where 3 pixel transfer control signal lines are provided on 1 line in horizontal direction)
2. Second embodiment (example of image pickup device in which 2 pixels in horizontal direction share single A/D converter)
3. Third embodiment (example of image pickup device in which 4 pixels in vertical direction share single FD)
4. Fourth embodiment (example of image pickup device in which 8 pixels share FD)
5. Fifth embodiment (example of image pickup apparatus)
6. Other application examples The present technique is applicable to an image pickup device. There are a CCD (Charge Coupled Device) sensor, a CMOS (Complementary Metal Oxide Semiconductor) sensor, and the like as the image pickup device. The present technique is also applicable to an image sensor in which 4 pixels that output color light of R (red), G (green), B (blue), and W (white) are arranged.

Figure 1:
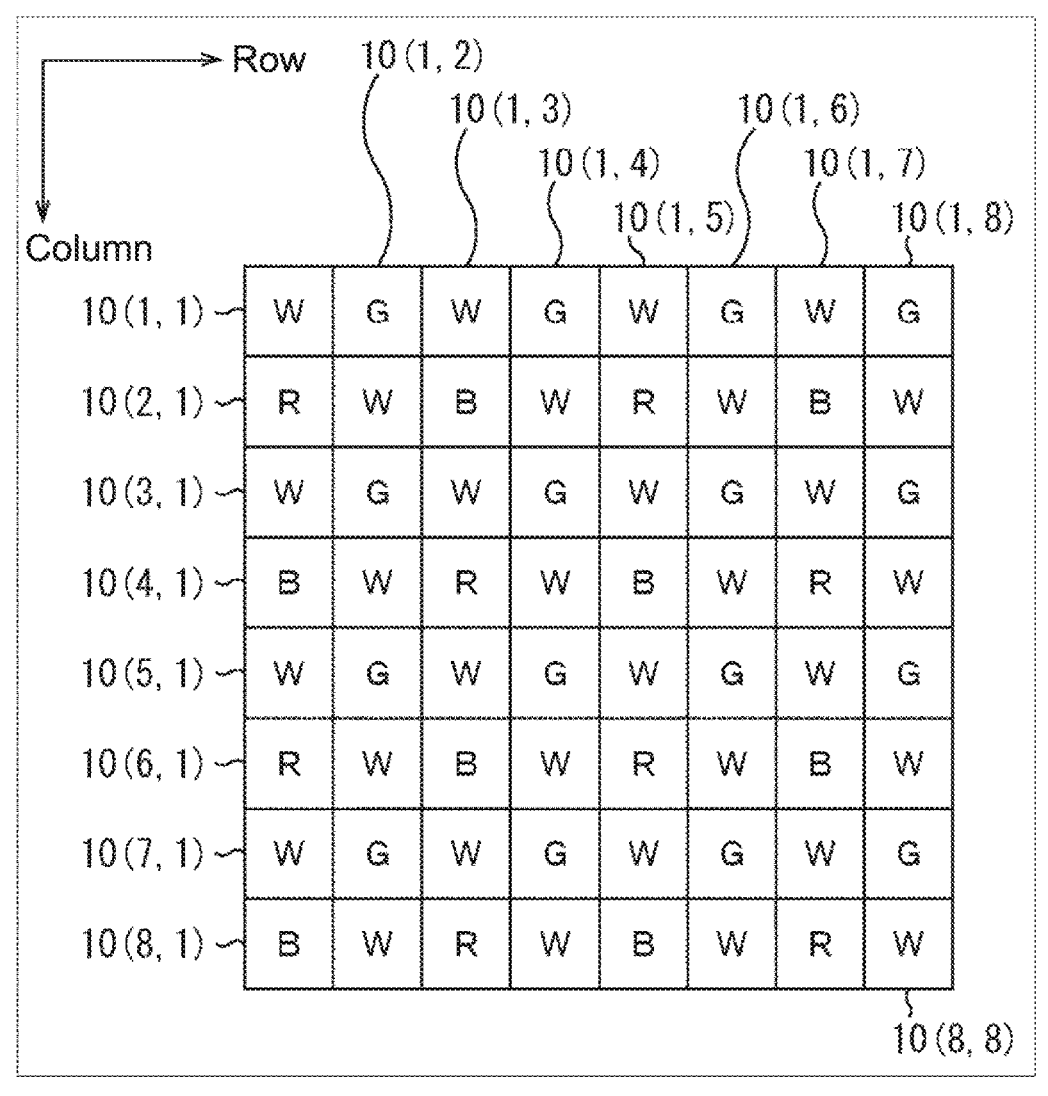

The 4 pixels that output color light of R (red), G (green), B (blue), and W (white) are arranged in a matrix in a display area as shown in FIG. 1, for example. In FIG. 1, rectangles each schematically represent a pixel. Further, inside the rectangles, symbols each indicating the type of color filters (color light output by each pixel) are shown. For example, "G" is assigned to a G pixel, "R" is assigned to an R pixel, "B" is assigned to a B pixel, and "W" is assigned to a W pixel. The same holds true for the descriptions below.

The W pixels function as pixels having a panchromatic spectral sensitivity, and the R, G, and B pixels function as pixels having spectral sensitivities of respective color characteristics. The present technique is applicable to an image pickup device (image sensor) in which pixels having 4 types of spectral sensitivities including the panchromatic spectral sensitivity are arranged on an image pickup surface as described above.

The image sensor shown in FIG. 1 shows an arrangement in which the R pixels, G pixels, B pixels, and W pixels are arranged in first to eighth rows and first to eighth columns. FIG. 1 shows a part of the image sensor, and structures of the R pixels, G pixels, B pixels, and W pixels arranged in other rows and columns, excluding the R pixels, G pixels, B pixels, and W pixels arranged in the first to eighth rows and first to eighth columns, are also the same.

When the description is made as pixel 10 (m, n) in the descriptions below, for example, m represents the row and n represents the column. In addition, the row indicates a horizontal direction in which horizontal signal lines (not shown) are arranged, and the column indicates a vertical direction in which vertical signal lines (not shown) are arranged. For example, a pixel 10 (2, 1) represents a pixel positioned at a first column in a second row. In addition, positions of the pixels are expressed using the upper left pixel 10 (1, 1) as a reference. The same holds true for other figures.

The structure of the image sensor in the horizontal direction (lateral direction or row direction in FIG. 1) will be described. In the first row, the W pixel 10 (1, 1), the G pixel 10 (1, 2), the W pixel 10 (1, 3), the G pixel 10 (1, 4), the W pixel 10 (1, 5), the G pixel 10 (1, 6), the W pixel 10 (1, 7), and the G pixel 10 (1, 8) are arranged. In this case, the W pixels and the G pixels are arranged in the first row.

In the second row, the R pixel 10 (2, 1), the W pixel 10 (2, 2), the R pixel 10 (2, 3), the W pixel 10 (2, 4), the R pixel 10 (2, 5), the W pixel 10 (2, 6), the B pixel 10 (2, 7), and the W pixel 10 (2, 8) are arranged. In this case, the R pixels, the W pixels, and the B pixels are arranged in the second row.

In the third row, the W pixels and the G pixels are alternately arranged as in the first row.

In the fourth row, the R pixels, the W pixels, and the B pixels are arranged as in the second row, but the first pixel is not the R pixel and is the B pixel. Specifically, in the fourth row, the B pixel 10 (4, 1), the W pixel 10 (4, 2), the R pixel 10 (4, 3), the W pixel 10 (4, 4), the B pixel 10 (4, 5), the W pixel 10 (4, 6), the R pixel 10 (4, 7), and the W pixel 10 (4, 8) are arranged.

In the fifth and seventh rows, the W pixels and the G pixels are arranged alternately as in the first row. In the sixth row, the R pixels, the W pixels, and the B pixels are arranged as in the second row. In the eighth row, the B pixels, the W pixels, and the R pixels are arranged as in the fourth row.

When the row direction is set as a specific direction in the color arrangement shown in FIG. 1 and focusing on the W pixels having the panchromatic spectral sensitivity in the specific direction, there are a first line in which the W pixels are arranged in a 2-pixel cycle and a second line in which the W pixels are arranged while deviating by 1 pixel from the first line in the specific direction. In addition, the first line and the second line are arranged alternately in a direction orthogonal to the specific direction (column direction).

Further, the R pixels, the G pixels, and the B pixels having spectral sensitivities different from that of the W pixels are arranged in a 2- or 4-pixel cycle in the specific direction for each of the spectral sensitivities. For example, the G pixels are arranged in the 2-pixel cycle in the first line, and the R pixels and the B pixels are arranged in the 4-pixel cycle in the second line.

As described above, the color arrangement is made such that the cyclic arrangement of 4×4 pixels, in which the W pixels are in a checkerboard arrangement, is obtained.

When applying an SVE (Spatially Varying Exposure) system to the image sensor in which pixels, that include the color filters (CFs) of 4 colors of RGBW, receive light that has transmitted through the color filters, and output color light, are arranged as described above, pixels having different sensitivities are arranged to result in the pixel arrangement as shown in FIG. 2.

First Embodiment

<Pixel Arrangement Example Regarding Color Filters and Exposure Times>

FIG. 2 is a diagram showing an example of the pixel arrangement regarding the color filters mounted to a light reception section of the image pickup device according to a first embodiment of the present technique. The pixel arrangement shown in FIG. 2 is basically the same as that shown in FIG. 1 except that pixels having different sensitivities are arranged.

In FIG. 2, the rectangles that are not hatched inside represent long exposure pixels, and rectangles that are hatched inside represent short exposure pixels. Moreover, indicated inside each rectangle are a symbol indicating the type of color filter and a symbol indicating either a long exposure or a short exposure.

For example, "GL" is assigned to the long exposure pixels out of the G pixels to be described as GL pixels, and "GS" is assigned to the short exposure pixels to be described as GS pixels. Similarly, "RL" is assigned to the long exposure pixels out of the R pixels to be described as RL pixels, and "RS" is assigned to the short exposure pixels to be described as RS pixels.

Further, "BL" is assigned to the long exposure pixels out of the B pixels to be described as BL pixels, and "BS" is assigned to the short exposure pixels to be described as BS pixels. Furthermore, "WL" is assigned to the long exposure pixels out of the W pixels to be described as WL pixels, and "WS" is assigned to the short exposure pixels to be described as WS pixels.

The long exposure pixels are pixels read out by consecutively exposing them (long exposure) within a certain exposure period, and the short exposure pixels are pixels from which only signals obtained by an exposure shorter than a predetermined exposure time are obtained within a certain exposure period.

It should be noted that although this embodiment exemplifies the case where the pixels that realize the two types of exposures, that is, the long exposure and the short exposure, are arranged on the image pickup surface, it does not mean that the present technique is applicable only to the case of realizing the two types of exposures. The present technique is also applicable to the case of realizing two or more types of exposures.

The present technique is not limited to the two types of exposures, that is, the long exposure and the short exposure, and is also applicable to different types of exposures such as a first exposure and a second exposure that have different exposure times even when the first exposure and the second exposure are both temporally categorized as the long exposure.

As shown in FIG. 2, the color arrangement of the color filters according to the first embodiment of the present technique is the same as the 4-color arrangement shown in FIG. 1. In the present technique, with respect to the color arrangement, pixels controlled by the two types of exposure times, that is, the long exposure and the short exposure, are formed for each color.

The structure of the image sensor in the horizontal direction (lateral direction or row direction in FIG. 2) will be described. In the first row, the WL pixel 20 (1, 1), the GL pixel 20 (1, 2), the WL pixel 20 (1, 3), the GS pixel 20 (1, 4), the WL pixel 20 (1, 5), the GL pixel 20 (1, 6), the WL pixel 20 (1, 7), and the GS pixel 20 (1, 8) are arranged. In this case, the WL pixels as the long exposure pixels, the GL pixels as the long exposure pixels, and the GS pixels as the short exposure pixels are arranged in the first row.

In the second row, the RL pixel 20 (2, 1), the WS pixel 20 (2, 2), the BL pixel 20 (2, 3), the WS pixel 20 (2, 4), the RL pixel 20 (2, 5), the WS pixel 20 (2, 6), the BL pixel 20 (2, 7), and the WS pixel 20 (2, 8) are arranged. In this case, the WS pixels as the short exposure pixels, the RL pixels as the long exposure pixels, and the BL pixels as the long exposure pixels are arranged in the second row.

In the third row, the W pixels and the G pixels are alternately arranged as in the first row, but the third row differs in that the pixels that have been the GL pixels as the long exposure pixels in the first row are the GS pixels as the short exposure pixels, and the pixels that have been the GS pixels as the short exposure pixels are the GL pixels as the long exposure pixels. Specifically, the WL pixel 20 (3, 1), the GS pixel 20 (3, 2), the WL pixel 20 (3, 3), the GL pixel 20 (3, 4), the WL pixel 20 (3, 5), the GS pixel 20 (3, 6), the WL pixel 20 (3, 7), and the GL pixel 20 (3, 8) are arranged.

As described above, the G pixels in the same column, for example, the GL pixel 20 (1, 2) and the GS pixel 20 (3, 2) arranged in the first column have different exposure times. As described above, the long exposure pixels and the short exposure pixels are relatively uniformly dispersed.

In the fourth row, the R pixels, the W pixels, and the B pixels are arranged as in the second row, but the fourth row differs in that the first pixel is not the R pixel and is the B pixel, and all the pixels are set to be the short exposure pixels. Specifically, in the fourth row, the BS pixel 20 (4, 1), the WS pixel 20 (4, 2), the RS pixel 20 (4, 3), the WS pixel 20 (4, 4), the BS pixel 20 (4, 5), the WS pixel 20 (4, 6), the RS pixel 20 (4, 7), and the WS pixel 20 (4, 8) are arranged.

The R pixels and the B pixels are positioned in the same column like the G pixels, and the R pixels and the G pixels in the vicinity have different exposure times. As described above, the long exposure pixels and the short exposure pixels are relatively uniformly dispersed in the arrangement.

The fifth to eighth rows have the same pixel arrangements as the first to fourth rows, which means that the arrangements are repeated every 4 rows.

Such a pixel arrangement will additionally be described. In the odd-number rows (first, third, and fifth rows) from the top in the pixel arrangement shown in FIG. 2, the W pixels and the G pixels are arranged alternately, and the W pixels out of those pixels are all set as the WL pixels as the long exposure pixels, and the G pixels are the GL pixels as the long exposure pixels and the GS pixels as the short exposure pixels, that are arranged alternately.

In the even-number rows, the W pixels are arranged at every other pixel positions, and the R pixels and the B pixels are alternately arranged at the remaining pixel positions. Further, the W pixels of the even-number rows are all WS pixels as the short exposure pixels. The R pixels and the B pixels are either the RL pixels and BL pixels as the long exposure pixels or the RS pixels and BS pixels as the short exposure pixels in the same row and are alternately arranged every 2 rows.

The pixel arrangement as that shown in FIG. 2 may look like having a complex spatial pattern for the exposure, but when looking at the pixel arrangement regarding the colors and exposures, the pixels have an isotropic arrangement, and an effect that signal processing such as an interpolation filter can be carried out with ease can therefore be expected as will be described later.

<Wiring Example in Exposure Control>

Figure 3:
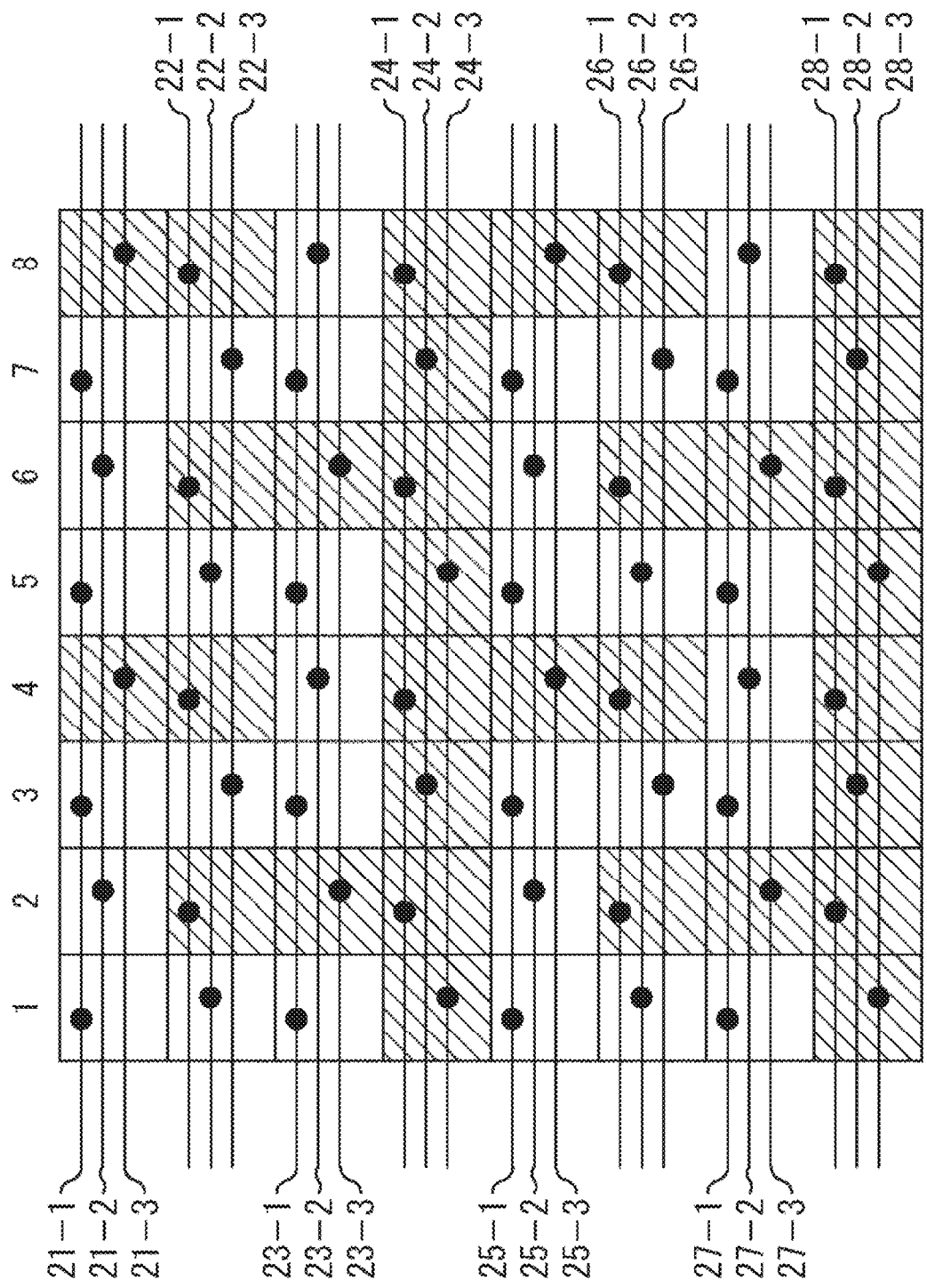
FIG. 3 A diagram showing wirings of control signal lines for realizing exposure time control in the image pickup device.

FIG. 3 schematically shows wirings of control signal lines for realizing exposure time control of FIG. 2. In FIG. 3, solid lines extending in the horizontal direction (lateral direction in figure) indicate pixel transfer control signal lines for controlling exposures of pixels. In addition, black dots on the pixel transfer control signal lines each indicate a connection with the pixel at that position.

Though not shown in FIG. 3, the pixel arrangement is the same as that shown in FIG. 2, and the hatched parts indicate the short exposure pixels. The descriptions will be given while referring to FIG. 2 as appropriate regarding the pixel arrangement.

As shown in FIG. 3, three pixel transfer control signal lines are arranged per line. Pixel transfer control signal lines 21-1 to 21-3 are arranged in the first row, pixel transfer control signal lines 22-1 to 22-3 are arranged in the second row, pixel transfer control signal lines 23-1 to 23-3 are arranged in the third row, pixel transfer control signal lines 24-1 to 24-3 are arranged in the fourth row, pixel transfer control signal lines 25-1 to 25-3 are arranged in the fifth row, pixel transfer control signal lines 26-1 to 26-3 are arranged in the sixth row, pixel transfer control signal lines 27-1 to 27-3 are arranged in the seventh row, and pixel transfer control signal lines 28-1 to 28-3 are arranged in the eighth row.

The pixels 20 and the pixel transfer control signal lines 21 in the first row will be focused. The pixel transfer control signal line 21-1 is connected to the WL pixel 20 (1, 1), the WL pixel 20 (1, 3), the WL pixel 20 (1, 5), and the WL pixel 20 (1, 7). In other words, the pixel transfer control signal line 21-1 is connected to the WL pixels as the long exposure pixels and controls the exposures thereof.

The pixel transfer control signal line 21-2 is connected to the GL pixel 20 (1, 2) and the GL pixel 20 (1, 6). In other words, the pixel transfer control signal line 21-2 is connected to the GL pixels as the long exposure pixels and controls the exposures thereof. The pixel transfer control signal line 21-3 is connected to the GS pixel 20 (1, 4) and the GS pixel 20 (1, 8). In other words, the pixel transfer control signal line 21-3 is connected to the GS pixels as the short exposure pixels and controls the exposures thereof.

Next, the pixels 20 and the pixel transfer control signal lines 22 in the second row will be focused. The pixel transfer control signal line 22-1 is connected to the WS pixel 20 (2, 2), the WS pixel 20 (2, 4), the WS pixel 20 (2, 6), and the WS pixel 20 (2, 8). In other words, the pixel transfer control signal line 22-1 is connected to the WS pixels as the short exposure pixels and controls the exposures thereof.

The pixel transfer control signal line 22-2 is connected to the RL pixel 20 (2, 1) and the RL pixel 20 (2, 5). In other words, the pixel transfer control signal line 22-2 is connected to the RL pixels as the long exposure pixels and controls the exposures thereof. The pixel transfer control signal line 22-3 is connected to the BL pixel 20 (2, 3) and the BL pixel 20 (2, 7). In other words, the pixel transfer control signal line 22-3 is connected to the BL pixels as the long exposure pixels and controls the exposures thereof.

Next, the pixels 20 and the pixel transfer control signal lines 23 in the third row will be focused. The pixel transfer control signal line 23-1 is connected to the WL pixel 20 (3, 1), the WL pixel 20 (3, 3), the WL pixel 20 (3, 5), and the WL pixel 20 (3, 7). In other words, the pixel transfer control signal line 23-1 is connected to the WL pixels as the long exposure pixels and controls the exposures thereof.

The pixel transfer control signal line 23-2 is connected to the GL pixel 20 (3, 4) and the GL pixel 20 (3, 8). In other words, the pixel transfer control signal line 23-2 is connected to the GL pixels as the long exposure pixels and controls the exposures thereof. The pixel transfer control signal line 23-3 is connected to the GS pixel 20 (3, 2) and the GS pixel 20 (3, 6). In other words, the pixel transfer control signal line 23-3 is connected to the GS pixels as the short exposure pixels and controls the exposures thereof.

Next, the pixels 20 and the pixel transfer control signal lines 24 in the fourth row will be focused. The pixel transfer control signal line 24-1 is connected to the WS pixel 20 (4, 2), the WS pixel 20 (4, 4), the WS pixel 20 (4, 6), and the WS pixel 20 (4, 8). In other words, the pixel transfer control signal line 24-1 is connected to the WS pixels as the short exposure pixels and controls the exposures thereof.

The pixel transfer control signal line 24-2 is connected to the RS pixel 20 (4, 3) and the RS pixel 20 (4, 7). In other words, the pixel transfer control signal line 24-2 is connected to the RS pixels as the short exposure pixels and controls the exposures thereof. The pixel transfer control signal line 24-3 is connected to the BS pixel 20 (4, 1) and the BS pixel 20 (4, 5). In other words, the pixel transfer control signal line 24-3 is connected to the BS pixels as the short exposure pixels and controls the exposures thereof.

The pixel arrangements and pixel transfer control signal line connections in the fifth to eighth rows are the same as those of the first to fourth rows. Therefore, descriptions thereof will be omitted.

By arranging the plurality of (three in this case) pixel transfer control signal lines per row as described above, control can be performed distinguishably even when the long exposure pixels and the short exposure pixels are both present in the same row. Further, by arranging three pixel transfer control signal lines per row, independent control per color becomes possible in addition to the control of the long exposure and the short exposure.

The W pixels have about twice the sensitivity as compared to the R, G, and B pixels for having a sensitivity across the entire wavelength band of visible light in some cases. Therefore, only the W pixels are apt to be saturated. According to the present technique, exposure control can be performed for each color. Consequently, for example, it becomes possible to perform control such that only the W pixels have shorter exposure times than the R, G, and B pixels so that the W pixels are not saturated.

Figure 4:
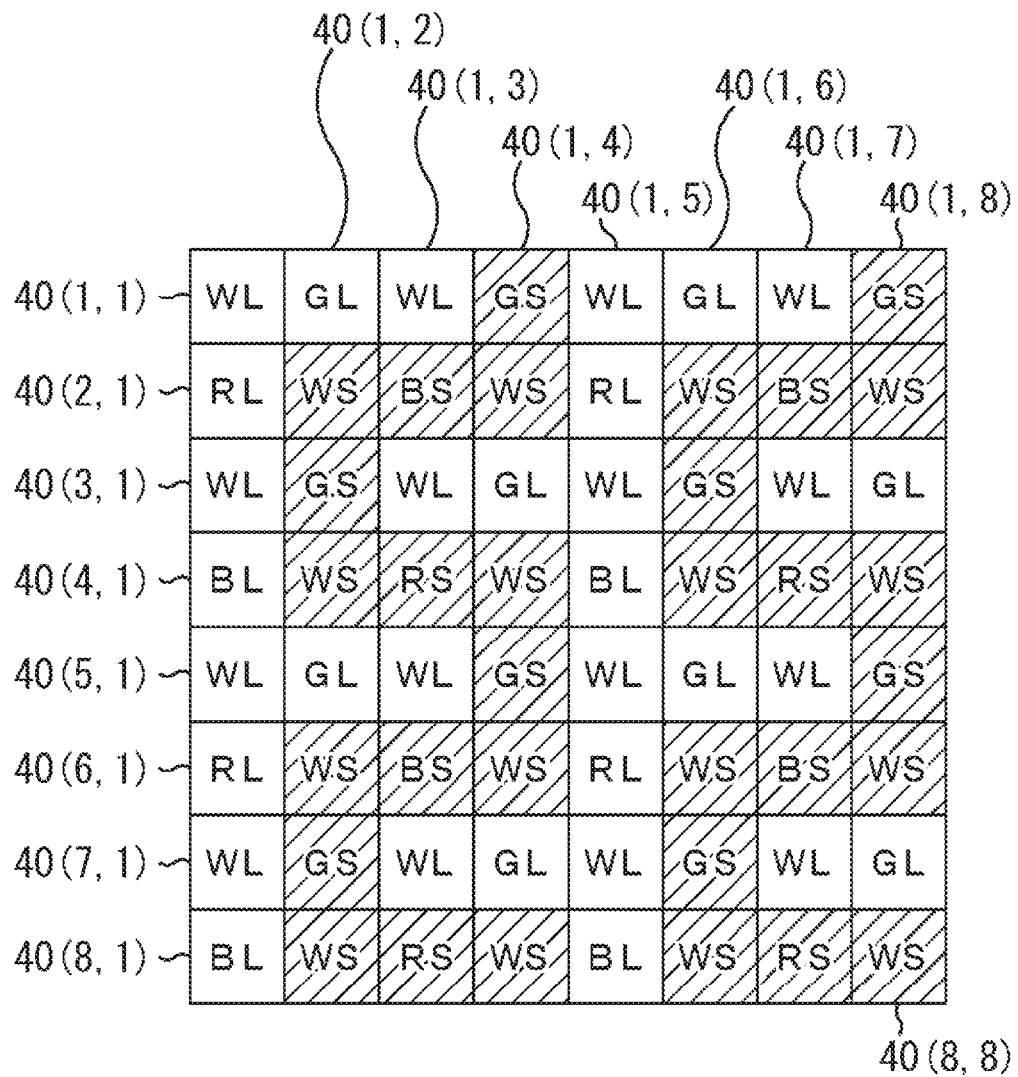
FIG. 4 A diagram showing an example of the pixel arrangement indicating the color filters mounted to the light reception section of the image pickup device and the exposure times.
Figure 5:
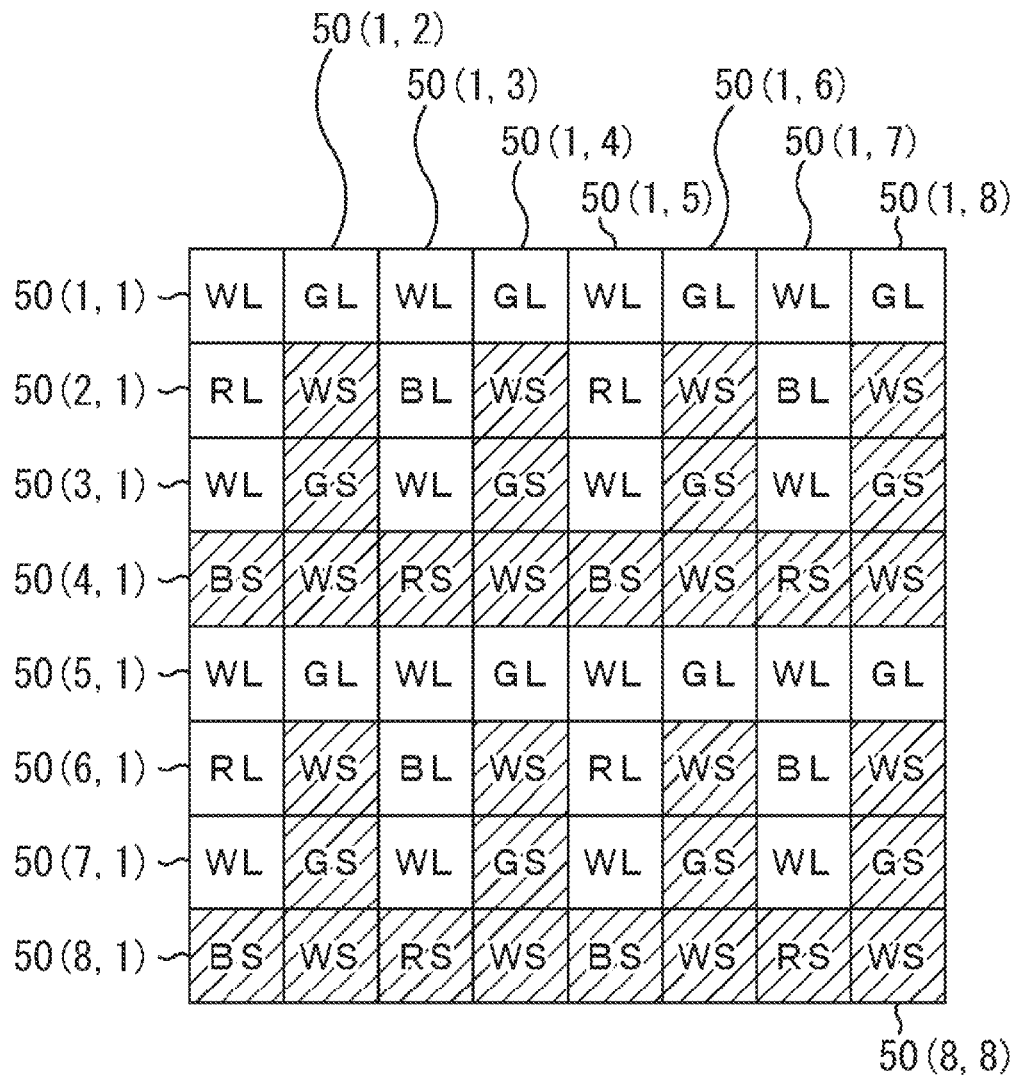
FIG. 5 A diagram showing an example of the pixel arrangement indicating the color filters mounted to the light reception section of the image pickup device and the exposure times.
Figure 6:
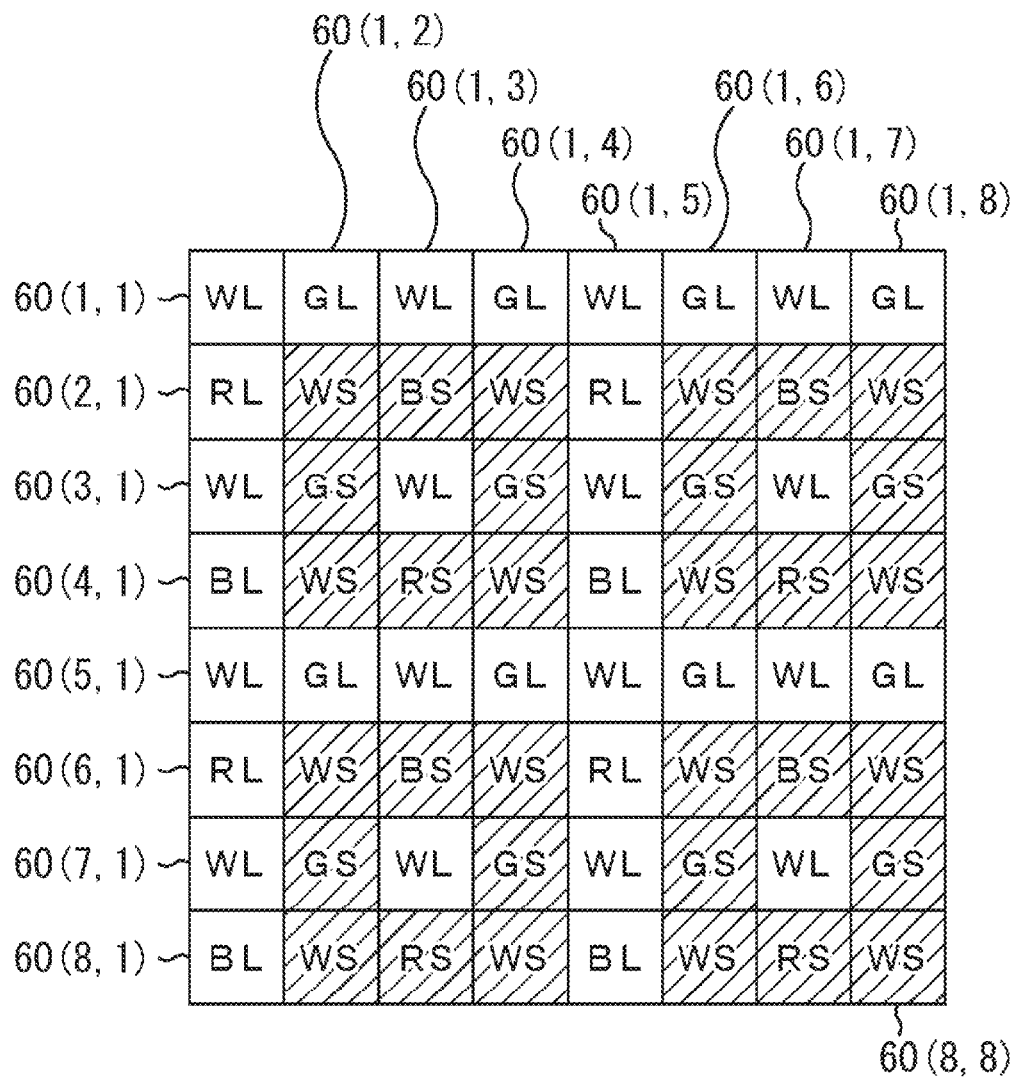
FIG. 6 A diagram showing an example of the pixel arrangement indicating the color filters mounted to the light reception section of the image pickup device and the exposure times.

The arrangement of the long exposure pixels and the short exposure pixels (exposure pattern) when applying the wirings of the pixel transfer control signal lines shown in FIG. 3 to the pixel arrangement (color arrangement) shown in FIG. 1 is not limited to the exposure pattern shown in FIG. 2. FIGS. 4 to 6 show other examples of the exposure pattern. It should be noted that although not shown, the wirings of the pixel transfer control signal lines shown in FIG. 3 are also applicable to a pattern with a phase difference, a pattern for judging the long exposure and the short exposure, and the like in addition to FIGS. 2 and 4 to 6.

The color arrangements shown in FIGS. 4 to 6 are the same as that of FIG. 1 (FIG. 2). Moreover, since the first to fourth rows are repeated as in the example shown in FIG. 1, the following descriptions will be given on the pixels in the first to fourth rows.

Referring to FIG. 4, the WL pixel 40 (1, 1), the GL pixel 40 (1, 2), the WL pixel 40 (1, 3), the GS pixel 40 (1, 4), the WL pixel 40 (1, 5), the GL pixel 40 (1, 6), the WL pixel 40 (1, 7), and the GS pixel 40 (1, 8) are arranged in the first row. In this case, the WL pixels as the long exposure pixels, the GL pixels as the long exposure pixels, and the GS pixels as the short exposure pixels are arranged in the first row.

In the second row, the RL pixel 40 (2, 1), the WS pixel 40 (2, 2), the BS pixel 40 (2, 3), the WS pixel 40 (2, 4), the RL pixel 40 (2, 5), the WS pixel 40 (2, 6), the BS pixel 40 (2, 7), and the WS pixel 40 (2, 8) are arranged. In this case, the WS pixels as the short exposure pixels, the RL pixels as the long exposure pixels, and the BS pixels as the short exposure pixels are arranged in the second row.

In the third row, the WL pixel 40 (3, 1), the GS pixel 40 (3, 2), the WL pixel 40 (3, 3), the GL pixel 40 (3, 4), the WL pixel 40 (3, 5), the GS pixel 40 (3, 6), the WL pixel 40 (3, 7), and the GL pixel 40 (3, 8) are arranged. In this case, the WL pixels as the long exposure pixels, the GL pixels as the long exposure pixels, and the GS pixels as the short exposure pixels are arranged in the third row.

In the fourth row, the BL pixel 40 (4, 1), the WS pixel 40 (4, 2), the RS pixel 40 (4, 3), the WS pixel 40 (4, 4), the BL pixel 40 (4, 5), the WS pixel 40 (4, 6), the RS pixel 40 (4, 7), and the WS pixel 40 (4, 8) are arranged. In this case, the WS pixels as the short exposure pixels, the BL pixels as the long exposure pixels, and the RS pixels as the short exposure pixels are arranged in the fourth row.

The long exposure pixels and the short exposure pixels are present in the same row also in the exposure pattern shown in FIG. 4 as in the exposure pattern shown in FIG. 2. Also in the exposure pattern shown in FIG. 4, by providing three pixel transfer control signal lines per row as shown in FIG. 3, control can be performed distinguishably. Moreover, independent control per color becomes possible in addition to the control of the long exposure and the short exposure.

Referring to FIG. 5, the WL pixel 50 (1, 1), the GL pixel 50 (1, 2), the WL pixel 50 (1, 3), the GL pixel 50 (1, 4), the WL pixel 50 (1, 5), the GL pixel 50 (1, 6), the WL pixel 50 (1, 7), and the GL pixel 50 (1, 8) are arranged in the first row. In this case, the WL pixels and the GL pixels as the long exposure pixels are arranged in the first row.

In the second row, the RL pixel 50 (2, 1), the WS pixel 50 (2, 2), the BL pixel 50 (2, 3), the WS pixel 50 (2, 4), the RL pixel 50 (2, 5), the WS pixel 50 (2, 6), the BL pixel 50 (2, 7), and the WS pixel 50 (2, 8) are arranged. In this case, the WS pixels as the short exposure pixels, the RL pixels as the long exposure pixels, and the BL pixels as the long exposure pixels are arranged in the second row.

In the third row, the WL pixel 50 (3, 1), the GS pixel 50 (3, 2), the WL pixel 50 (3, 3), the GS pixel 50 (3, 4), the WL pixel 50 (3, 5), the GS pixel 50 (3, 6), the WL pixel 50 (3, 7), and the GS pixel 50 (3, 8) are arranged. In this case, the WL pixels as the long exposure pixels and the GS pixels as the short exposure pixels are arranged in the third row.

In the fourth row, the BS pixel 50 (4, 1), the WS pixel 50 (4, 2), the RS pixel 50 (4, 3), the WS pixel 50 (4, 4), the BS pixel 50 (4, 5), the WS pixel 50 (4, 6), the RS pixel 50 (4, 7), and the WS pixel 50 (4, 8) are arranged. In this case, the WS pixels, the BS pixels, and the RS pixels as the short exposure pixels are arranged in the fourth row.

The long exposure pixels and the short exposure pixels are present in the same row also in the exposure pattern shown in FIG. 5 as in the exposure pattern shown in FIG. 2. Also in the exposure pattern shown in FIG. 5, by providing three pixel transfer control signal lines per row as shown in FIG. 3, control can be performed distinguishably. Moreover, independent control per color becomes possible in addition to the control of the long exposure and the short exposure.

Referring to FIG. 6, the WL pixel 60 (1, 1), the GL pixel 60 (1, 2), the WL pixel 60 (1, 3), the GL pixel 60 (1, 4), the WL pixel 60 (1, 5), the GL pixel 60 (1, 6), the WL pixel 60 (1, 7), and the GL pixel 60 (1, 8) are arranged in the first row. In this case, the WL pixels and the GL pixels as the long exposure pixels are arranged in the first row.

In the second row, the RL pixel 60 (2, 1), the WS pixel 60 (2, 2), the BS pixel 60 (2, 3), the WS pixel 60 (2, 4), the RL pixel 60 (2, 5), the WS pixel 60 (2, 6), the BS pixel 60 (2, 7), and the WS pixel 60 (2, 8) are arranged. In this case, the WS pixels as the short exposure pixels, the RL pixels as the long exposure pixels, and the BS pixels as the short exposure pixels are arranged in the second row.

In the third row, the WL pixel 60 (3, 1), the GS pixel 60 (3, 2), the WL pixel 60 (3, 3), the GS pixel 60 (3, 4), the WL pixel 60 (3, 5), the GS pixel 60 (3, 6), the WL pixel 60 (3, 7), and the GS pixel 60 (3, 8) are arranged. In this case, the WL pixels as the long exposure pixels and the GS pixels as the short exposure pixels are arranged in the third row.

In the fourth row, the BL pixel 60 (4, 1), the WS pixel 60 (4, 2), the RS pixel 60 (4, 3), the WS pixel 60 (4, 4), the BL pixel 60 (4, 5), the WS pixel 60 (4, 6), the RS pixel 60 (4, 7), and the WS pixel 60 (4, 8) are arranged. In this case, the WS pixels as the short exposure pixels, the BL pixels as the long exposure pixels, and the RS pixels as the short exposure pixels are arranged in the fourth row.

The long exposure pixels and the short exposure pixels are present in the same row also in the exposure pattern shown in FIG. 6 as in the exposure pattern shown in FIG. 2. Also in the exposure pattern shown in FIG. 6, by providing three pixel transfer control signal lines per row as shown in FIG. 3, control can be performed distinguishably. Moreover, independent control per color becomes possible in addition to the control of the long exposure and the short exposure.

<Structural Example of Basic Circuit of Pixels>

Figure 7:
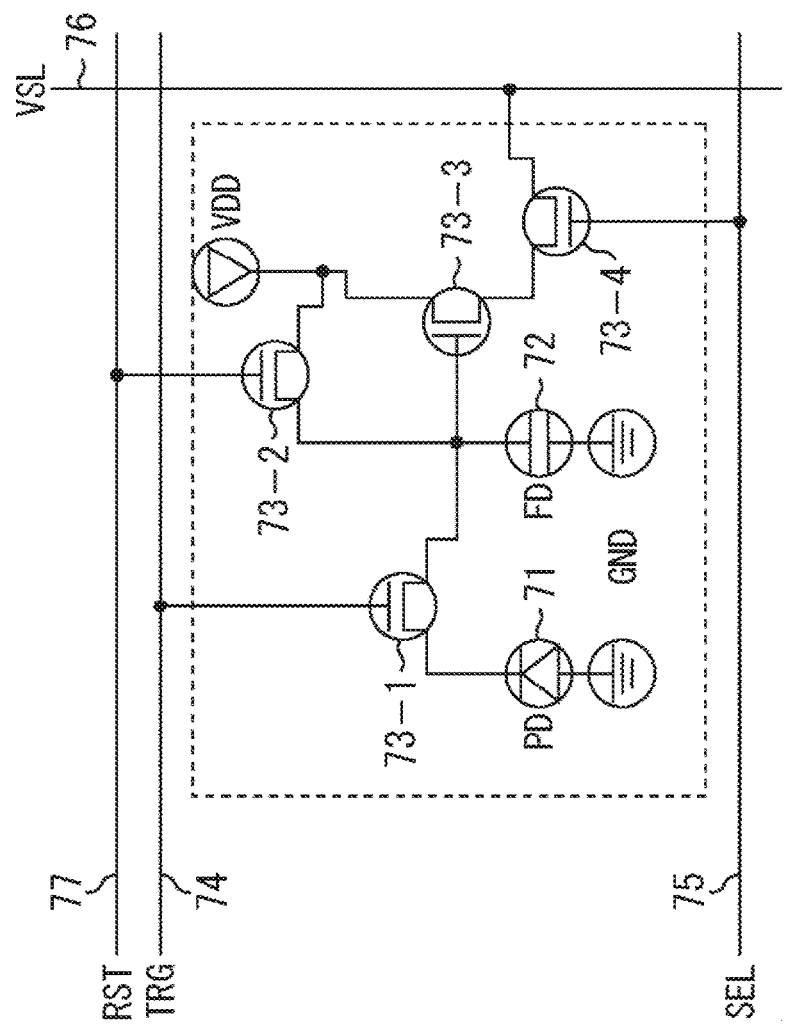
FIG. 7 A diagram showing a structural example of a basic circuit of pixels included in an image pickup device according to a first embodiment.

FIG. 7 is a diagram showing a structural example of a basic circuit of the pixels included in the image pickup device according to the first embodiment of the present technique. FIG. 7 shows a structural example of a CIS (CMOS image sensor) pixel circuit having a 4 Tr (transistor) structure not performing pixel sharing.

In FIG. 7, the equivalence circuit surrounded by a rectangular broken line represents a structural element of a pixel. The pixel is constituted of a photodiode PD 71 as the light reception section, a floating diffusion FD 72, and four MOS-FETs 73-1 to 73-4. The pixel is connected to a pixel transfer control signal line (pixel transfer gate control signal line) TRG 74, a pixel readout selection control signal line SEL 75, a vertical signal line (readout line) VSL 76, and a pixel reset control signal line RST 77.

Light irradiated onto the pixel is converted into electrons by the PD 71, and charges corresponding to the light amount are accumulated in the PD 71. The MOS-FET 73-1 controls a charge transfer between the PD 71 and the FD 72. By applying a signal of the pixel transfer control signal line TRG 74 to the gate electrode of the MOS-FET 73-1, the charges accumulated in the PD 71 are transferred to the FD 72.

The FD 72 is connected to the gate electrode of the MOS-FET 73-3. As a control signal of the pixel readout selection control signal line SEL 75 is applied to the gate electrode of the MOS-FET 73-4, a voltage corresponding to the charges accumulated in the FD 72 can be read out as a signal from the vertical signal line VSL 76. As a reset signal of the pixel reset control signal line RST 77 is applied to the gate electrode of the MOS-FET 73-2, the charges accumulated in the FD 72 flow via the MOS-FET 73-2 so that the charge accumulation state is reset.

A single pixel has such a basic structure, and a signal corresponding to the received light amount is taken out.

<Structural Example of Pixel Control Circuit and Pixel Wirings>

Figure 8:
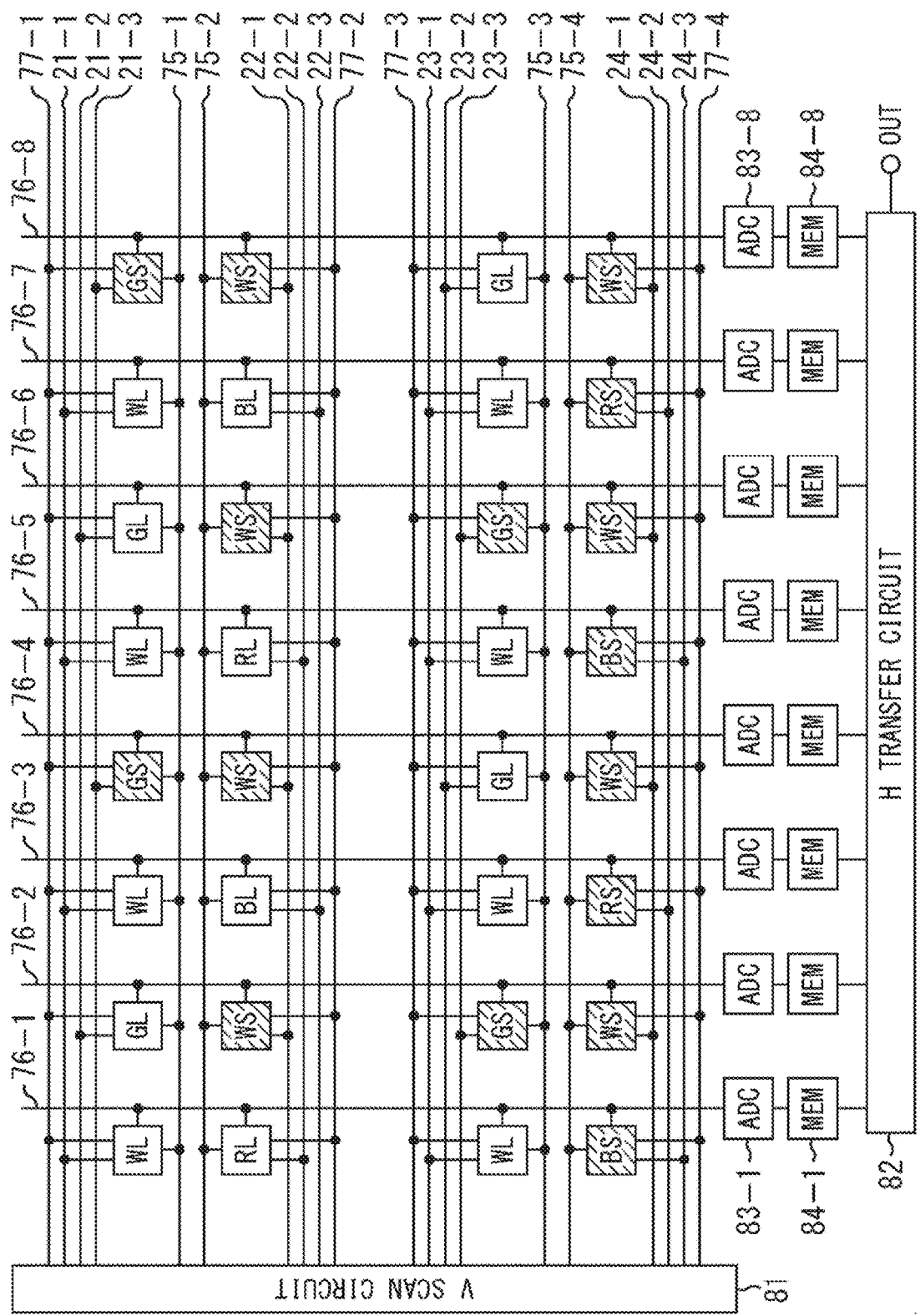
FIG. 8 A diagram showing a structural example of a pixel control circuit and pixel wirings in the image pickup device according to the first embodiment.

FIG. 8 is a diagram showing a structural example of a pixel control circuit and pixel wirings in the image pickup device according to the first embodiment of the present technique.

The image pickup device shown in FIG. 8 exemplifies the first to fourth rows of the image pickup device shown in FIG. 2. Therefore, since this arrangement has been described with reference to FIG. 2, descriptions thereof will be omitted herein. For example, the upper left WL pixel is the WL pixel 20 (1, 1). The description will continue assuming that similar symbols as the pixels shown in FIG. 2 are assigned to other pixels. As shown in FIG. 7, the plurality of pixels are arranged in a 2D square lattice.

Further, each pixel has the circuit structure as shown in FIG. 7. The pixel transfer control signal line TRG 74 in FIG. 7 corresponds to the pixel transfer control signal lines shown in FIG. 3. As has been described with reference to FIG. 3, since three pixel transfer control signal lines are arranged per row, the same symbols as in FIG. 3 are assigned.

The image pickup device further includes a vertical scan control circuit (V Scan Circuit) 81, a horizontal transfer circuit (H Transfer Circuit) 82, and an A/D (Analog/Digital) converter (ADC) 83 and a memory (MEM) 84 for each column.

The vertical scan control circuit 81 controls the signal lines (RST 77, TRG 21 to 24, and SEL 75) arranged in the row direction to turn on/off a switch between each pixel 20 and the vertical signal line VSL 76. It should be noted that the control of the signal lines will be described later.

The horizontal transfer circuit 82 is a circuit for horizontally transferring digital data stored in the memory 84 of each column. The A/D converter 83 of each column converts image data from the pixels as analog values into digital data (digital values). The memory 84 of each column is a memory that successively stores the digital data obtained by the conversion by the A/D converter 83 of each column.

The vertical signal lines VSL 76 are arranged in the vertical direction, and the pixels in the same column share a single vertical signal line VSL 76. Further, the vertical signal lines VSL 76 are exclusively connected to an output terminal (OUT) by the horizontal transfer circuit 82.

As described above, by the selective control of the vertical scan control circuit 81, a certain pixel can be connected to the output terminal (OUT). Therefore, signals of all the pixels can be read out time-divisionally by successively selecting the pixels 20. Also in the image pickup device, the three pixel transfer control signal lines TRG 21 to 24, the pixel readout selection control signal line SEL 75, and the pixel reset control signal line RST 77 are arranged in each row in the horizontal direction. The three pixel transfer control signal lines TRG 21 to 24 are connected to the pixels in the pattern shown in FIG. 3.

<Timing Chart Example of Control Signals>

Figure 9:
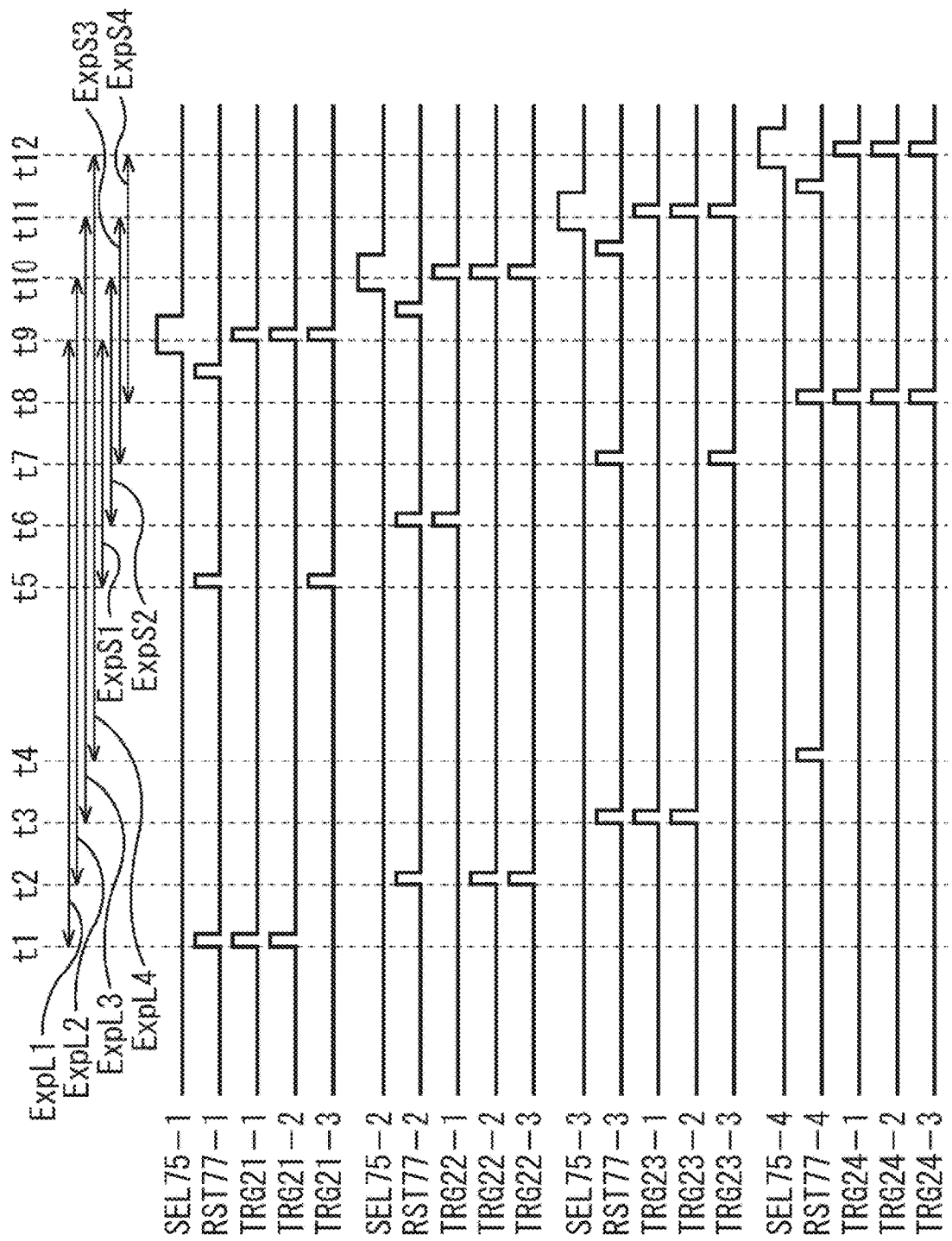
FIG. 9 A timing chart schematically showing control signals to the pixels constituting the image pickup device according to the first embodiment.

FIG. 9 is a timing chart schematically showing control signals to the pixels constituting the image pickup device according to the first embodiment of the present technique. FIG. 9 shows the timing chart of control signals to the pixels of four rows shown in FIG. 8. The abscissa axis is a time axis.

The periods indicated by double-headed arrows ExpL1 to ExpL4 and ExpS1 to ExpS4 at the upper portion of the figure indicate exposure periods. ExpL1 to ExpL4 indicate exposure periods of long exposure pixels, and ExpS1 to ExpS4 indicate exposure periods of short exposure pixels. The numbers respectively correspond to the row numbers.

The electronic pixel shutter turns on the pixel reset control signal line RST 77 (H level since reset transistor 73-2 is NMOS) and simultaneously activates the pixel transfer control signal line TRG. By the electronic pixel shutter, the accumulated charges of the PD (photodiode) 71 as the target are reset. Therefore, even when the pixel reset control signal line RST 77 is on, if the pixel transfer control signal lines TRG 21 to 24 are off, the PD 71 as the target is not reset.

For example, since the pixel reset control signal line RST 77-1 and the pixel transfer control signal lines TRG 21-1 and 21-2 are turned on at a time t1, the electronic pixel shutters of the WL pixel 20 (1, 1), the WL pixel 20 (1, 3), the WL pixel 20 (1, 5), the WL pixel 20 (1, 7), the GL pixel 20 (1, 2), and the GL pixel 20 (1, 6) in the first row are released.

Further, since the pixel transfer control signal lines TRG 21-1 and 21-2 are turned on at a time t9 regarding those pixels and the charges accumulated in the PD 71 are transferred, the period from the time t1 to the time t9 (ExpL1) becomes the exposure period.

Furthermore, since the pixel reset control signal line RST 77-1 and the pixel transfer control signal line TRG 21-3 are turned on at a time t5, the electronic pixel shutters of the GS pixel 20 (1, 4) and the GS pixel 20 (1, 8) in the first row are released. Moreover, since the pixel transfer control signal line TRG 21-3 is turned on at the time t9 regarding those pixels and the charges accumulated in the PD 71 are transferred, the period from the time t5 to the time t9 (ExpS1) becomes the exposure period.

As described above, the plurality of pixels in 1 line in the horizontal direction can be controlled so as to be exposed with different exposure periods.

Similar control can be performed with respect to the second row. For example, since the pixel reset control signal line RST 77-2 and the pixel transfer control signal lines TRG 22-2 and 22-3 are turned on at a time t2, the electronic pixel shutters of the RL pixel 20 (2, 1), the RL pixel 20 (2, 5), the BL pixel 20 (2, 3), and the BL pixel 20 (2, 7) in the second row are released. Further, since the pixel transfer control signal lines TRG 22-2 and 22-3 are turned on at a time t10 regarding those pixels and the charges accumulated in the PD 71 are transferred, the period from the time t2 to the time t10 (ExpL2) becomes the exposure period.

Furthermore, since the pixel reset control signal line RST 77-2 and the pixel transfer control signal line TRG 22-1 are turned on at a time t6, the electronic pixel shutters of the WS pixel 20 (2, 2), the WS pixel 20 (2, 4), the WS pixel 20 (2, 6), and the WS pixel 20 (2, 8) in the second row are released. Moreover, since the pixel transfer control signal line TRG 22-1 is turned on at the time t10 regarding those pixels and the charges accumulated in the PD 71 are transferred, the period from the time t6 to the time t10 (ExpS2) becomes the exposure period.

Similar control can be performed with respect to the third row. For example, since the pixel reset control signal line RST 77-3 and the pixel transfer control signal lines TRG 23-1 and 23-2 are turned on at a time t3, the electronic pixel shutters of the WL pixel 20 (3, 1), the WL pixel 20 (3, 3), the WL pixel 20 (3, 5), the WL pixel 20 (3, 7), the GL pixel 20 (3, 4), and the GL pixel 20 (3, 8) in the third row are released.

Further, since the pixel transfer control signal lines TRG 23-1 and 23-2 are turned on at a time t11 regarding those pixels and the charges accumulated in the PD 71 are transferred, the period from the time t3 to the time t11 (ExpL3) becomes the exposure period.

Furthermore, since the pixel reset control signal line RST 77-3 and the pixel transfer control signal line TRG 23-3 are turned on at a time t7, the electronic pixel shutters of the GS pixel 20 (3, 2) and the GS pixel 20 (3, 6) in the third row are released. Moreover, since the pixel transfer control signal line TRG 23-3 is turned on at the time t11 regarding those pixels and the charges accumulated in the PD 71 are transferred, the period from the time t7 to the time t11 (ExpS3) becomes the exposure period.

Similar control can be performed with respect to the fourth row. It should be noted that regarding the fourth row, the pixel reset control signal line RST 77-4 is turned on at a time t4, but since there is no pixel transfer control signal line 24 to be turned on at the same time, there is no pixel for which the electronic pixel shutter is to be released at the time t4.

Since the pixel reset control signal line RST 77-4 and the pixel transfer control signal lines TRG 24-1, 24-2, and 24-3 are turned on at a time t8, the electronic pixel shutters of all the pixels in the fourth row are released. In other words, the electronic pixel shutters of the BS pixel 20 (4, 1), the WS pixel 20 (4, 2), the RS pixel 20 (4, 3), the WS pixel 20 (4, 4), the BS pixel 20 (4, 5), the WS pixel 20 (4, 6), the RS pixel 20 (4, 7), and the WS pixel 20 (4, 8) are released.

Further, since the pixel transfer control signal line TRG 24-3 is turned on at a time t12 regarding those pixels and the charges accumulated in the PD 71 are transferred, the period from the time t8 to the time t12 (ExpS4) becomes the exposure period.

It should be noted that since the intervals of the times t1, t2, t3, t4, t5, t6, t7, t8, t9, t10, t11, and t12 are all set to 1 H (time required for reading out pixel data corresponding to 1 row), the long exposure times ExpL1 to ExpL4 of the respective rows and the short exposure times ExpS1 to ExpS4 of the respective rows become the same.

As described above, a desired sensitivity pattern can be generated by appropriately controlling on/off of the three pixel transfer control signal lines TGR per row in the horizontal direction at the pixel reset timings.

Moreover, by switching on/off the pixel transfer control signal lines TGR at the times t1 to t8, the arrangement of the long exposure pixels and the arrangement of the short exposure pixels can be exchanged. As an example, the timing charts for realizing the exposure control patterns shown in FIGS. 4, 5, and 6 are respectively shown in FIGS. 10, 11, and 12.

Figure 10:
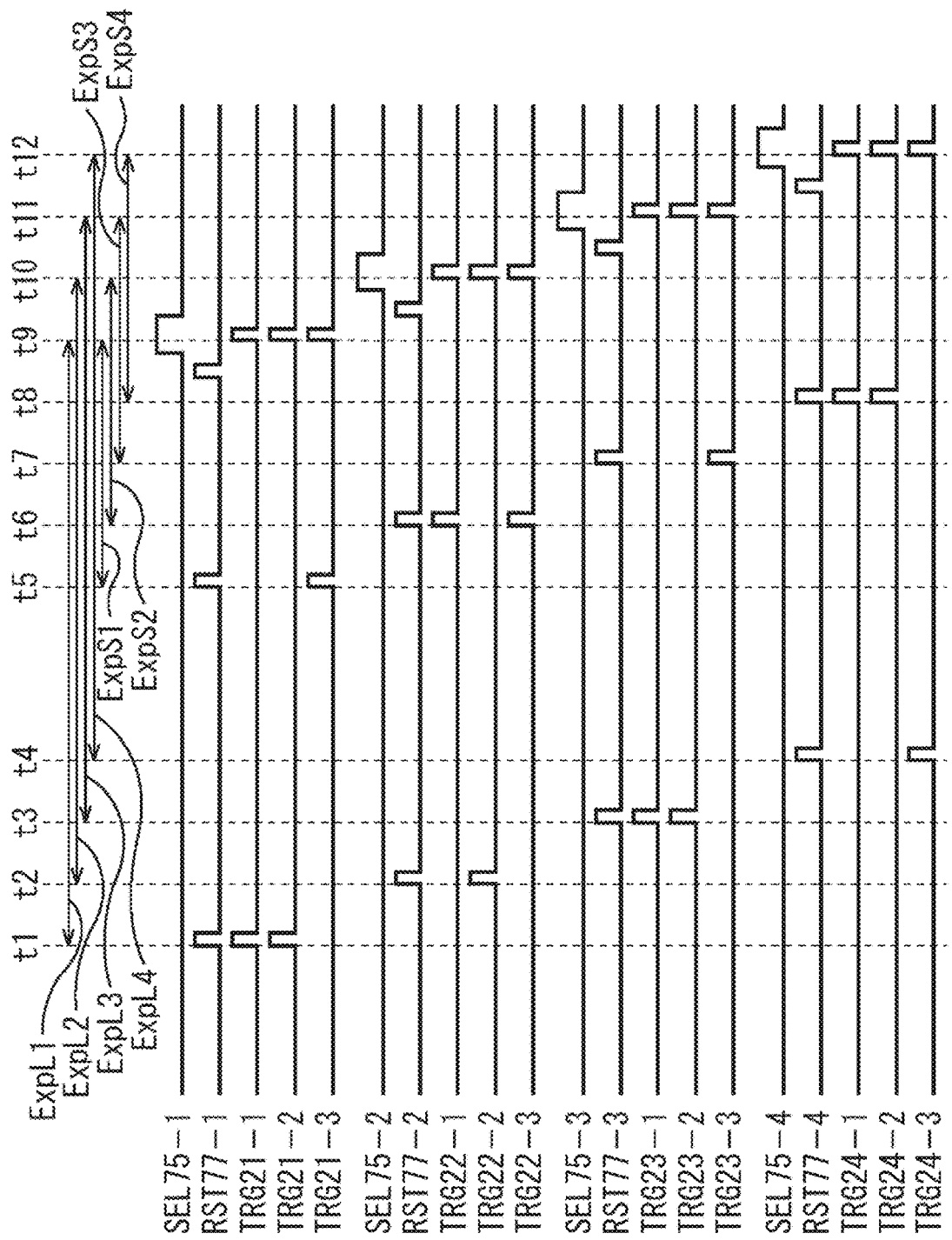
FIG. 10 A timing chart schematically showing control signals to the pixels constituting the image pickup device according to the first embodiment.

The timing chart for realizing the exposure control pattern shown in FIG. 4 is shown in FIG. 10. In the exposure control pattern shown in FIG. 4, the first and third rows are the same as those of the exposure control pattern shown in FIG. 2, and the timings are also the same as those of the first and third rows in the timing chart shown in FIG. 10. Therefore, descriptions thereof will be omitted.

It should be noted that the descriptions will be given assuming that the wirings of the pixel transfer control signal lines TRG 21 to 24 with respect to the pixels are the same as those shown in FIG. 8.

Control with respect to the second row will be described. For example, since the pixel reset control signal line RST 77-2 and the pixel transfer control signal line TRG 22-2 are turned on at the time t2, the electronic pixel shutters of the RL pixel 40 (2, 1) and the RL pixel 40 (2, 5) in the second row are released. Further, since the pixel transfer control signal line TRG 22-2 is turned on at the time t10 regarding those pixels and the charges accumulated in the PD 71 are transferred, the period from the time t2 to the time t10 (ExpL2) becomes the exposure period.

Furthermore, since the pixel reset control signal line RST 77-2 and the pixel transfer control signal lines TRG 22-1 and 22-3 are turned on at the time t6, the electronic pixel shutters of the WS pixel 40 (2, 2), the WS pixel 40 (2, 4), the WS pixel 40 (2, 6), the WS pixel 40 (2, 8), the BS pixel 40 (2, 3), and the BS pixel 40 (2, 7) in the second row are released. Moreover, since the pixel transfer control signal lines TRG 22-1 and 22-3 are turned on at the time t10 regarding those pixels and the charges accumulated in the PD 71 are transferred, the period from the time t6 to the time t10 (ExpS2) becomes the exposure period.

Control with respect to the fourth row will be described. Since the pixel reset control signal line RST 77-4 and the pixel transfer control signal line TRG 24-3 are turned on at the time t4, the electronic pixel shutters of the BL pixel 40 (4, 1) and the BL pixel 40 (4, 5) in the fourth row are released. Further, since the pixel transfer control signal line TRG 24-3 is turned on at the time t12 regarding those pixels and the charges accumulated in the PD 71 are transferred, the period from the time t4 to the time t12 (ExpL4) becomes the exposure period.

Moreover, since the pixel reset control signal line RST 77-4 and the pixel transfer control signal lines TRG 24-1 and 24-2 are turned on at the time t8, the electronic pixel shutters of the WS pixel 40 (4, 2), the WS pixel 40 (4, 4), the WS pixel 40 (4, 6), the WS pixel 40 (4, 8), the RS pixel 40 (4, 3), and the RS pixel 40 (4, 7) in the fourth row are released. Further, since the pixel transfer control signal lines TRG 24-1 and 24-2 are turned on at the time t12 regarding those pixels and the charges accumulated in the PD 71 are transferred, the period from the time t8 to the time t12 (ExpS4) becomes the exposure period.

As described above, a desired sensitivity pattern can be generated by appropriately controlling on/off of the three pixel transfer control signal lines TGR per row in the horizontal direction at the pixel reset timings.

Figure 11:
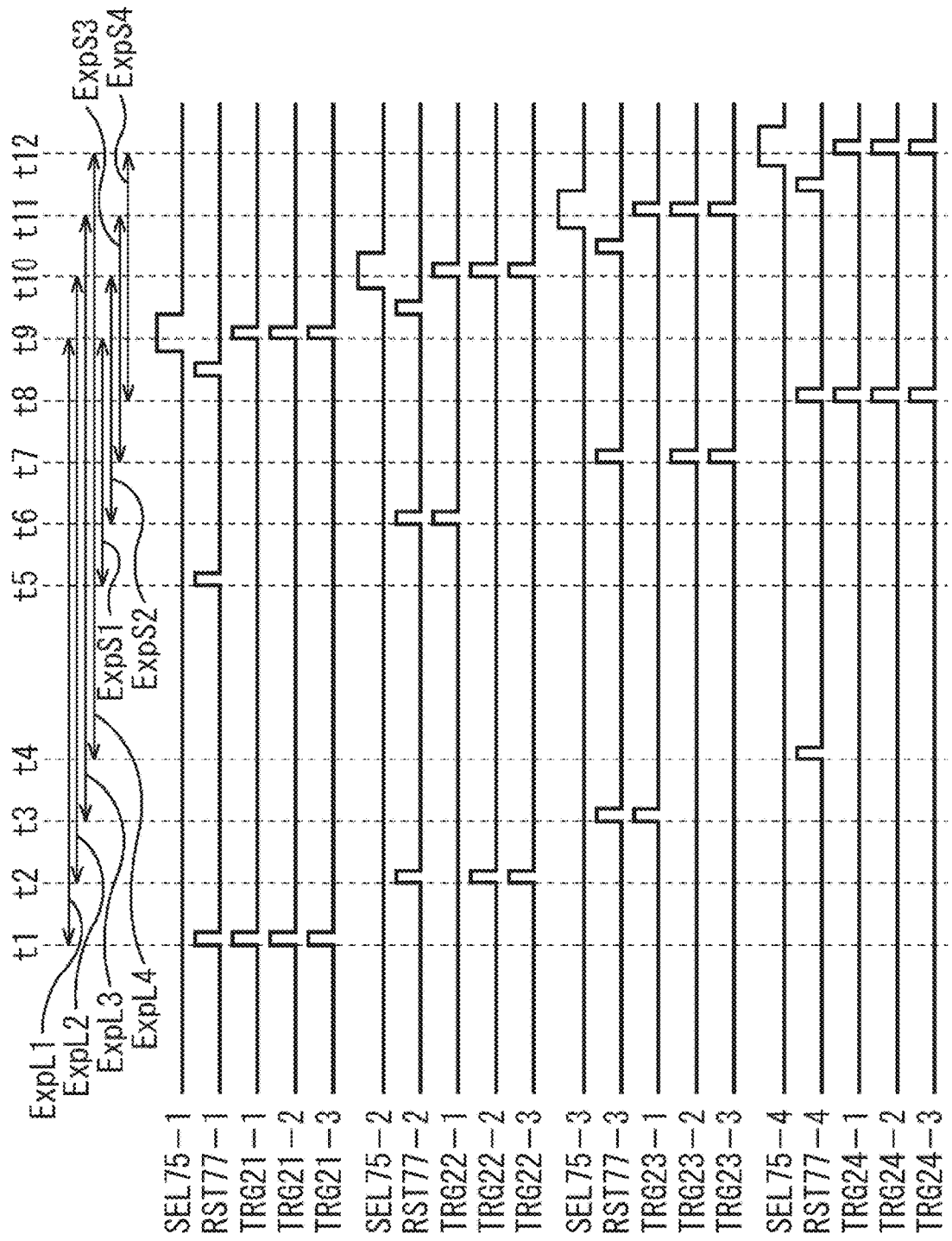
FIG. 11 A timing chart schematically showing control signals to the pixels constituting the image pickup device according to the first embodiment.

The timing chart for realizing the exposure control pattern shown in FIG. 5 is shown in FIG. 11. In the exposure control pattern shown in FIG. 5, the second and fourth rows are the same as those of the exposure control pattern shown in FIG. 2, and the timings are also the same as those of the second and fourth rows in the timing chart shown in FIG. 11. Therefore, descriptions thereof will be omitted.

It should be noted that the descriptions will be given assuming that the wirings of the pixel transfer control signal lines TRG 21 to 24 with respect to the pixels are the same as those shown in FIG. 8.

Control with respect to the first row will be described. For example, since the pixel reset control signal line RST 77-1 and the pixel transfer control signal lines TRG 21-1, 21-2, and 21-3 are turned on at the time t1, the electronic pixel shutters of all the pixels in the first row are released. Further, since the pixel transfer control signal lines TRG 21-1, 21-2, and 21-3 are turned on at the time t9 regarding those pixels and the charges accumulated in the PD 71 are transferred, the period from the time t1 to the time t9 (ExpL1) becomes the exposure period.

Control with respect to the third row will be described. Since the pixel reset control signal line RST 77-3 and the pixel transfer control signal line TRG 23-1 are turned on at the time t3, the electronic pixel shutters of the WL pixel 50 (3, 1), the WL pixel 50 (3, 3), the WL pixel 50 (3, 5), and the WL pixel 50 (3, 7) in the third row are released. Moreover, since the pixel transfer control signal line TRG 23-1 is turned on at the time t11 regarding those pixels and the charges accumulated in the PD 71 are transferred, the period from the time t3 to the time t11 (ExpL3) becomes the exposure period.

Further, since the pixel reset control signal line RST 77-3 and the pixel transfer control signal lines TRG 23-2 and 23-3 are turned on at the time t7, the electronic pixel shutters of the GS pixel 50 (3, 2), the GS pixel 50 (3, 4), the GS pixel 50 (3, 6), and the GS pixel 50 (3, 8) in the third row are released. Moreover, since the pixel transfer control signal lines TRG 23-2 and 23-3 are turned on at the time t11 regarding those pixels and the charges accumulated in the PD 71 are transferred, the period from the time t7 to the time t11 (ExpS3) becomes the exposure period.

As described above, a desired sensitivity pattern can be generated by appropriately controlling on/off of the three pixel transfer control signal lines TGR per row in the horizontal direction at the pixel reset timings.

Figure 12:
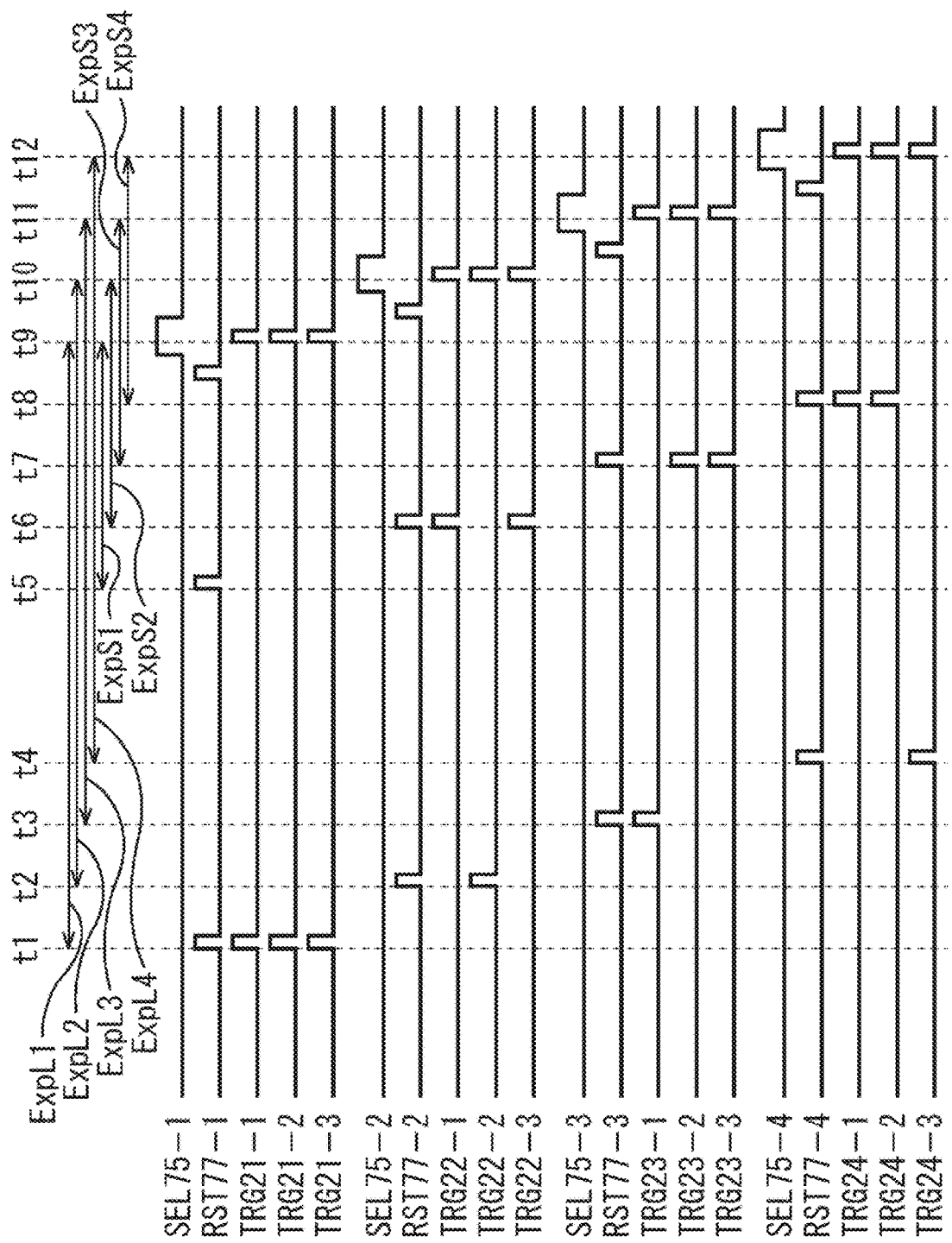
FIG. 12 A timing chart schematically showing control signals to the pixels constituting the image pickup device according to the first embodiment.

The timing chart for realizing the exposure control pattern shown in FIG. 6 is shown in FIG. 12. It should be noted that the descriptions will be given assuming that the wirings of the pixel transfer control signal lines TRG 21 to 24 with respect to the pixels are the same as those shown in FIG. 8.

Control with respect to the first row will be described. For example, since the pixel reset control signal line RST 77-1 and the pixel transfer control signal lines TRG 21-1, 21-2, and 21-3 are turned on at the time t1, the electronic pixel shutters of all the pixels in the first row are released. Further, since the pixel transfer control signal lines TRG 21-1, 21-2, and 21-3 are turned on at the time t9 regarding those pixels and the charges accumulated in the PD 71 are transferred, the period from the time t1 to the time t9 (ExpL1) becomes the exposure period.

Control with respect to the second row will be described. For example, since the pixel reset control signal line RST 77-2 and the pixel transfer control signal line TRG 22-2 are turned on at the time t2, the electronic pixel shutters of the RL pixel 60 (2, 1) and the RL pixel 60 (2, 5) in the second row are released. Further, since the pixel transfer control signal line TRG 22-2 is turned on at the time t10 regarding those pixels and the charges accumulated in the PD 71 are transferred, the period from the time t2 to the time t10 (ExpL2) becomes the exposure period.

Furthermore, since the pixel reset control signal line RST 77-2 and the pixel transfer control signal lines TRG 22-1 and 22-3 are turned on at the time t6, the electronic pixel shutters of the WS pixel 60 (2, 2), the WS pixel 60 (2, 4), the WS pixel 60 (2, 6), the WS pixel 60 (2, 8), the BS pixel 60 (2, 3), and the BS pixel 60 (2, 7) in the second row are released. Moreover, since the pixel transfer control signal lines TRG 22-1 and 22-3 are turned on at the time t10 regarding those pixels and the charges accumulated in the PD 71 are transferred, the period from the time t6 to the time t10 (ExpS2) becomes the exposure period.

Control with respect to the third row will be described. Since the pixel reset control signal line RST 77-3 and the pixel transfer control signal line TRG 23-1 are turned on at the time t3, the electronic pixel shutters of the WL pixel 60 (3, 1), the WL pixel 60 (3, 3), the WL pixel 60 (3, 5), and the WL pixel 60 (3, 7) in the third row are released. Moreover, since the pixel transfer control signal line TRG 23-1 is turned on at the time t11 regarding those pixels and the charges accumulated in the PD 71 are transferred, the period from the time t3 to the time t11 (ExpL3) becomes the exposure period.

Further, since the pixel reset control signal line RST 77-3 and the pixel transfer control signal lines TRG 23-2 and 23-3 are turned on at the time t7, the electronic pixel shutters of the GS pixel 60 (3, 2), the GS pixel 60 (3, 4), the GS pixel 60 (3, 6), and the GS pixel 60 (3, 8) in the third row are released. Moreover, since the pixel transfer control signal lines TRG 23-2 and 23-3 are turned on at the time t11 regarding those pixels and the charges accumulated in the PD 71 are transferred, the period from the time t7 to the time t11 (ExpS3) becomes the exposure period.

Control with respect to the fourth row will be described. Since the pixel reset control signal line RST 77-4 and the pixel transfer control signal line TRG 24-3 are turned on at the time t4, the electronic pixel shutters of the BL pixel 60 (4, 1) and the BL pixel 60 (4, 5) in the fourth row are released. Further, since the pixel transfer control signal line TRG 24-3 is turned on at the time t12 regarding those pixels and the charges accumulated in the PD 71 are transferred, the period from the time t4 to the time t12 (ExpL4) becomes the exposure period.

Moreover, since the pixel reset control signal line RST 77-4 and the pixel transfer control signal lines TRG 24-1 and 24-2 are turned on at the time t8, the electronic pixel shutters of the WS pixel 60 (4, 2), the WS pixel 60 (4, 4), the WS pixel 60 (4, 6), the WS pixel 60 (4, 8), the RS pixel 60 (4, 3), and the RS pixel 60 (4, 7) in the fourth row are released. Further, since the pixel transfer control signal lines TRG 24-1 and 24-2 are turned on at the time t12 regarding those pixels and the charges accumulated in the PD 71 are transferred, the period from the time t8 to the time t12 (ExpS4) becomes the exposure period.

As described above, a desired sensitivity pattern can be generated by appropriately controlling on/off of the three pixel transfer control signal lines TGR per row in the horizontal direction at the pixel reset timings.

As described above, in the first embodiment of the present disclosure, by providing, with respect to the CIS having the color filter arrangement including the W pixels, three pixel transfer control signal lines TGR per row in the horizontal direction and controlling those pixel transfer control signal lines TGR, it is possible to mix pixels having different exposure times in the same row and realize an image pickup of a high dynamic range. Moreover, it is also compatible with a color shutter for compensating for the color filter sensitivity differences.

Second Embodiment

In a second embodiment of the present technique, a circuit structure onto which one A/D converter shared by two pixels in the horizontal direction is mounted will be described. It should be noted that in the descriptions below, descriptions on parts that are in common with the image pickup device according to the first embodiment will partially be omitted.

<Structural Example of Pixel Control Circuit and Pixel Wirings>

Figure 13:
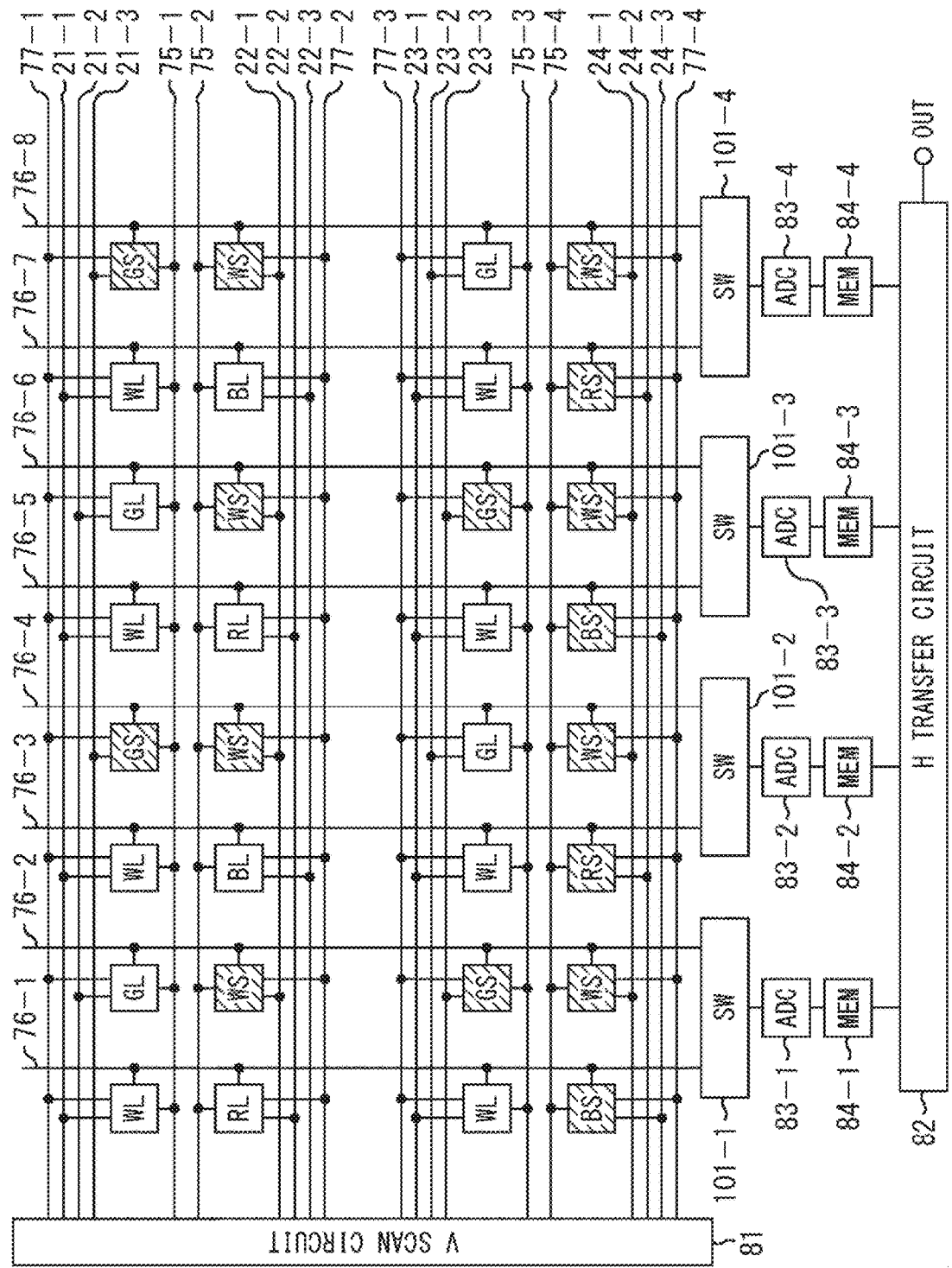
FIG. 13 A diagram showing a structural example of a pixel control circuit and pixel wirings in an image pickup device according to a second embodiment.

FIG. 13 is a diagram showing a structural example of a pixel control circuit and pixel wirings in an image pickup device according to the second embodiment of the present technique. The image pickup device includes a vertical scan control circuit (V Scan Circuit) 81, a horizontal transfer circuit (H Transfer Circuit) 82, column switches (SW) 101 provided every two rows, A/D converters (ADC) 83 provided every two rows, memories (MEM) 84 provided every two rows, and the plurality of pixels 20.

It should be noted that parts that are the same as those of the structural example of the pixel control circuit and pixel wirings of the image pickup device shown in FIG. 8 are denoted by the same symbols. Specifically, the structural example of the pixel control circuit and pixel wirings of the image pickup device shown in FIG. 13 is different from the structural example of the pixel control circuit and pixel wirings of the image pickup device shown in FIG. 8 in that the column switches 101 for carrying out processing are added every two rows, and that the number of A/D converters 83 and the number of memories 84 are reduced to half for the structure for carrying out processing every two rows. Further, as in FIG. 8, since the pixels have the same color arrangement as the pixels shown in FIG. 2, the same symbols as in FIG. 2 will be used in the descriptions.

The column switch 101 selects, based on signals from a control section (not shown), one of the signals from two pixels and outputs it to the A/D converter 83. The A/D converter 83 converts image data (analog values) from the column switch 101 into digital data (digital values). The memory 84 is a memory that successively stores digital data obtained by the conversion by the A/D converter 83.

As shown in FIG. 8, the A/D converters 83 may be mounted according to the pixel pitches, but due to influences of miniaturizations of pixels and the like, the miniaturized A/D converters 83 do not fit in the pixel pitches due to design constraints. Therefore, the image pickup device in which one A/D converter 83 is provided in a pitch of two pixels as shown in FIG. 13 can cope with the pixel miniaturization.

It should be noted that since one A/D converter 83 can only read out one pixel at a time, when one A/D converter 83 is to read out two pixels on the same row, the readout times of the two pixels need to be shifted so that the pixels are read out one at a time. In this case, the time the A/D converter takes to read out pixels of one row becomes twice as long.

<Timing Chart Example of Control Signals>

Figure 14:
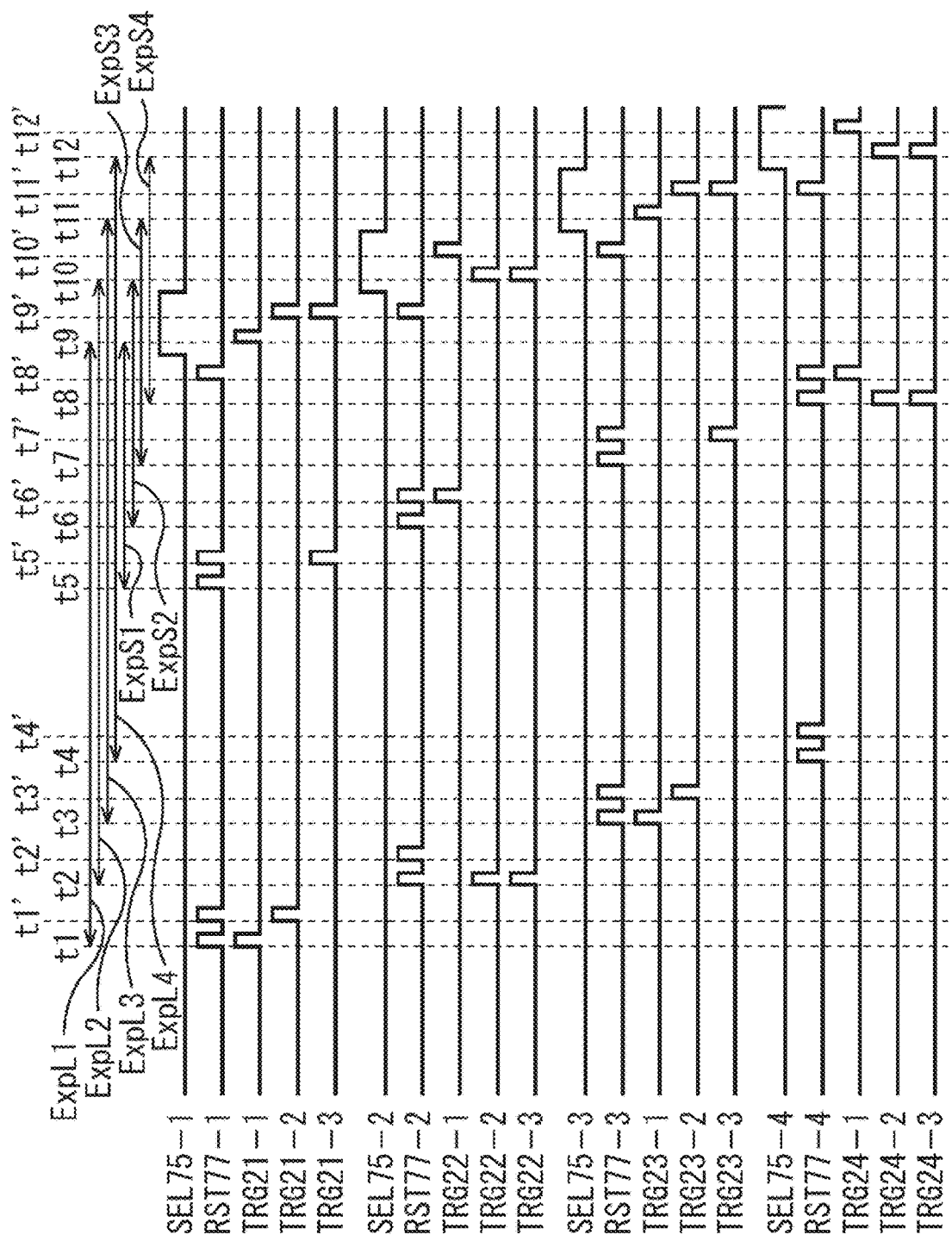
FIG. 14 A timing chart schematically showing control signals to the pixels constituting the image pickup device according to the second embodiment.

FIG. 14 is a timing chart schematically showing control signals to the pixels constituting the image pickup device according to the second embodiment of the present technique. FIG. 14 shows the timing chart of control signals to the pixels corresponding to four rows shown in FIG. 13. The abscissa axis is the time axis. The periods indicated by the both-headed arrows ExpL1 to ExpL4 and ExpS1 to ExpS4 at the upper portion of the figure each represent the exposure period, ExpL1 to ExpL4 represent the exposure periods of long exposure pixels, ExpS1 to ExpS4 represent the exposure periods of short exposure pixels, and the numbers respectively correspond to the row numbers.

A difference from the first embodiment shown in FIG. 9 is that control timings of adjacent pixels in the same row that share the A/D converter 83 are shifted by a predetermined time. In FIG. 14, the timing shifted by the predetermined time is indicated by '. For example, the time shifted by the predetermined time from the time t1 is t1'. The method of shifting the control timing involves, for example, controlling the pixels in the leftward adjacent column by the time t1 with respect to the A/D converter 83 and controlling the pixels in the rightward adjacent column by the time t1' with respect to the same A/D converter 83.

For example, since the pixel reset control signal line RST 77-1 and the pixel transfer control signal line TRG 21-1 are turned on at the time t1, the electronic pixel shutters of the WL pixel 20 (1, 1), the WL pixel 20 (1, 3), the WL pixel 20 (1, 5), and the WL pixel 20 (1, 7) in the first row are released.

Subsequently, since the pixel reset control signal line RST 77-1 and the pixel transfer control signal line TRG 21-2 are turned on at the time t1', the electronic pixel shutters of the GL pixel 20 (1, 2) and the GL pixel 20 (1, 6) in the first row are released.

Further, since the pixel transfer control signal line TRG 21-1 and the pixel transfer control signal line TRG 21-2 are turned on at the times t9 and t9', respectively, with respect to those pixels and the charges accumulated in the PD 71 are transferred, the exposure is performed for only the exposure period ExpL1.

Further, since the pixel reset control signal line RST 77-1 and the pixel transfer control signal line TRG 21-3 are turned on at the time t5', the electronic pixel shutters of the GS pixel 20 (1, 4) and the GS pixel 20 (1, 8) in the first row are released. Furthermore, since the pixel transfer control signal line TRG 21-3 is turned on at the time t9' with respect to those pixels and the charges accumulated in the PD 71 are transferred, the exposure is performed for only the exposure period ExpS1.

As described above, each of the A/D converters 83 can be time-divisionally shared by the plurality of pixels in 1 line in the horizontal direction, and the pixels can be controlled so as to be exposed with different exposure periods.

Similar control can be performed with respect to the second row. For example, since the pixel reset control signal line RST 77-2 and the pixel transfer control signal lines TRG 22-2 and 22-3 are turned on at the time t2, the electronic pixel shutters of the RL pixel 20 (2, 1), the BL pixel 20 (2, 3), the RL pixel 20 (2, 5), and the BL pixel 20 (2, 7) in the second row are released. Further, since the pixel transfer control signal lines TRG 22-2 and 22-3 are turned on at the time t10 regarding those pixels and the charges accumulated in the PD 71 are transferred, the exposure is performed for only the exposure period ExpL2.

Further, since the pixel reset control signal line RST 77-2 and the pixel transfer control signal line TRG 22-1 are turned on at the time t6', the electronic pixel shutters of the WS pixel 20 (2, 2), the WS pixel 20 (2, 4), the WS pixel 20 (2, 6), and WS pixel 20 (2, 8) in the second row are released. Furthermore, since the pixel transfer control signal line TRG 22-1 is turned on at the time t10' with respect to those pixels and the charges accumulated in the PD 71 are transferred, the exposure is performed for only the exposure period ExpS2.

Similar control can be performed with respect to the third row. For example, since the pixel reset control signal line RST 77-3 and the pixel transfer control signal line TRG 23-1 are turned on at the time t3, the electronic pixel shutters of the WL pixel 20 (3, 1), the WL pixel 20 (3, 3), the WL pixel 20 (3, 5), and the WL pixel 20 (3, 7) in the third row are released.

Subsequently, since the pixel reset control signal line RST 77-3 and the pixel transfer control signal line TRG 23-2 are turned on at the time t3', the electronic pixel shutters of the GL pixel 20 (3, 4) and the GL pixel 20 (3, 8) in the third row are released. Further, since the pixel transfer control signal line TRG 23-1 and the pixel transfer control signal line TRG 23-2 are turned on at the times t11 and t11', respectively, and the charges accumulated in the PD 71 are transferred, the exposure is performed for only the exposure period ExpL3.

Further, since the pixel reset control signal line RST 77-3 and the pixel transfer control signal line TRG 23-3 are turned on at the time t7', the electronic pixel shutters of the GS pixel 20 (3, 2) and the GS pixel 20 (3, 6) in the third row are released. Furthermore, since the pixel transfer control signal line TRG 23-3 is turned on at the time t11' with respect to those pixels and the charges accumulated in the PD 71 are transferred, the exposure is performed for only the exposure period ExpS3.

Similar control can be performed with respect to the fourth row. It should be noted that since the pixel reset control signal line RST 77-4 is turned on at the times t4 and t4' but there is no pixel transfer control signal line TRG to be turned on at the same time in the fourth row, there is no pixel for which the electronic pixel shutter is to be released at the times t4 and t4'.

On the other hand, since the pixel reset control signal line RST 77-4 and the pixel transfer control signal lines TRG 24-2 and 24-3 are turned on at the time t8, the electronic pixel shutters of the BS pixel 20 (4, 1), the RS pixel 20 (4, 3), the BS pixel 20 (4, 5), and the RS pixel 20 (4, 7) in the fourth row are released.

Subsequently, since the pixel reset control signal line RST 77-4 and the pixel transfer control signal line TRG 24-1 are turned on at the time t8', the electronic pixel shutters of the WS pixel 20 (4, 2), the WS pixel 20 (4, 4), the WS pixel 20 (4, 6), and the WS pixel 20 (4, 8) in the fourth row are released. Further, since the pixel transfer control signal lines TRG 24-2 and 24-3 are turned on at the time t12, the pixel transfer control signal line TRG 24-1 is turned on at the time t12', and the charges accumulated in the PD 71 are transferred, the exposure is performed for only the exposure period ExpS4.

As described above, according to the second embodiment of the present technique, by providing three pixel transfer control signal lines TGR per row in the horizontal direction and controlling the pixel transfer control signal lines TGR regarding the CIS that has the color filter arrangement including the W pixels and the structure in which the adjacent two columns share the same A/D converter, pixels of different exposure times can be mixed in the same row, and the image pickup of a high dynamic range can therefore be realized. Moreover, it is also compatible with a color shutter for compensating for the color filter sensitivity differences.

It should be noted that although the exposure control pattern shown in FIG. 2 is taken as an example in the descriptions above, in the second embodiment, the exposure control patterns shown in FIGS. 4, 5, and 6 can be realized by exchanging the arrangements of the long exposure pixels and the short exposure pixels by switching on/off the pixel transfer control signal lines TGR as in the first embodiment. This method is essentially the same as that described in the first embodiment, so descriptions thereof will be omitted.

Third Embodiment

In a third embodiment of the present technique, a circuit structure in which 4 pixels in the vertical direction share a single FD (Floating Diffusion) will be described. It should be noted that in the following, descriptions on the parts that are common with the image pickup device of the first embodiment will partially be omitted.

<Structural Example of Vertical Direction 4-Pixel Sharing Pixel Circuit>

Figure 15:
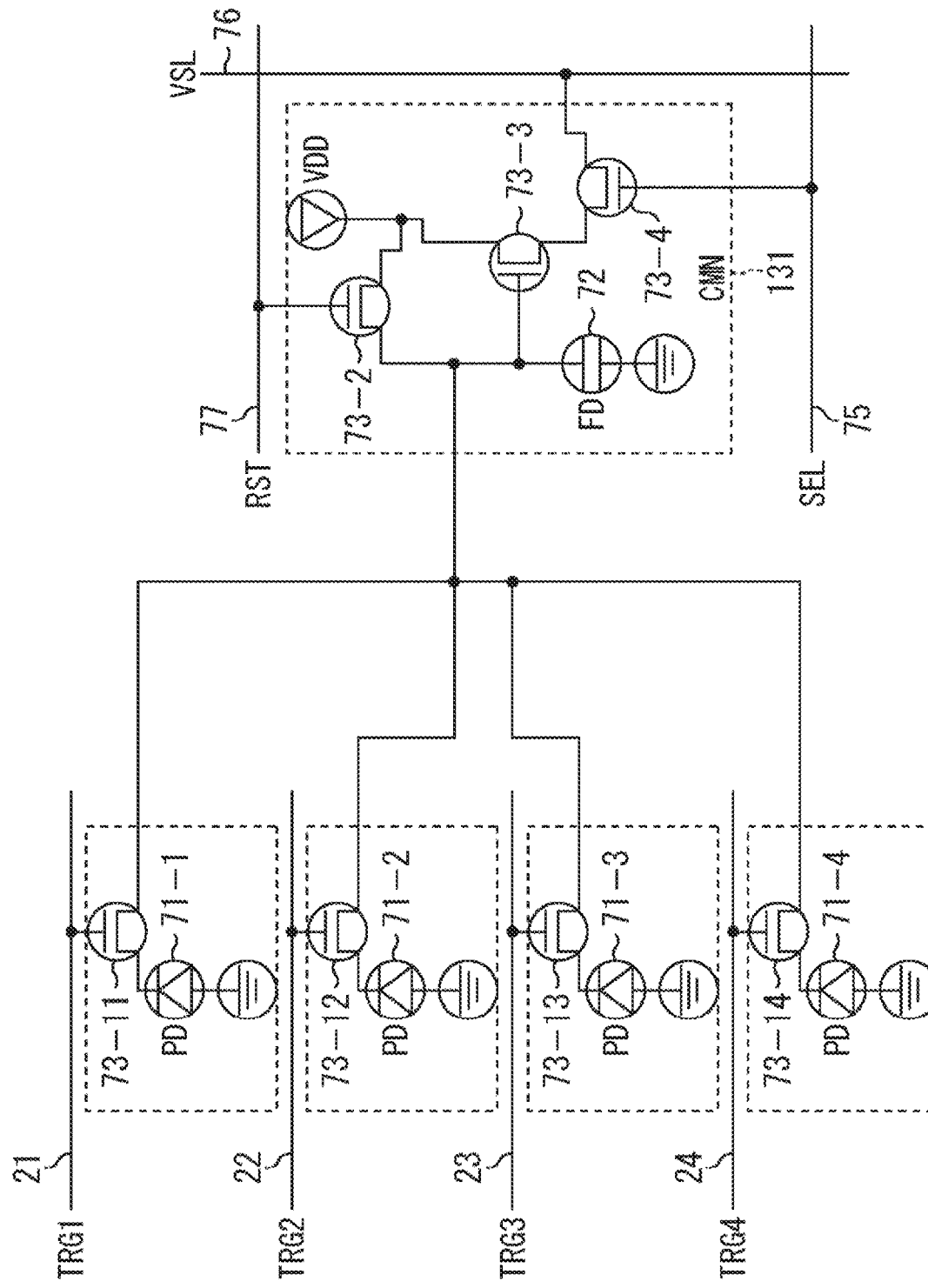
FIG. 15 A diagram showing a structural example of a basic circuit of pixels included in an image pickup device according to a third embodiment.

FIG. 15 is a diagram showing a structural example of a basic circuit of pixels included in an image pickup device according to the third embodiment of the present technique. FIG. 15 shows a vertical direction 4-pixel sharing pixel circuit in which 4 pixels consecutively arranged in the vertical direction are connected to a single FD 72 via pixel transfer transistors 73-11 to 73-14 and share the circuit structure CMN 131 subsequent to the FD 72.

The pixels are connected to the pixel transfer control signal lines TRG 21 to 24, the pixel readout selection control signal line SEL 75, the vertical signal line (readout line) VSL 76, and the pixel reset control signal line RST 77. It should be noted that the structures and operations other than the point that 4-pixel sharing is performed are substantially the same as those of the pixel circuit shown in FIG. 7. Therefore, specific descriptions will be omitted herein.

<Structural Example of Pixel Control Circuit and Pixel Wirings>

Figure 16:
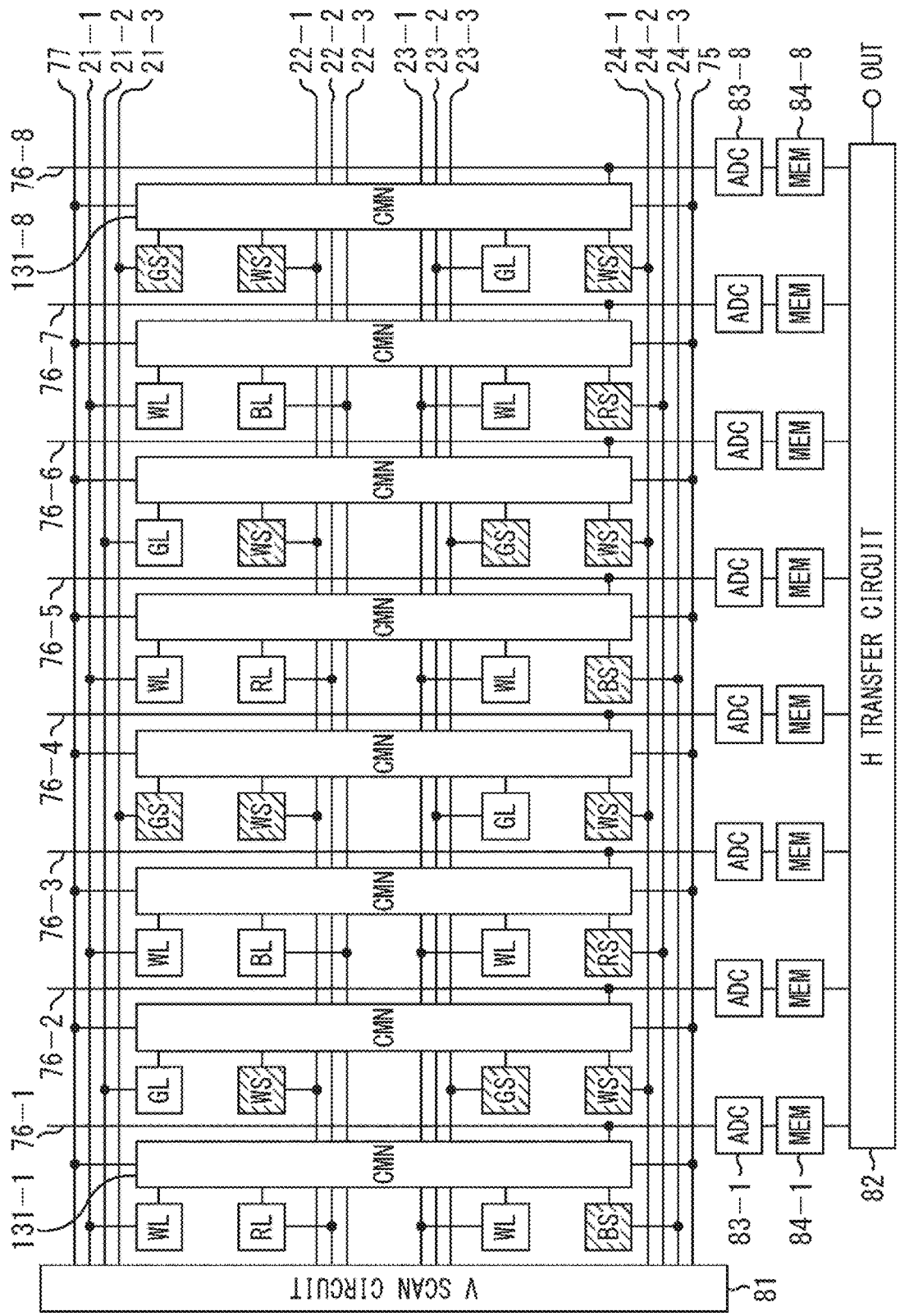
FIG. 16 A diagram showing a structural example of a pixel control circuit and pixel wirings in the image pickup device according to the third embodiment.

FIG. 16 is a diagram showing a structural example of the pixel control circuit and pixel wirings in the image pickup device according to the third embodiment of the present technique. The basic structure of the pixel control circuit and pixel wirings in the image pickup device shown in FIG. 16 is the same as that of the pixel control circuit and pixel wirings in the image pickup device according to the first embodiment shown in FIG. 8. Therefore, the same parts are denoted by the same symbols, and descriptions will be omitted.

In the first embodiment described with reference to FIG. 8, the 4 pixels arranged in the vertical direction have independent circuit structures. However, in FIG. 16, since the structure CMN 131 subsequent to the FD 72 is shared by those pixels, the pixel readout selection control signal line SEL 75 and the pixel reset control signal line RST 77 are provided every 4 rows. In addition, the connections with respect to the vertical signal line (readout line) VSL 76 are also considered a single connection via the CMN 131 regarding the vertical 4 pixels.

<Timing Chart Example of Control Signals>

Figure 17:
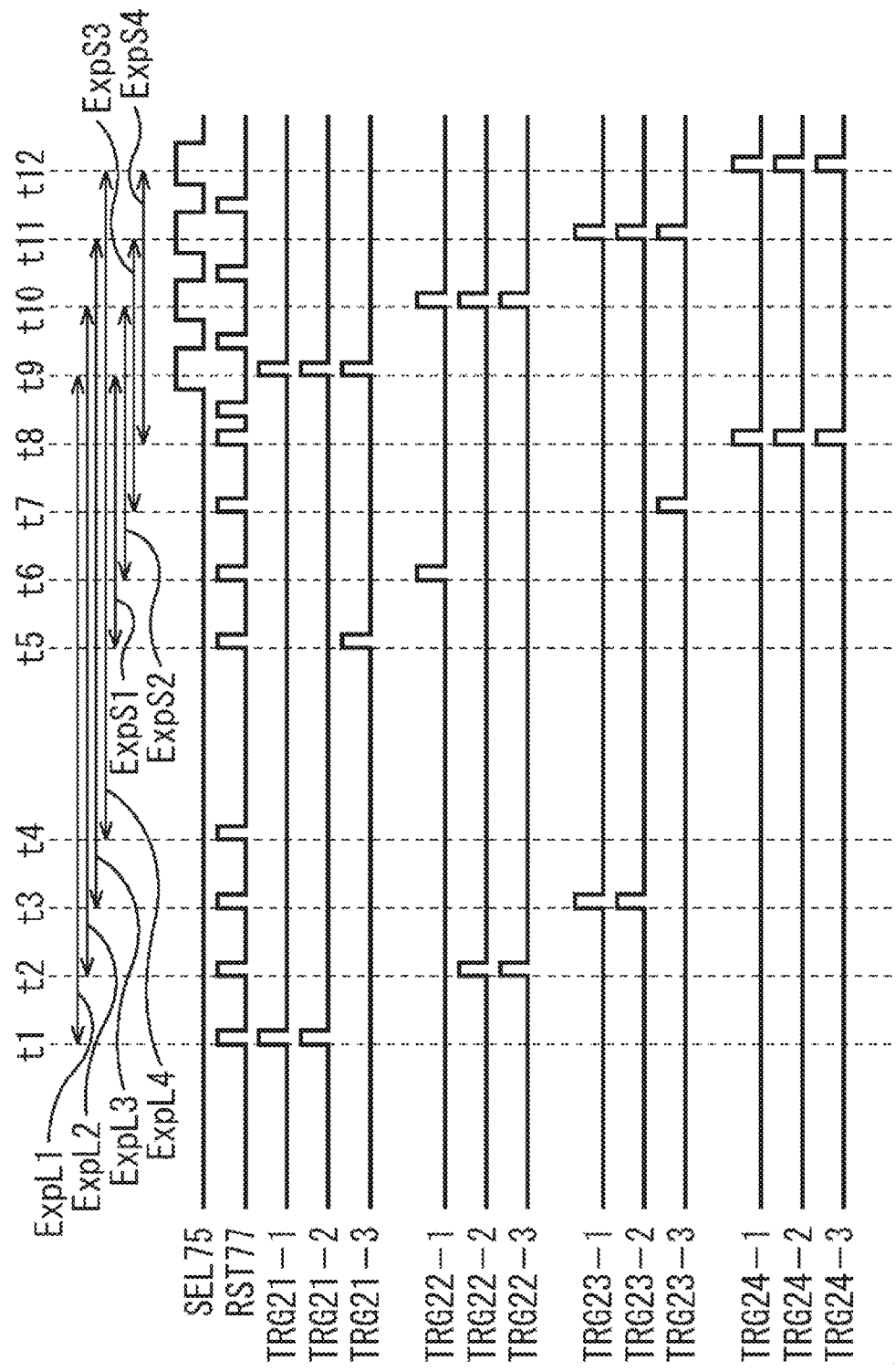
FIG. 17 A timing chart schematically showing control signals to the pixels constituting the image pickup device according to the third embodiment.

FIG. 17 is a timing chart schematically showing control signals to the pixels constituting the image pickup device according to the third embodiment of the present technique. FIG. 17 shows the timing chart of the control signal lines with respect to the pixels corresponding to 4 rows shown in FIG. 16. The abscissa axis is the time axis. The periods indicated by the both-headed arrows ExpL1 to ExpL4 and ExpS1 to ExpS4 at the upper portion of the figure each represent the exposure period, ExpL1 to ExpL4 represent the exposure periods of long exposure pixels, ExpS1 to ExpS4 represent the exposure periods of short exposure pixels, and the numbers respectively correspond to the row numbers.

A difference from the first embodiment shown in FIG. 9 is that pixel reset control signals and pixel readout selection control signals supplied via the pixel reset control signal line RST 77-1 of each row and the pixel readout selection control signal line SEL 75-1 of each row are supplied from one pixel reset control signal line RST 77 and one pixel readout selection control signal line SEL 75.

By sharing those signal lines, a restriction that signals cannot be supplied at a timing at which the signals are superimposed on each other occurs, but within the restriction range, a desired sensitivity pattern can be generated by appropriately controlling on/off of the three pixel transfer control signal lines TGR per row in the horizontal direction at the pixel reset timings in the third embodiment as in the first embodiment.

Referring to the timing chart shown in FIG. 17, the timings of the control signals to the pixels constituting the image pickup device according to the third embodiment and the readout of the pixels will be described.

Control with respect to the pixels of the first row shown in FIG. 16 will be described. For example, since the pixel reset control signal line RST 77 and the pixel transfer control signal lines TRG 21-1 and 21-2 are turned on at the time t1, the electronic pixel shutters of the WL pixel 20 (1, 1), the WL pixel 20 (1, 3), the WL pixel 20 (1, 5), the WL pixel 20 (1, 7), the GL pixel 20 (1, 2), and the GL pixel 20 (1, 6) in the first row are released.

Further, since the pixel transfer control signal lines TRG 21-1 and 21-2 are turned on at the time t9 regarding those pixels and the charges accumulated in the PD 71 are transferred, the period from the time t1 to the time t9 (ExpL1) becomes the exposure period.

Furthermore, since the pixel reset control signal line RST 75 and the pixel transfer control signal line TRG 21-3 are turned on at the time t5, the electronic pixel shutters of the GS pixel 20 (1, 4) and the GS pixel 20 (1, 8) in the first row are released. Moreover, since the pixel transfer control signal line TRG 21-3 is turned on at the time t9 regarding those pixels and the charges accumulated in the PD 71 are transferred, the period from the time t5 to the time t9 (ExpS1) becomes the exposure period.

Similar control can be performed with respect to the second row. For example, since the pixel reset control signal line RST 77 and the pixel transfer control signal lines TRG 22-2 and 22-3 are turned on at the time t2, the electronic pixel shutters of the RL pixel 20 (2, 1), the RL pixel 20 (2, 5), the BL pixel 20 (2, 3), and the BL pixel 20 (2, 7) in the second row are released. Further, since the pixel transfer control signal lines TRG 22-2 and 22-3 are turned on at the time t10 regarding those pixels and the charges accumulated in the PD 71 are transferred, the period from the time t2 to the time t10 (ExpL2) becomes the exposure period.

Furthermore, since the pixel reset control signal line RST 77 and the pixel transfer control signal line TRG 22-1 are turned on at the time t6, the electronic pixel shutters of the WS pixel 20 (2, 2), the WS pixel 20 (2, 4), the WS pixel 20 (2, 6), and the WS pixel 20 (2, 8) in the second row are released. Moreover, since the pixel transfer control signal line TRG 22-1 is turned on at the time t10 regarding those pixels and the charges accumulated in the PD 71 are transferred, the period from the time t6 to the time t10 (ExpS2) becomes the exposure period.

Similar control can be performed with respect to the third row. For example, since the pixel reset control signal line RST 77 and the pixel transfer control signal lines TRG 23-1 and 23-2 are turned on at the time t3, the electronic pixel shutters of the WL pixel 20 (3, 1), the WL pixel 20 (3, 3), the WL pixel 20 (3, 5), the WL pixel 20 (3, 7), the GL pixel 20 (3, 4), and the GL pixel 20 (3, 8) in the third row are released.

Further, since the pixel transfer control signal lines TRG 23-1 and 23-2 are turned on at the time t11 regarding those pixels and the charges accumulated in the PD 71 are transferred, the period from the time t3 to the time t11 (ExpL3) becomes the exposure period.

Furthermore, since the pixel reset control signal line RST 77 and the pixel transfer control signal line TRG 23-3 are turned on at the time t7, the electronic pixel shutters of the GS pixel 20 (3, 2) and the GS pixel 20 (3, 6) in the third row are released. Moreover, since the pixel transfer control signal line TRG 23-3 is turned on at the time t11 regarding those pixels and the charges accumulated in the PD 71 are transferred, the period from the time t7 to the time t11 (ExpS3) becomes the exposure period.

Similar control can be performed with respect to the fourth row. It should be noted that regarding the fourth row, the pixel reset control signal line RST 77 is turned on at the time t4, but since there is no pixel transfer control signal line 24 to be turned on at the same time, there is no pixel for which the electronic pixel shutter is to be released at the time t4.

Since the pixel reset control signal line RST 77 and the pixel transfer control signal lines TRG 24-1, 24-2, and 24-3 are turned on at the time t8, the electronic pixel shutters of all the pixels in the fourth row are released. In other words, the electronic pixel shutters of the BS pixel 20 (4, 1), the WS pixel 20 (4, 2), the RS pixel 20 (4, 3), the WS pixel 20 (4, 4), the BS pixel 20 (4, 5), the WS pixel 20 (4, 6), the RS pixel 20 (4, 7), and the WS pixel 20 (4, 8) are released.

Further, since the pixel transfer control signal lines TRG 24-1, 24-2, and 24-3 are turned on at the time t12 regarding those pixels and the charges accumulated in the PD 71 are transferred, the period from the time t8 to the time t12 (ExpS4) becomes the exposure period.

As described above, a desired sensitivity pattern can be generated by appropriately controlling on/off of the three pixel transfer control signal lines TGR per row in the horizontal direction at the pixel reset timings.

It should be noted that although the exposure control pattern shown in FIG. 2 is taken as an example in the descriptions above, in the third embodiment, the exposure control patterns shown in FIGS. 4, 5, and 6 can be realized by exchanging the arrangements of the long exposure pixels and the short exposure pixels by switching on/off the pixel transfer control signal lines TGR as in the first embodiment. This method is essentially the same as that described in the first embodiment, so descriptions thereof will be omitted.

Fourth Embodiment

In a fourth embodiment of the present technique, a circuit structure in which a single FD 72 is shared by 4×2=8 (vertical direction×horizontal direction) pixels will be described. It should be noted that in the following, descriptions on the parts that are common with the image pickup device of the first embodiment will partially be omitted.

<Structural Example of 8-Pixel Sharing Pixel Circuit>

Figure 18:
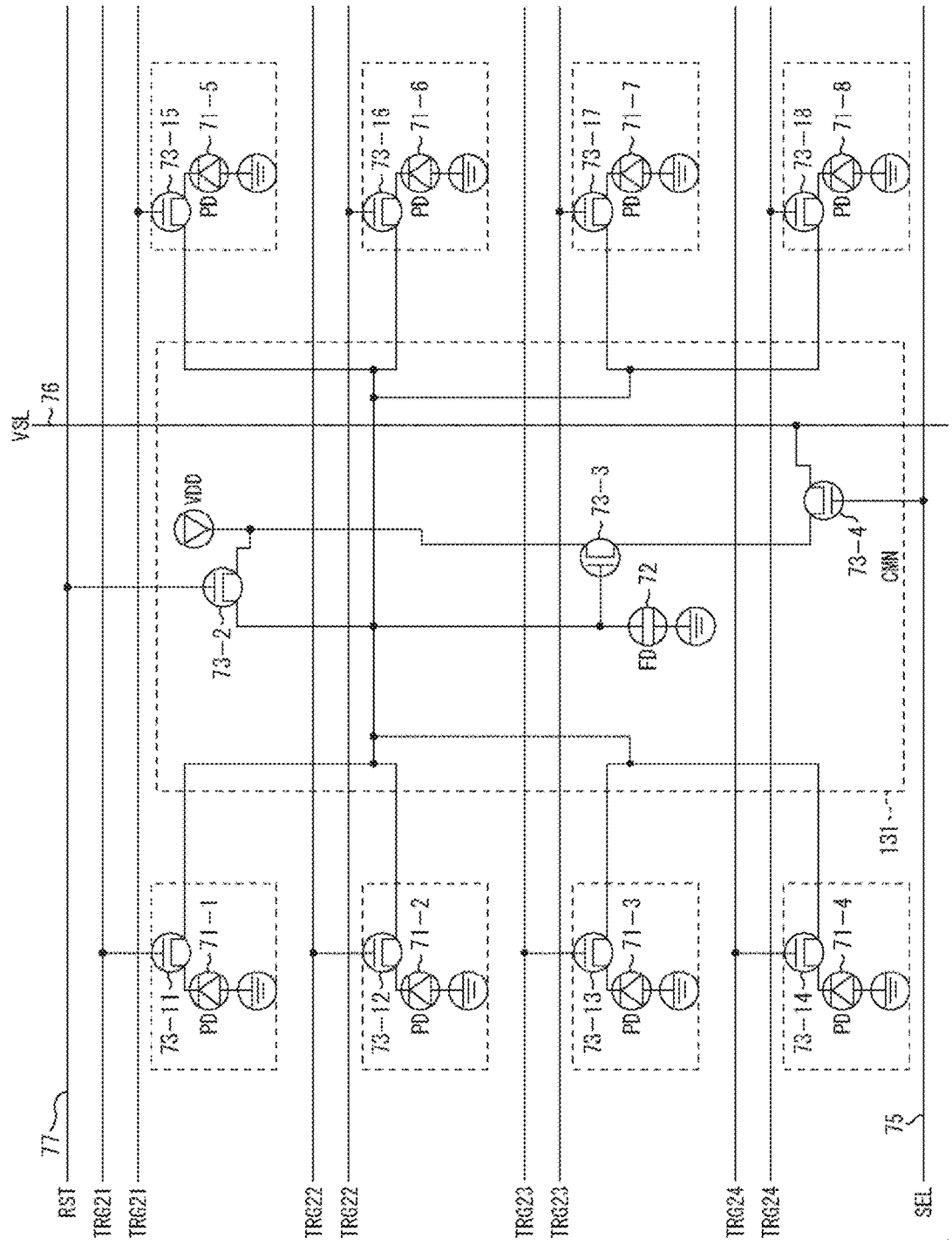
FIG. 18 A diagram showing a structural example of a basic circuit of pixels included in an image pickup device according to a fourth embodiment.

FIG. 18 is a diagram showing a structural example of a basic circuit of pixels included in an image pickup device according to the fourth embodiment of the present technique. FIG. 18 shows an 8-pixel sharing pixel circuit in which 4×2=8 pixels consecutively arranged in the vertical direction and the horizontal direction are connected to a single FD 72 via pixel transfer transistors 73-11 to 73-18 and share the circuit structure CMN 131 subsequent to the FD 72.

The pixels are connected to the pixel transfer control signal lines TRG 21 to 24, the pixel readout selection control signal line SEL 75, the vertical signal line (readout line) VSL 76, and the pixel reset control signal line RST 77. It should be noted that the structures and operations other than the point that 8-pixel sharing is performed are substantially the same as those of the pixel circuit shown in FIG. 7. Therefore, specific descriptions will be omitted herein.

<Structural Example of Pixel Control Circuit and Pixel Wirings>

Figure 19:
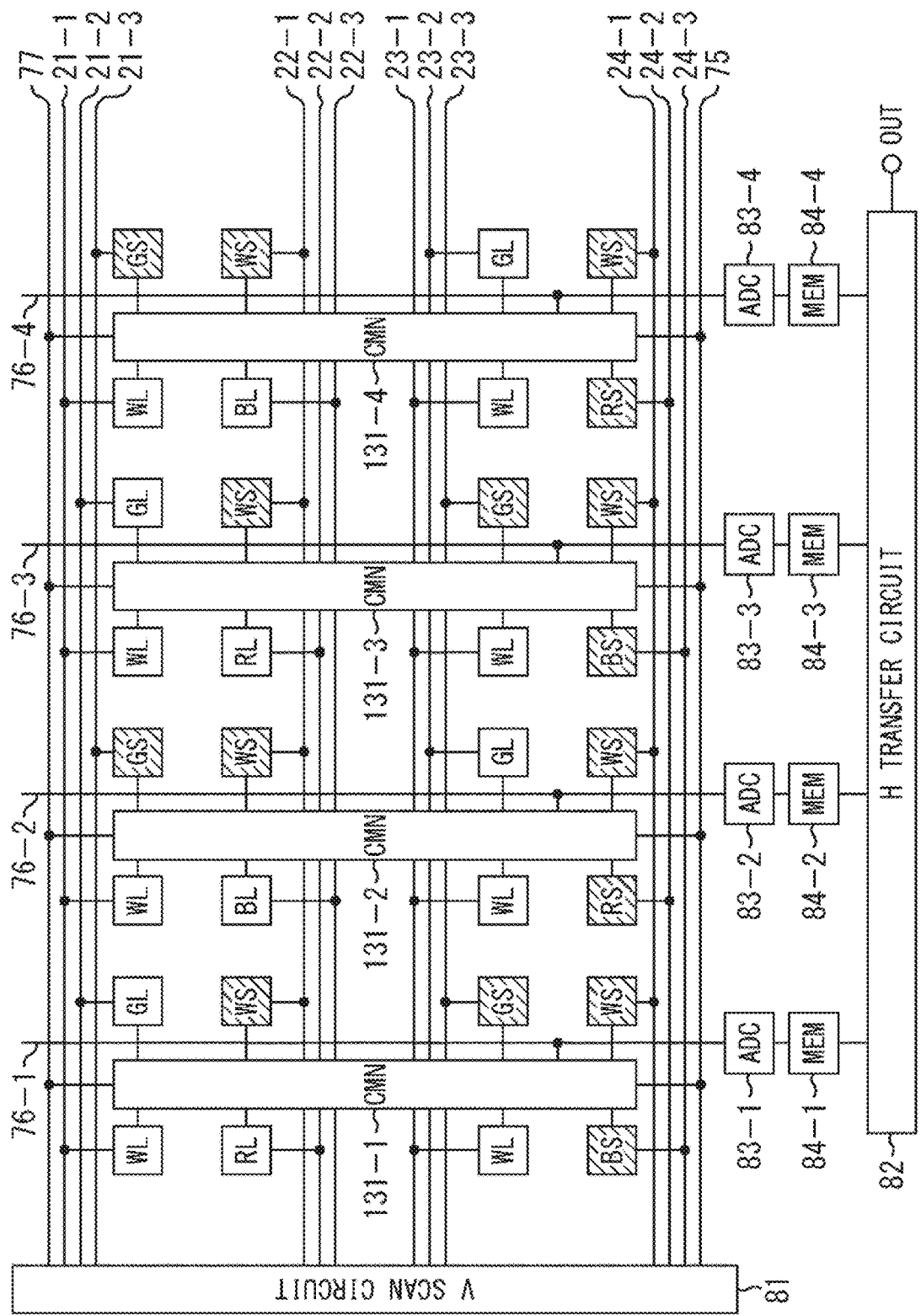
FIG. 19 A diagram showing a structural example of a pixel control circuit and pixel wirings in the image pickup device according to the fourth embodiment.

FIG. 19 is a diagram showing a structural example of the pixel control circuit and pixel wirings in the image pickup device according to the fourth embodiment of the present technique. In the first embodiment described with reference to FIG. 8, the 4×2=8 pixels arranged in the vertical direction and the horizontal direction have independent circuit structures. However, in FIG. 19, since the structure CMN 131 subsequent to the FD 72 is shared by those pixels, the pixel readout selection control signal line SEL 75 and the pixel reset control signal line RST 77 are provided every 4 rows. In addition, the vertical signal line (readout line) VSL 76 is provided every 2 rows, and the connections with respect to the vertical signal line (readout line) VSL 76 are also considered a single connection regarding the 4×2 pixels.

<Timing Chart Example of Control Signals>

Figure 20:
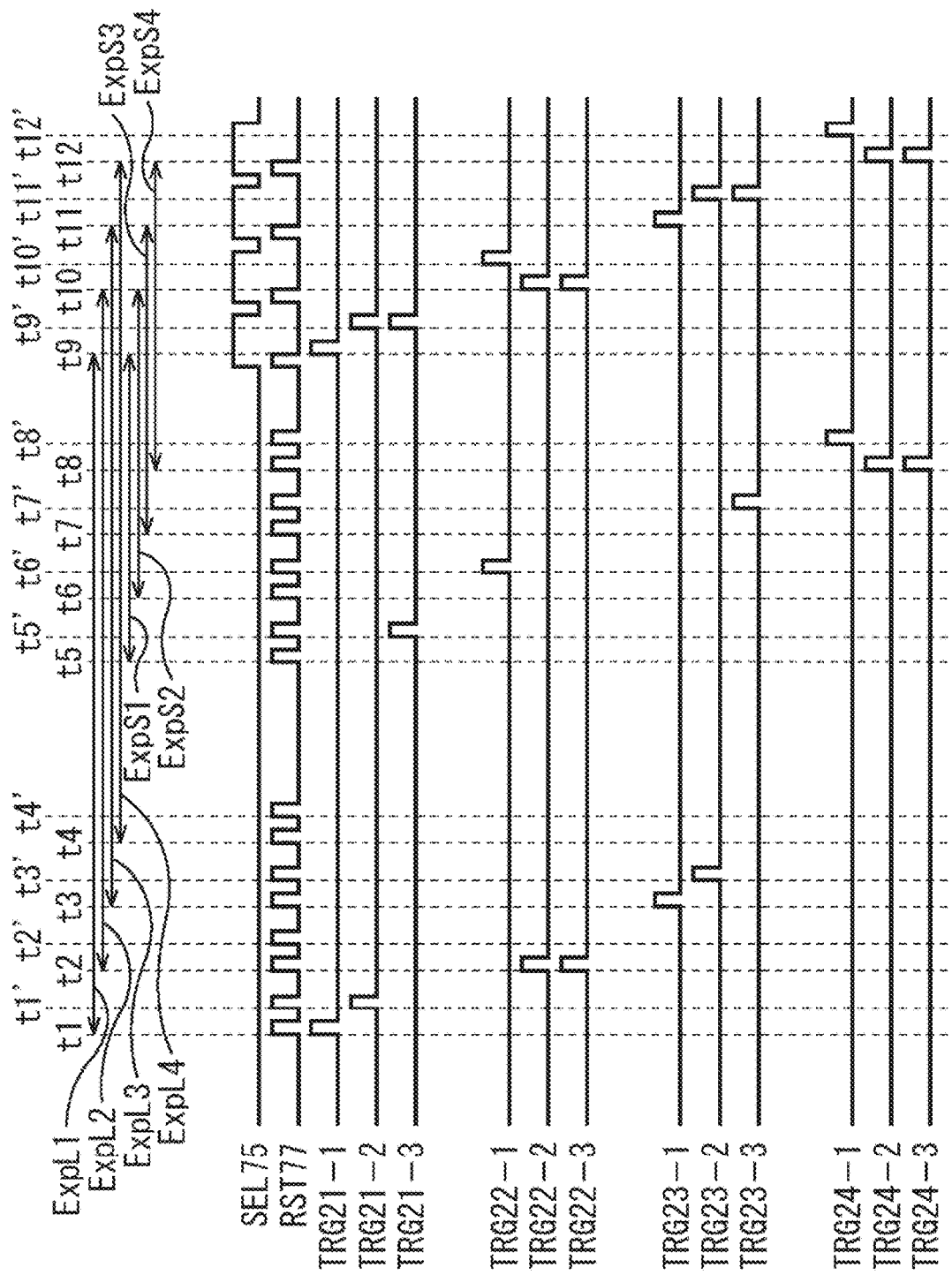
FIG. 20 A timing chart schematically showing control signals to the pixels constituting the image pickup device according to the fourth embodiment.

FIG. 20 is a timing chart schematically showing control signals to the pixels constituting the image pickup device according to the fourth embodiment of the present technique. FIG. 20 shows the timing chart of the control signal lines with respect to the pixels corresponding to 4 rows shown in FIG. 19. The abscissa axis is the time axis. The periods indicated by the both-headed arrows ExpL1 to ExpL4 and ExpS1 to ExpS4 at the upper portion of the figure each represent the exposure period, ExpL1 to ExpL4 represent the exposure periods of long exposure pixels, ExpS1 to ExpS4 represent the exposure periods of short exposure pixels, and the numbers respectively correspond to the row numbers.

In the fourth embodiment, since the vertical signal line (readout line) VSL 76 is shared by two adjacent columns, the A/D converter 83 is also shared by the two adjacent columns. Therefore, as in the second embodiment in which the two adjacent columns share the A/D converter 83, there is a need to perform control such that the two pixels adjacent in the horizontal direction are time-divisionally read out at different timings. In the second embodiment, the time-divisional readout is realized by shifting the pixel transfer control signals with respect to the adjacent columns by a predetermined time as in the case shown in FIG. 14.

In the fourth embodiment, the pixel transfer control signals with respect to the adjacent columns are shifted by a predetermined time and supplied as in the second embodiment.

For example, at the time t1, pixel transfer control signals are supplied from the pixel transfer control signal line TRG 21-1 to the WL pixel 20 (1, 1), the WL pixel 20 (1, 3), the WL pixel 20 (1, 5), and the WL pixel 20 (1, 7) in the first row, and the pixel transfer control signals are supplied from the pixel transfer control signal line TRG 21-2 to the GL pixel 20 (1, 2) and the GL pixel 20 (1, 6) in the first row at the time t1'.

Furthermore, at the time t9, by supplying, simultaneous with the supply of a pixel readout selection control signal to the pixel readout selection control signal line SEL 75, the pixel transfer control signals from the pixel transfer control signal line TRG 21-1 to the WL pixel 20 (1, 1), the WL pixel 20 (1, 3), the WL pixel 20 (1, 5), and the WL pixel 20 (1, 7) in the first row, signals of the WL pixels 20 are read out. Further, by supplying the pixel transfer control signals from the pixel transfer control signal line TRG 21-2 to the GL pixels in the first row at the time t9', signals of the GL pixel 20 (1, 2) and the GL pixel 20 (1, 6) are read out.

Since the times t1 and t1' and the times t9 and t9' are shifted only by the same predetermined time, the WL pixels 20 and the GL pixels 20 in the first row are exposed for only the exposure period ExpL1. Furthermore, since the pixel readout selection control signal line SEL 75 and the pixel reset control signal line RST 77 are shared by the pixels across 4 rows in the fourth embodiment, the pixel reset control signals and the pixel readout selection control signals for the 4 rows are supplied from the single pixel readout selection control signal line SEL 75 and the single pixel reset control signal line RST 77 similar to the control of the third embodiment shown in FIG. 17.

It should be noted that although the exposure control pattern shown in FIG. 2 is taken as an example in the descriptions above, in the fourth embodiment, the exposure control patterns shown in FIGS. 4, 5, and 6 can be realized by exchanging the arrangements of the long exposure pixels and the short exposure pixels by switching on/off the pixel transfer control signal lines TGR as in the first embodiment. This method is essentially the same as that described in the first embodiment, so descriptions thereof will be omitted.

Fifth Embodiment

The first to fourth embodiments of the present technique have described the examples of the image pickup device in which at least three pixel transfer control signal lines are connected to the plurality of pixels that constitute 1 line and have different exposure timings. In the following, an example of an image pickup apparatus including those image pickup devices will be described.

<Functional Structure Example of Image Pickup Apparatus>

Figure 21:
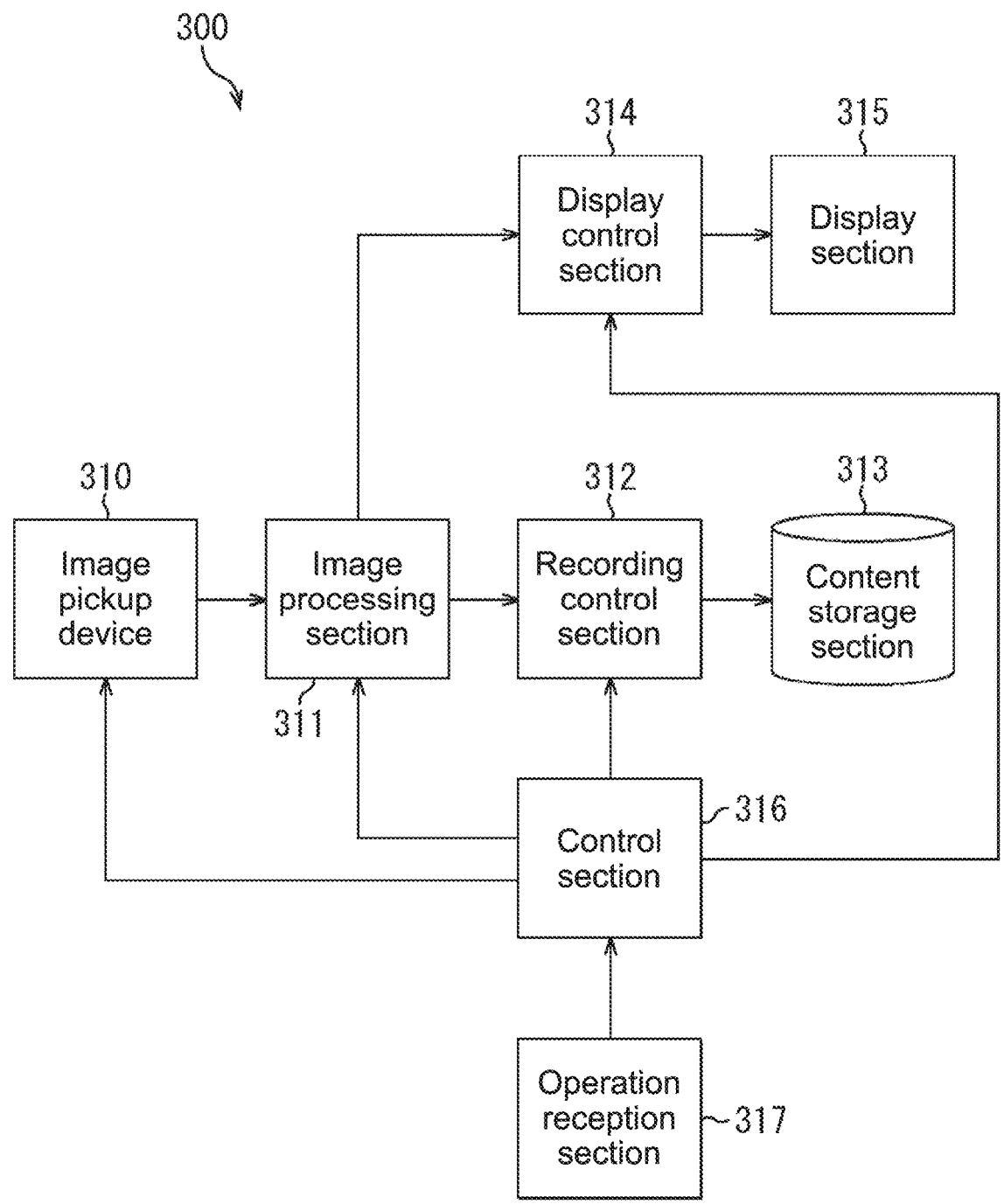
FIG. 21 A block diagram showing a functional structure example of an image pickup apparatus according to a fifth embodiment.

FIG. 21 is a block diagram showing a functional structure example of an image pickup apparatus according to a fifth embodiment of the present technique. The image pickup apparatus 300 includes an image pickup device 310, an image processing section 311, a recording control section 312, a content storage section 313, a display control section 314, a display section 315, a control section 316, and an operation reception section 317.

The image pickup device 310 generates an image signal based on an instruction from the control section 316 and outputs the generated image signal to the image processing section 311. Specifically, the image pickup device 310 converts light of an object that has entered via an optical system (not shown) into electrical signals. It should be noted that the image pickup device 310 corresponds to the image pickup devices according to the first to fourth embodiments of the present technique. Moreover, the optical system is constituted of a lens group that collects incident light from the object and a diaphragm, and light collected by the lens group enters the image pickup device 310 via the diaphragm.

The image processing section 311 carries out various types of image processing on the image signals (digital signals) output from the image pickup device 310 based on the instruction from the control section 316. Then, the image processing section 311 outputs the image signals (image data) subjected to the various types of image processing to the recording control section 312 and the display control section 314. The recording control section 312 performs recording control on the content storage section 313 based on the instruction from the control section 316. For example, the recording control section 312 causes the content storage section 313 to record the image (image data) output from the image processing section 311 as an image content (still image file or moving image file).

The content storage section 313 is a recording medium that stores various types of information (image content etc.) under control of the recording control section 312. It should be noted that the content storage section 313 may be incorporated into the image pickup apparatus 300 or may be detachable from the image pickup apparatus 300.

Based on the instruction from the control section 316, the display control section 314 causes the display section 315 to display the image output from the image processing section 311. For example, the display control section 314 causes the display section 315 to display a display screen for performing various operations related to image pickup operations and images generated by the image pickup device 310 (so-called through images).

The display section 315 is a display panel that displays various images under control of the display control section 314. The control section 316 controls the respective sections of the image pickup apparatus 300 based on a control program stored in a memory (not shown). For example, the control section 316 performs output control (display control) or recording control of the image signals (image data) subjected to the image processing by the image processing section 311. The operation reception section 317 is an operation reception section that receives a user operation and outputs a control signal (operation signal) corresponding to the received operation content to the control section 316.

<Operation of Image Processing Section>

Next, the operation of the image processing section 311 will be described. The image pickup device of the present technique outputs RAW data in which pixels subjected to the two types of exposures, that is, the long exposure and the short exposure, are mixed in the 4-row color arrangement including the W pixels. The image processing section 311 carries out processing of generating RGB image data from the RAW data.

Figure 22:
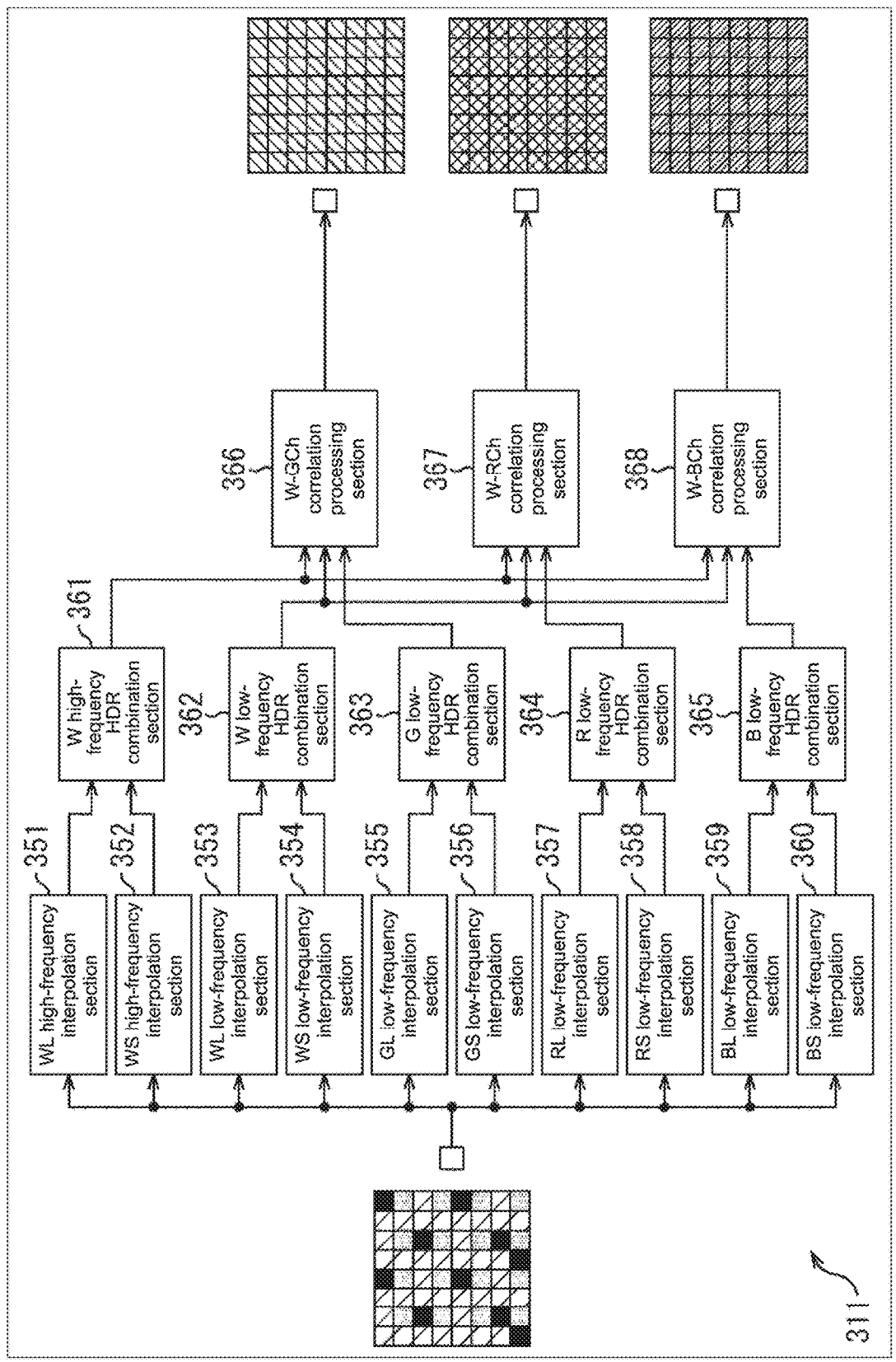
FIG. 22 A block diagram showing a functional structure example of an image processing section according to the fifth embodiment.

FIG. 22 is a block diagram showing a functional structure example of the image processing section 311 according to the fifth embodiment of the present technique. The image processing section 311 inputs RAW data in which pixels subjected to the two types of exposures, that is, the long exposure and the short exposure, are mixed in the 4-row color arrangement including the W pixels, and outputs RGB image data, that is, an image including R, G, and B across all the pixels.

It should be noted that the 4 rows including the W pixels are RGB+W, and the color arrangement and the exposure control pattern are those shown in FIG. 2. The image processing section 311 is constituted of a WL high-frequency interpolation section 351, a WS high-frequency interpolation section 352, a WL low-frequency interpolation section 353, a WS low-frequency interpolation section 354, a GL low-frequency interpolation section 355, a GS low-frequency interpolation section 356, an RL low-frequency interpolation section 357, an RS low-frequency interpolation section 358, a BL low-frequency interpolation section 359, a BS low-frequency interpolation section 360, a W high-frequency HDR combination section 361, a W low-frequency HDR combination section 362, a G low-frequency HDR combination section 363, an R low-frequency HDR combination section 364, a B low-frequency HDR combination section 365, a W-GCh correlation processing section 366, a W-RCh correlation processing section 367, and a W-BCh correlation processing section 368.

The WL high-frequency interpolation section 351 interpolates signals of the WL pixels 20 arranged alternately in a square lattice in all the pixels using an interpolation filter. For example, a 2D FIR (Finite Impulse Response) filter having coefficients as shown in FIG. 23 is applied to all the pixel positions. Here, so that the center position of the 9×9 coefficients corresponds to the pixel position for which an interpolation value is to be calculated (interpolation pixel position), a filter calculation is performed using the relevant coefficient with respect to the pixel position at which the WL pixel is present within the range of 9×9 pixels around the interpolation pixel position and setting the coefficient to 0 at the pixel positions excluding the WL pixels. It should be noted that the coefficients shown in FIG. 23 are mere examples and are not limited thereto.

The WS high-frequency interpolation section 352 interpolates signals of the WS pixels 20 arranged at a 2-pixel pitch in a square lattice in all the pixels using an interpolation filter. For example, the 2D FIR filter having the coefficients as shown in FIG. 23 is applied to all the pixel positions. Here, so that the center position of the 9×9 coefficients corresponds to the pixel position for which an interpolation value is to be calculated (interpolation pixel position), a filter calculation is performed using the relevant coefficient with respect to the pixel position at which the WS pixel is present within the range of 9×9 pixels around the interpolation pixel position and setting the coefficient to 0 at the pixel positions excluding the WS pixels.

The WL low-frequency interpolation section 353 interpolates signals of the WL pixels 20 arranged at a 2-pixel pitch in a square lattice in all the pixels using an interpolation filter. For example, the 2D FIR filter having coefficients as shown in FIG. 24 is applied to all the pixel positions. Here, so that the center position of the 9×9 coefficients corresponds to the pixel position for which an interpolation value is to be calculated (interpolation pixel position), a filter calculation is performed using the relevant coefficient with respect to the pixel position at which the WL pixel is present within the range of 9×9 pixels around the interpolation pixel position and setting the coefficient to 0 at the pixel positions excluding the WL pixels. It should be noted that the coefficients shown in FIG. 24 are mere examples and are not limited thereto.

The WS low-frequency interpolation section 354 interpolates signals of the WS pixels 20 arranged at a 2-pixel pitch in a square lattice in all the pixels using an interpolation filter. For example, the 2D FIR filter having the coefficients as shown in FIG. 24 is applied to all the pixel positions.

Here, so that the center position of the 9×9 coefficients corresponds to the pixel position for which an interpolation value is to be calculated (interpolation pixel position), a filter calculation is performed using the relevant coefficient with respect to the pixel position at which the WS pixel is present within the range of 9×9 pixels around the interpolation pixel position and setting the coefficient to 0 at the pixel positions excluding the WS pixels.

The GL low-frequency interpolation section 355 interpolates signals of the GL pixels 20 arranged at a 4-pixel pitch in a checkerboard lattice in all the pixels using an interpolation filter. For example, the 2D FIR filter having the coefficients as shown in FIG. 24 is applied to all the pixel positions. Here, so that the center position of the 9×9 coefficients corresponds to the pixel position for which an interpolation value is to be calculated (interpolation pixel position), a filter calculation is performed using the relevant coefficient with respect to the pixel position at which the GL pixel is present within the range of 9×9 pixels around the interpolation pixel position and setting the coefficient to 0 at the pixel positions excluding the GL pixels.

The GS low-frequency interpolation section 356 interpolates signals of the GS pixels 20 arranged at a 4-pixel pitch in a checkerboard lattice in all the pixels using an interpolation filter. For example, the 2D FIR filter having the coefficients as shown in FIG. 24 is applied to all the pixel positions. Here, so that the center position of the 9×9 coefficients corresponds to the pixel position for which an interpolation value is to be calculated (interpolation pixel position), a filter calculation is performed using the relevant coefficient with respect to the pixel position at which the GS pixel is present within the range of 9×9 pixels around the interpolation pixel position and setting the coefficient to 0 at the pixel positions excluding the GS pixels.

The RL low-frequency interpolation section 357 interpolates signals of the RL pixels 20 arranged at a 4-pixel pitch in a square lattice in all the pixels using an interpolation filter. For example, the 2D FIR filter having the coefficients as shown in FIG. 24 is applied to all the pixel positions. Here, so that the center position of the 9×9 coefficients corresponds to the pixel position for which an interpolation value is to be calculated (interpolation pixel position), a filter calculation is performed using the relevant coefficient with respect to the pixel position at which the RL pixel is present within the range of 9×9 pixels around the interpolation pixel position and setting the coefficient to 0 at the pixel positions excluding the RL pixels.

The RS low-frequency interpolation section 358 interpolates signals of the RS pixels 20 arranged at a 4-pixel pitch in a square lattice in all the pixels using an interpolation filter. For example, the 2D FIR filter having the coefficients as shown in FIG. 24 is applied to all the pixel positions. Here, so that the center position of the 9×9 coefficients corresponds to the pixel position for which an interpolation value is to be calculated (interpolation pixel position), a filter calculation is performed using the relevant coefficient with respect to the pixel position at which the RS pixel is present within the range of 9×9 pixels around the interpolation pixel position and setting the coefficient to 0 at the pixel positions excluding the RS pixels.

The BL low-frequency interpolation section 359 interpolates signals of the BL pixels 20 arranged at a 4-pixel pitch in a square lattice in all the pixels using an interpolation filter. For example, the 2D FIR filter having the coefficients as shown in FIG. 24 is applied to all the pixel positions. Here, so that the center position of the 9×9 coefficients corresponds to the pixel position for which an interpolation value is to be calculated (interpolation pixel position), a filter calculation is performed using the relevant coefficient with respect to the pixel position at which the BL pixel is present within the range of 9×9 pixels around the interpolation pixel position and setting the coefficient to 0 at the pixel positions excluding the BL pixels.

The BS low-frequency interpolation section 360 interpolates signals of the BS pixels 20 arranged at a 4-pixel pitch in a square lattice in all the pixels using an interpolation filter. For example, the 2D FIR filter having the coefficients as shown in FIG. 24 is applied to all the pixel positions. Here, so that the center position of the 9×9 coefficients corresponds to the pixel position for which an interpolation value is to be calculated (interpolation pixel position), a filter calculation is performed using the relevant coefficient with respect to the pixel position at which the BS pixel is present within the range of 9×9 pixels around the interpolation pixel position and setting the coefficient to 0 at the pixel positions excluding the BS pixels.

The W high-frequency HDR combination section 361 carries out processing of combining a WL high-frequency pixel value interpolated in all the pixels, that has been output from the WL high-frequency interpolation section 351, and a WS high-frequency pixel value output from the WS high-frequency interpolation section 352 and generating a pixel value of a high dynamic range in all the pixels.

The W low-frequency HDR combination section 362 carries out processing of combining a WL low-frequency pixel value interpolated in all the pixels, that has been output from the WL low-frequency interpolation section 353, and a WS low-frequency pixel value output from the WS low-frequency interpolation section 354 and generating a pixel value of a high dynamic range in all the pixels.

The G low-frequency HDR combination section 363 carries out processing of combining a GL low-frequency pixel value interpolated in all the pixels, that has been output from the GL low-frequency interpolation section 355, and a GS low-frequency pixel value output from the GS low-frequency interpolation section 356 and generating a pixel value of a high dynamic range in all the pixels.

The R low-frequency HDR combination section 364 carries out processing of combining an RL low-frequency pixel value interpolated in all the pixels, that has been output from the RL low-frequency interpolation section 357, and an RS low-frequency pixel value output from the RS low-frequency interpolation section 358 and generating a pixel value of a high dynamic range in all the pixels.

The B low-frequency HDR combination section 365 carries out processing of combining a BL low-frequency pixel value interpolated in all the pixels, that has been output from the BL low-frequency interpolation section 359, and a BS low-frequency pixel value output from the BS low-frequency interpolation section 360 and generating a pixel value of a high dynamic range in all the pixels.

Since only the input signals differ and the operations of the processing are the same, the operations will collectively be described while taking the G low-frequency HDR combination section 363 as an example.

Figure 25:
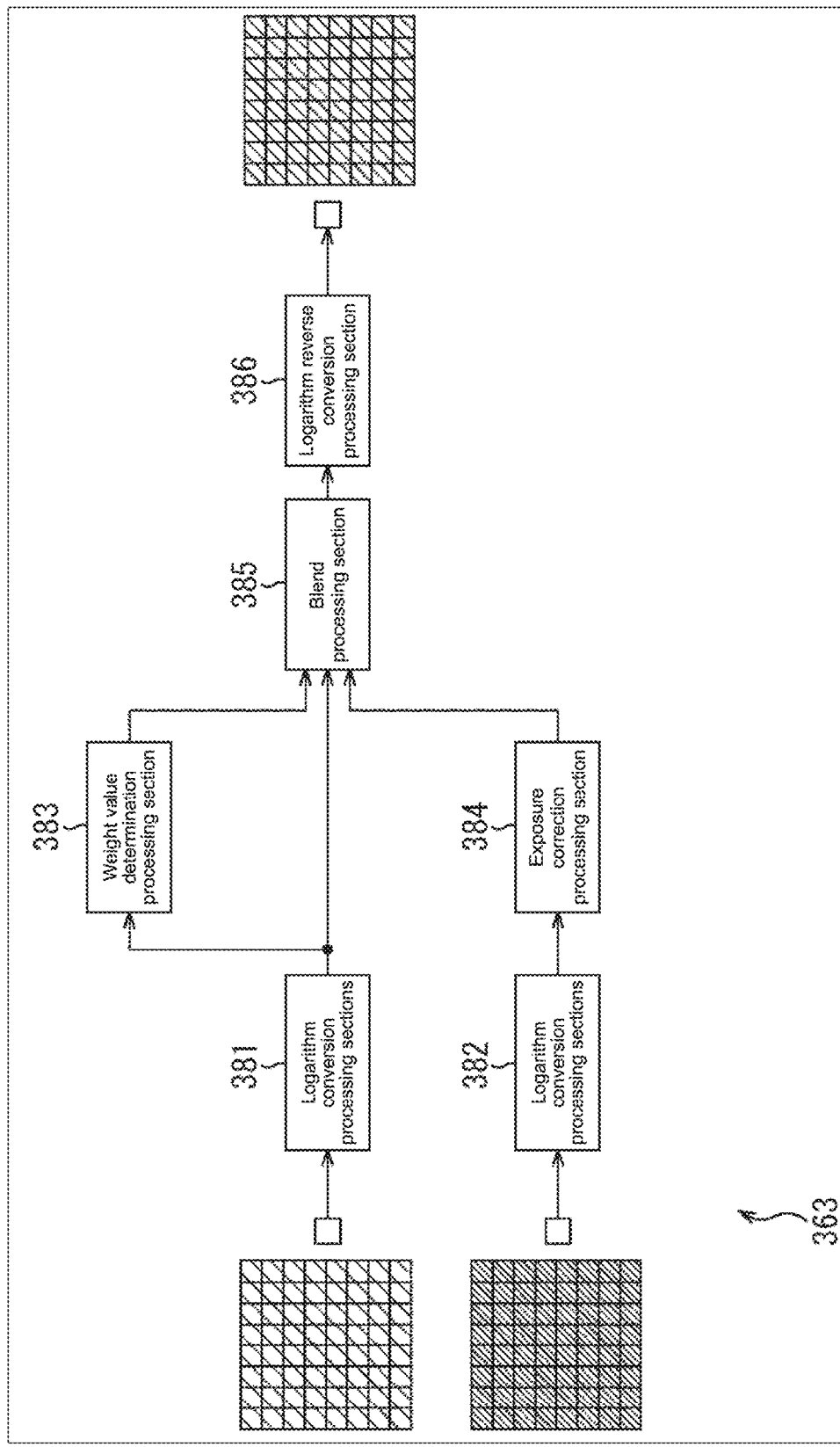
FIG. 25 A block diagram showing a functional structure example of an HDR combination section according to the fifth embodiment.

FIG. 25 is a block diagram showing a functional structure example of the G low-frequency HDR combination section 363 according to the fifth embodiment of the present technique. The G low-frequency HDR combination section 363 outputs, with the GL pixel value signal interpolated in all the pixel positions and the GS pixel value signal interpolated in all the pixel positions being the inputs, a G pixel value of a high dynamic range obtained by combining those values to all the pixel positions.

The G low-frequency HDR combination section 363 is constituted of two logarithm conversion processing sections 381 and 382, a weight value determination processing section 383, an exposure correction processing section 384, a blend processing section 385, and a logarithm reverse conversion processing section 386.

The two logarithm conversion processing sections 381 and 382 output values obtained by logarithmically converting the GL pixel value and the GS pixel value of each pixel. The exposure correction processing section 384 adds a logarithmic value corresponding to an exposure ratio of the long exposure and the short exposure to the logarithmically-converted GS pixel value output from the logarithm conversion processing section 382 to level the levels of the logarithmically-converted GS pixel value and the logarithmically-converted GL pixel value.

The weight value determination processing section 383 determines, based on the logarithmically-converted GL pixel value output from the logarithm conversion processing section 381, a blend coefficient of the logarithmically-converted GL pixel value and the logarithmically-converted GS pixel value obtained after the exposure correction.

The blend processing section 385 blend-combines, based on the blend coefficient determined by the weight value determination processing section 383, the logarithmically-converted GL pixel value output from the logarithm conversion processing section 381 and the logarithmically-converted GS pixel value that is output from the exposure correction processing section 384 and obtained after the exposure correction.

The logarithm reverse conversion processing section 386 restores the G pixel value obtained by the blend combination by the blend processing section 385 to the original linear characteristics.

Figure 26:
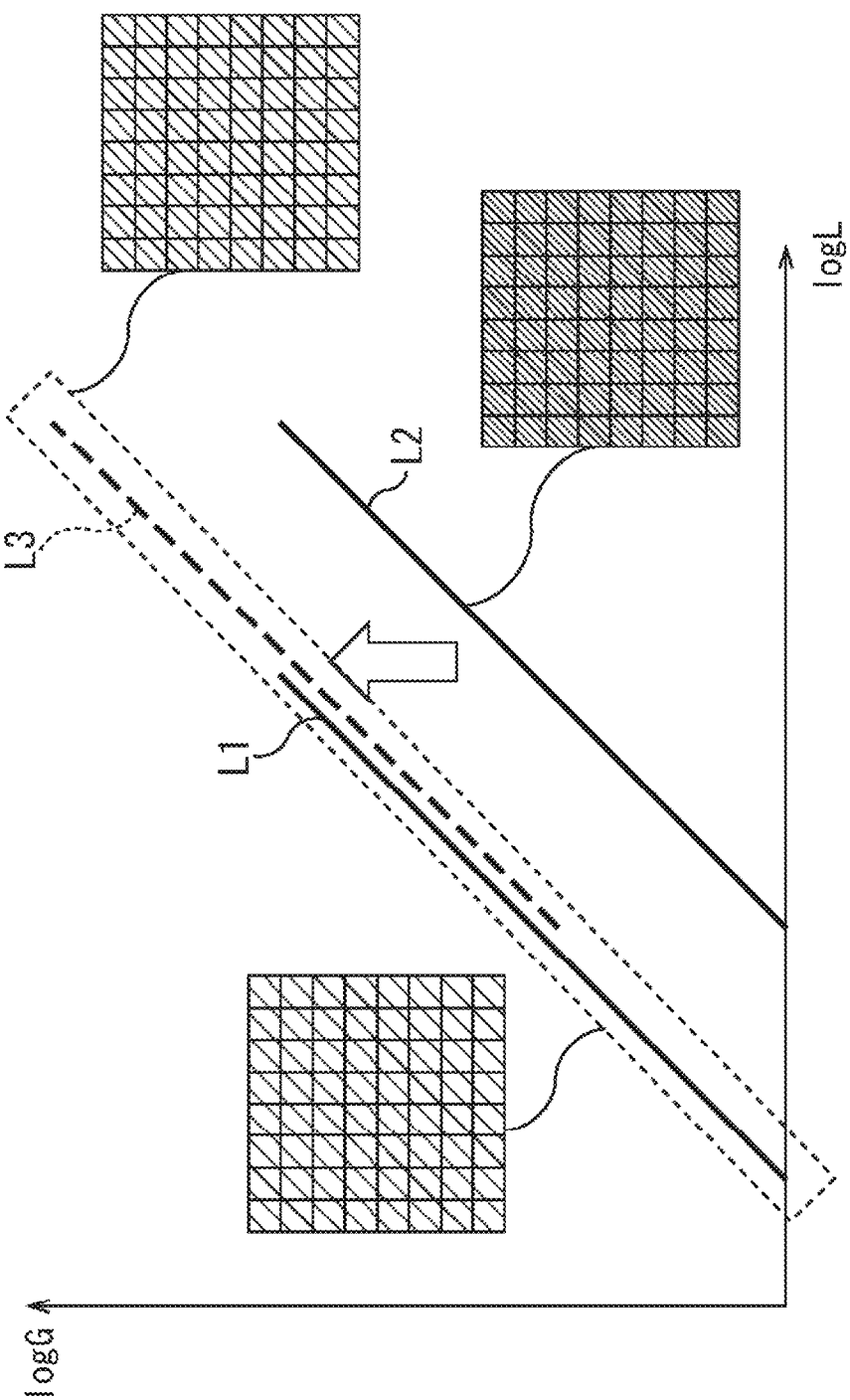
FIG. 26 A diagram for schematically explaining an operation of the HDR combination section according to the fifth embodiment.

FIG. 26 is a diagram for schematically explaining a series of operations of the HDR combination section such as the G low-frequency HDR combination section 363. The abscissa axis represents a luminance of the object, and the ordinate axis represents a G pixel value gradation, and both are in a logarithm gradation. The solid line L1 indicates GL pixel characteristics, and the solid line L2 indicates the GS pixel characteristics. Since the GL pixel has a longer exposure time, the GL pixel shows a larger value than the GS value with respect to the same object luminance.

A difference between those two is exactly an amount corresponding to the exposure ratio in the logarithm gradation. Obtaining luminance characteristics of a high dynamic range means obtaining linear pixel characteristics with respect to a wide range of object luminance. Therefore, the HDR combination section aims at coupling the characteristics of the GL pixels and the characteristics of the GS pixels to obtain one long linear characteristics. In this regard, the exposure correction processing section adds a bias corresponding to the exposure ratio to the GS pixel characteristics to obtain characteristics that are linearly aligned with the GL pixel characteristics.

The GS pixel characteristics biased by an amount corresponding to the exposure ratio is indicated by a broken line L3. The blend processing section 385 carries out processing of combining the GL pixel characteristics indicated by the solid line L1 and the GS pixel characteristics that are subjected to the exposure correction and indicated by the solid line L2 to obtain G pixel characteristics of a high dynamic range.

Here, in the area of dark object luminance, the GS pixels are buried in noises, so only the characteristics of the GL pixels are desirably used. Conversely, in the area of bright object luminance, the GL pixels are saturated, so only the characteristics of the GS pixels subjected to the exposure correction are desirably used. In this regard, a blending weight is controlled such that a contribution gradually shifts in an area where the two luminance characteristics overlap.

Figure 27:
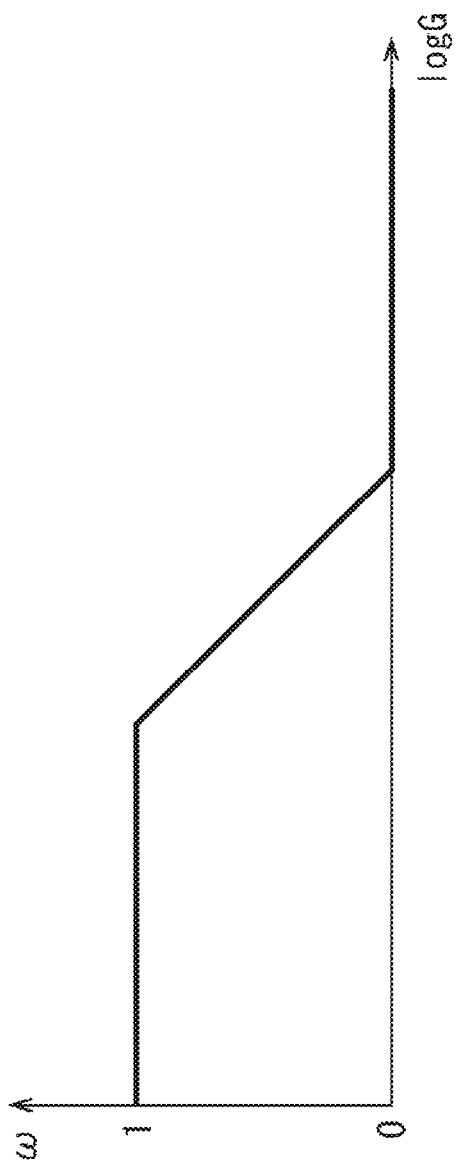
FIG. 27 A diagram showing weight value characteristics of the HDR combination section according to the fifth embodiment.

The weight value determination processing section 383 estimates the object luminance from the input GL pixel values (logarithmically-converted) and calculates a weight value conforming to the characteristics preset according to the requests as described above. For example, the weight value characteristics as shown in FIG. 27 can be used. In the weight value characteristics shown in FIG. 27, the value of log G takes the value 1 up to a first value, gradually decreases when exceeding the first value, and takes the value 0 when exceeding a second value.

The processing of the HDR combination section described above can be expressed by the following expression (1).

[Expression 1]

$$G_{HDR} = \log^{-1}\left(\omega(\log G_L) \cdot \log G_L + (1 - \omega(\log G_L)) \cdot \left(\log G_S + \log\frac{E_L}{E_S}\right)\right) \quad (1)$$

As described above, the HDR combination section includes the processing of converting signals read out from the pixels into a nonlinear gradation, and the processing of converting signals into a nonlinear gradation includes processing of converting signals based on upwardly-convex power function characteristics.

The descriptions will return to the structure of the image processing section 311 shown in FIG. 22. With the HDR-combined W high-frequency luminance value output from the W high-frequency HDR combination section 361, the HDR-combined W low-frequency luminance value output from the W low-frequency HDR combination section 362, and the G low-frequency luminance value output from the G low-frequency HDR combination section 363 being the inputs, the W-GCh correlation processing section 366 calculates and outputs a G luminance value including corrected high-frequency components.

With the HDR-combined W high-frequency luminance value output from the W high-frequency HDR combination section 361, the HDR-combined W low-frequency luminance value output from the W low-frequency HDR combination section 362, and the R low-frequency luminance value output from the R low-frequency HDR combination section 364 being the inputs, the W-RCh correlation processing section 367 calculates and outputs an R luminance value including corrected high-frequency components.

With the HDR-combined W high-frequency luminance value output from the W high-frequency HDR combination section 361, the HDR-combined W low-frequency luminance value output from the W low-frequency HDR combination section 362, and the B low-frequency luminance value output from the B low-frequency HDR combination section 365 being the inputs, the W-BCh correlation processing section 368 calculates and outputs a B luminance value including corrected high-frequency components.

Here, the operation of the W-GCh correlation processing section 366 will be described. The operations of the W-RCh correlation processing section 367 and the W-BCh correlation processing section 368 are the same as that of the W-GCh correlation processing section 366, so the operation of the W-GCh correlation processing section 366 will be described as an example herein.

In the 4-row arrangement like RGB+W as the target of the present technique, the W pixels can be sampled at a relatively-small pitch, and minute patterns and the like can therefore be reproduced by the interpolation processing. However, the R, G, and B pixels have rough pixel pitches, so minute patterns cannot be reproduced. However, in a natural image, it is experientially known that image signals obtained by different visible light spectral sensitivities have a strong correlation.

In this regard, using such properties, the high-frequency components of the R, G, and B pixels are estimated using the high-frequency components obtained from the W pixels. Specifically, the high-frequency component of the W pixel is calculated based on a difference between the output of the W high-frequency HDR combination section 361 reproduced up to the high frequency and the output of the W low-frequency HDR combination section 362 having no high-frequency component due to a smoothing effect of the filter.

Further, assuming that the high-frequency components of the G pixels are substantially the same as the high-frequency components of the W pixels based on the Ch correlation property, the high-frequency component of the W pixel is added to the outputs of the R, G, and B low-frequency HDR combination sections.

This can be expressed by the following expression (2).

[Expression 2]

$$G_{ICC} = G_{LowFreq} + (W_{HighFreq} - W_{LowFreq}) \quad (2)$$

In the expression (2), the left-hand side is an output value, and three items on the right-hand side are input values.

As described above, the fifth embodiment of the present technique has described the structure of the image pickup apparatus including the image processing with which, from output RAW data of the image pickup device that has the 4-row color arrangement including W in addition to RGB and performs a long exposure and short exposure for each color, RGB image data of a high dynamic range can be generated.

Other Application Examples

The fifth embodiment of the present technique has described the structure for converting, after outputting RAW data including 4 rows of RGB+W from the image pickup device, the data into RGB data by the image processing section. However, it is also possible to take a structure in which data converted into an RGB Bayer arrangement in the image pickup device is output from the image pickup device. The operation of the image processing section in this case includes a signal processing section that converts the RGB Bayer arrangement performed in a normal camera system into RGB data.

Figure 28:
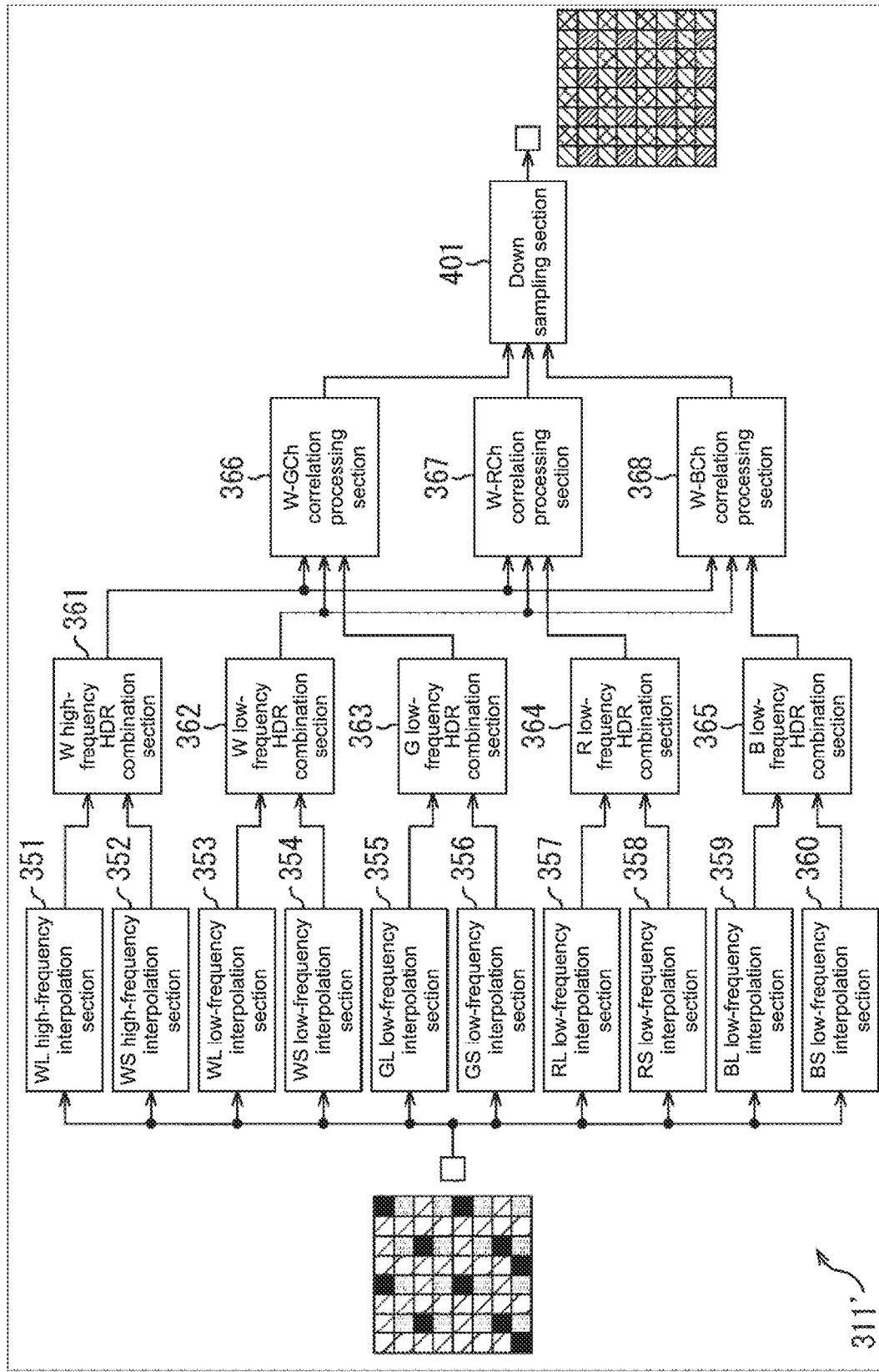
FIG. 28 A block diagram showing a functional structure example for processing of a conversion into RGB Bayer data in an image pickup device according to another application example.

FIG. 28 is a diagram showing another structure of the image processing section 311 (FIG. 21). The image processing section 311' shown in FIG. 28 (' is assigned for distinguishing it from image processing section 311 shown in FIG. 22) has a structure in which a down sampling section 401 is added to the image processing section 311 shown in FIG. 22. With such a structure, the processing of converting data into the RGB Bayer arrangement can be carried out in the image pickup device.

The image processing section 311' shown in FIG. 28 includes the down sampling section 401 that resamples, after HDR-combined RGB pixel values are obtained in the pixels by the processing of the WL high-frequency interpolation section 351 to the W-BCh correlation processing section 368, the pixel values so that those become the Bayer arrangement. By the resampling by the down sampling section 401, data converted into the RGB Bayer arrangement in the image pickup device can be output.

Further, in both the image processing section 311 shown in FIG. 22 and the image processing section 311' shown in FIG. 28, it is also possible to change the positions of the logarithm conversion processing sections 381 and 382 and the logarithm reverse conversion processing section 386 (all of which are shown in FIG. 25), that are included in the HDR combination sections 361 to 365, so as to carry out the logarithm conversion processing before the interpolation means, and carry out the logarithm reverse conversion processing after the Ch correlation processing sections 366 to 368 (or after down sampling section 401).

Figure 29:
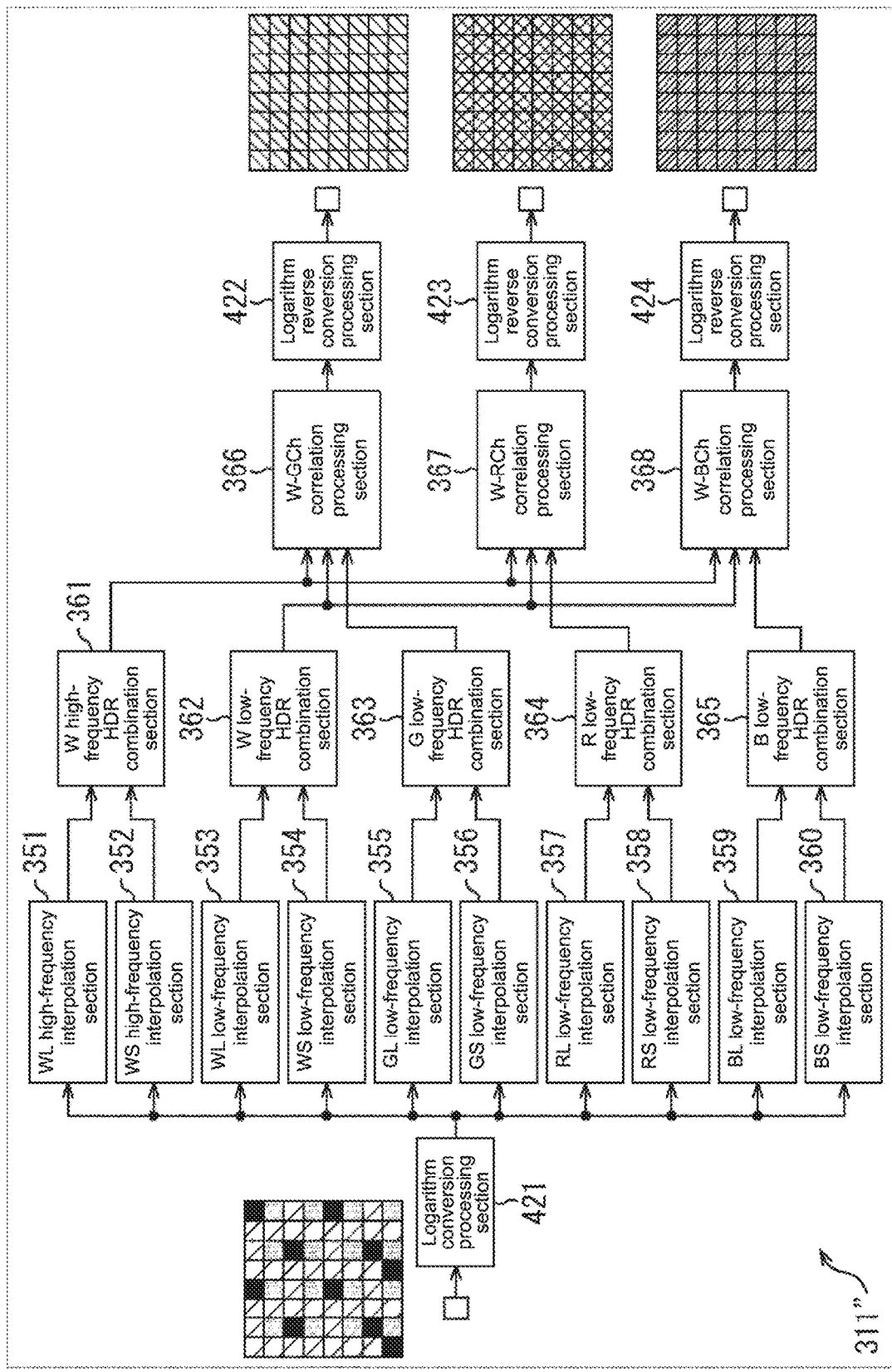
FIG. 29 A block diagram showing a functional structure example in which a processing position of a logarithm conversion is changed in the image processing section according to the fifth embodiment.

FIG. 29 is a diagram showing a structure of the image processing section 311 in the case where the positions of the logarithm conversion processing sections 381 and 382 and the logarithm reverse conversion processing section 386, that are included in the HDR combination sections 361 to 365, are changed so as to carry out the logarithm conversion processing before the interpolation means, and the logarithm reverse conversion processing is carried out after the Ch correlation processing sections 366 to 368.

The image processing section 311 shown in FIG. 22 and the image processing section 311" (" is assigned for distinguishing it from other image processing sections 311) shown in FIG. 29 will be compared. In the image processing section 311", a logarithm conversion processing section 421 that carries out the logarithm conversion processing on the RAW data in which pixels subjected to the two types of exposures, that is, the long exposure and the short exposure, are mixed in the 4-row color arrangement including the input W pixels, is provided before the WL high-frequency interpolation section 351 to the BS low-frequency interpolation section 360.

Therefore, the interpolation sections of the WL high-frequency interpolation section 351 to the BS low-frequency interpolation section 360 carry out the interpolation processing using the data subjected to the logarithm conversion processing. Since the logarithm conversion processing section 421 is provided before the interpolation sections, the W high-frequency HDR combination section 361 to the B low-frequency HDR combination section 365 do not include the logarithm conversion processing sections 381 and 382 although not shown. Moreover, the logarithm reverse conversion processing section 386 is also not included.

The logarithm reverse conversion processing section 386 provided in each of the W high-frequency HDR combination section 361 to the B low-frequency HDR combination section 365 is provided subsequent to each of the W-GCh correlation processing section 366 to the W-BCh correlation processing section 368 in the image processing section 311" shown in FIG. 29.

Specifically, a logarithm reverse conversion processing section 422 is provided subsequent to the W-GCh correlation processing section 366, a logarithm reverse conversion processing section 423 is provided subsequent to the W-RCh correlation processing section 367, and the logarithm reverse conversion processing section 424 is provided subsequent to the W-BCh correlation processing section 368.

As such a structure, a structure of generating and outputting each data of RGB may also be taken.

Figure 30:
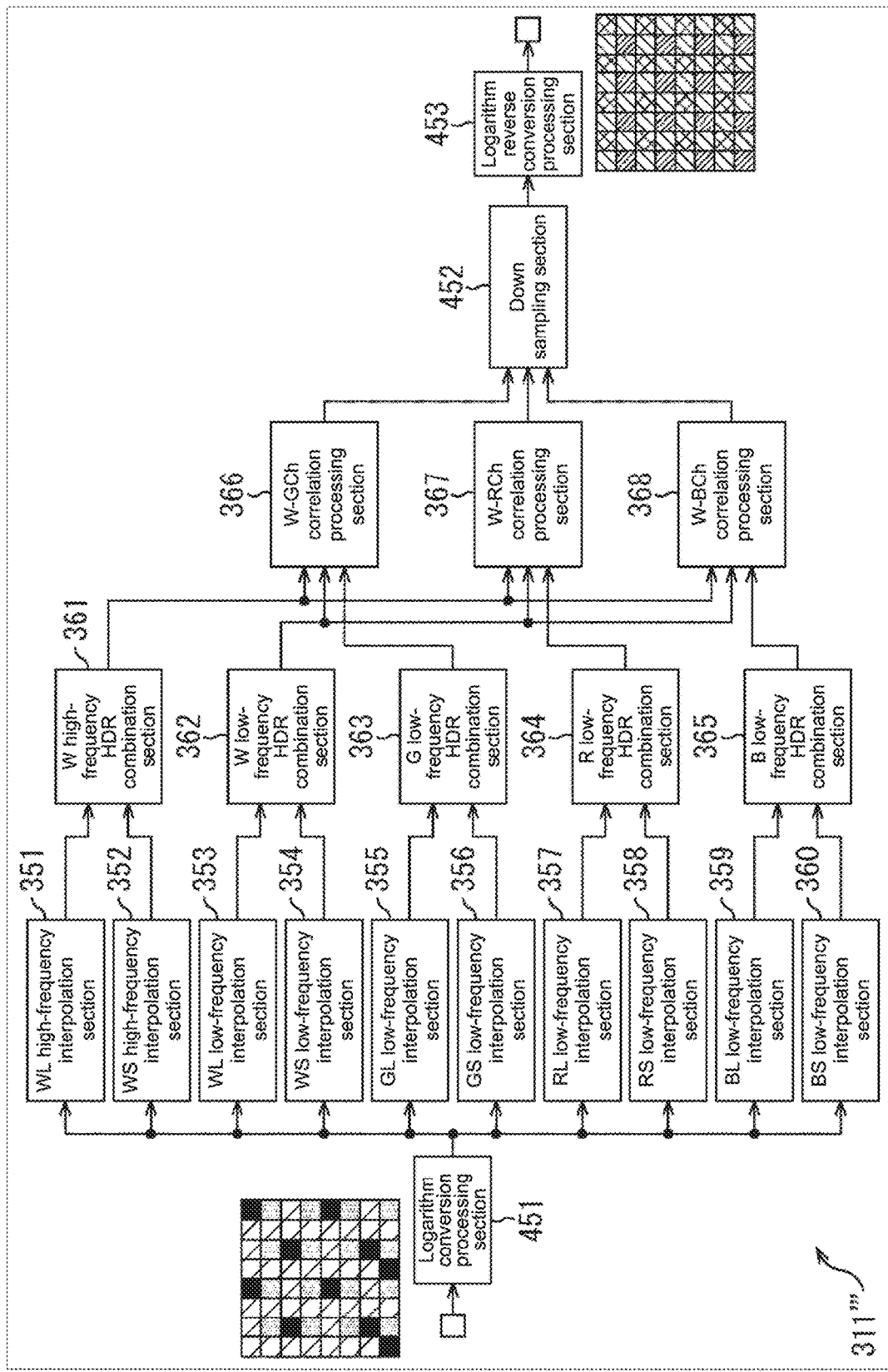
FIG. 30 A block diagram showing a functional structure example in which a processing position of the logarithm conversion is changed in the processing of a conversion into RGB Bayer data in an image pickup device according to another application example.

FIG. 30 is a diagram showing a structure of the image processing section 311 in the case where the positions of the logarithm conversion processing sections 381 and 382 and the logarithm reverse conversion processing section 386, that are included in the HDR combination sections 361 to 365, are changed so as to carry out the logarithm conversion processing before the interpolation means, and the logarithm reverse conversion processing is carried out after the down sampling section 401.

The image processing section 311 shown in FIG. 22 and the image processing section 311''' ('''" is assigned for distinguishing it from other image processing sections 311) shown in FIG. 30 will be compared. In the image processing section 311''', a logarithm conversion processing section 451 that carries out the logarithm conversion processing on the RAW data in which pixels subjected to the two types of exposures, that is, the long exposure and the short exposure, are mixed in the 4-row color arrangement including the input W pixels, is provided before the WL high-frequency interpolation section 351 to the BS low-frequency interpolation section 360. This point is the same as the image processing section 311" shown in FIG. 29.

In the image processing section 311''', a down sampling section 452 is provided subsequent to the W-GCh correlation processing section 366 to the W-BCh correlation processing section 368. Similar to the down sampling section 401 of the image processing section 311' shown in FIG. 28, the down sampling section 452 down-samples the outputs from the W-GCh correlation processing section 366 to the W-BCh correlation processing section 368 to generate and output data converted into the RGB Bayer arrangement in the image pickup device.

The output from the down sampling section 452 is supplied to the logarithm reverse conversion processing section 453 to be subjected to the logarithm reverse conversion processing.

As such a structure, a structure of generating and outputting data converted into the RGB Bayer arrangement in the image pickup device can also be taken.

It should be noted that in the structure of the image processing section 311''' shown in FIG. 30, it is also possible to not perform the logarithm reverse conversion in the image pickup device and perform the logarithm reverse conversion in the image processing section after outputting the Bayer data from the image pickup device (not shown).

Further, although the image pickup apparatus has been exemplified in the fifth embodiment of the present technique, the embodiments of the present technique are also applicable to an electronic apparatus including an image pickup section having an image pickup device (e.g., cellular phone apparatus having built-in image pickup section).

Moreover, although three control lines provided per row and operations thereof have been described presupposing the RGB+W color arrangement shown in FIG. 1 in the embodiments of the present technique, the color arrangement is not limited to that shown in FIG. 1, and there are other color arrangements that bear the same effects with the same mechanism. The present technique is not limited to the color arrangement shown in FIG. 1. In the following, examples of the color arrangement to which the present technique is applicable, other than that shown in FIG. 1, will be described.

FIG. 31 is a diagram showing another example of the color arrangement to which the present technique is applicable. The structure of the image sensor in the horizontal direction (lateral direction or row direction in FIG. 31) will be described. In the first row, the W pixel 600 (1, 1), the G pixel 600 (1, 2), the W pixel 600 (1, 3), the R pixel 600 (1, 4), the W pixel 600 (1, 5), the G pixel 600 (1, 6), the W pixel 600 (1, 7), and the R pixel 600 (1, 8) are arranged. In this case, the W pixels, the G pixels, and the R pixels are arranged in the first row.

In the second row, the G pixel 600 (2, 1), the W pixel 600 (2, 2), the R pixel 600 (2, 3), the W pixel 600 (2, 4), the G pixel 600 (2, 5), the W pixel 600 (2, 6), the R pixel 600 (2, 7), and the W pixel 600 (2, 8) are arranged. In this case, the W pixels, the G pixels, and the R pixels are arranged in the second row.

In the third row, the W pixel 600 (3, 1), the B pixel 600 (3, 2), the W pixel 600 (3, 3), the G pixel 600 (3, 4), the W pixel 600 (3, 5), the B pixel 600 (3, 6), the W pixel 600 (3, 7), and the G pixel 600 (3, 8) are arranged. In this case, the W pixels, the G pixels, and the B pixels are arranged in the third row.

In the fourth row, the B pixel 600 (4, 1), the W pixel 600 (4, 2), the G pixel 600 (4, 3), the W pixel 600 (4, 4), the B pixel 600 (4, 5), the W pixel 600 (4, 6), the G pixel 600 (4, 7), and the W pixel 600 (4, 8) are arranged. In this case, the W pixels, the G pixels, and the B pixels are arranged in the fourth row.

The fifth to eighth rows have the same arrangements as the first to fourth rows. The present technique is also applicable to such a color arrangement.

FIG. 32 is a diagram showing another example of the color arrangement to which the present technique is applicable. The structure of the image sensor in the horizontal direction (lateral direction or row direction in FIG. 32) will be described. In the first row, the W pixel 610 (1, 1), the R pixel 610 (1, 2), the W pixel 610 (1, 3), the G pixel 610 (1, 4), the W pixel 610 (1, 5), the R pixel 610 (1, 6), the W pixel 610 (1, 7), and the G pixel 610 (1, 8) are arranged. In this case, the W pixels, the G pixels, and the R pixels are arranged in the first row.

In the second row, the B pixel 610 (2, 1), the W pixel 610 (2, 2), the G pixel 610 (2, 3), the W pixel 610 (2, 4), the B pixel 610 (2, 5), the W pixel 610 (2, 6), the G pixel 610 (2, 7), and the W pixel 610 (2, 8) are arranged. In this case, the W pixels, the G pixels, and the B pixels are arranged in the second row.

In the third row, the W pixel 610 (3, 1), the G pixel 610 (3, 2), the W pixel 610 (3, 3), the R pixel 610 (3, 4), the W pixel 610 (3, 5), the G pixel 610 (3, 6), the W pixel 610 (3, 7), and the R pixel 610 (3, 8) are arranged. In this case, the W pixels, the G pixels, and the R pixels are arranged in the third row.

In the fourth row, the G pixel 610 (4, 1), the W pixel 610 (4, 2), the B pixel 610 (4, 3), the W pixel 610 (4, 4), the G pixel 610 (4, 5), the W pixel 610 (4, 6), the B pixel 610 (4, 7), and the W pixel 610 (4, 8) are arranged. In this case, the W pixels, the G pixels, and the B pixels are arranged in the fourth row.

The fifth to eighth rows have the same arrangements as the first to fourth rows. The present technique is also applicable to such a color arrangement.

The three control lines provided per line and the operations thereof described in the embodiments above are also applicable to the color arrangements shown in FIGS. 31 and 32.

The present technique is also applicable to exposure patterns other than those shown in FIGS. 2, 4, 5, and 6. In the following, examples of the exposure control pattern that can be realized by the three control lines provided per line described in the embodiments of the present technique will be described with reference to FIGS. 33 to 40.

Combinations of exposure patterns and color arrangements that can be realized by combining the exposure patterns shown in FIGS. 33 to 40 and the color arrangements shown in FIGS. 1, 31, and 32 are all within the applicable range of the present technique. Further, the present technique is also applicable to the combinations of exposure patterns and color arrangements that are not shown, and those combinations are also within the applicable range of the present technique.

Figure 33:
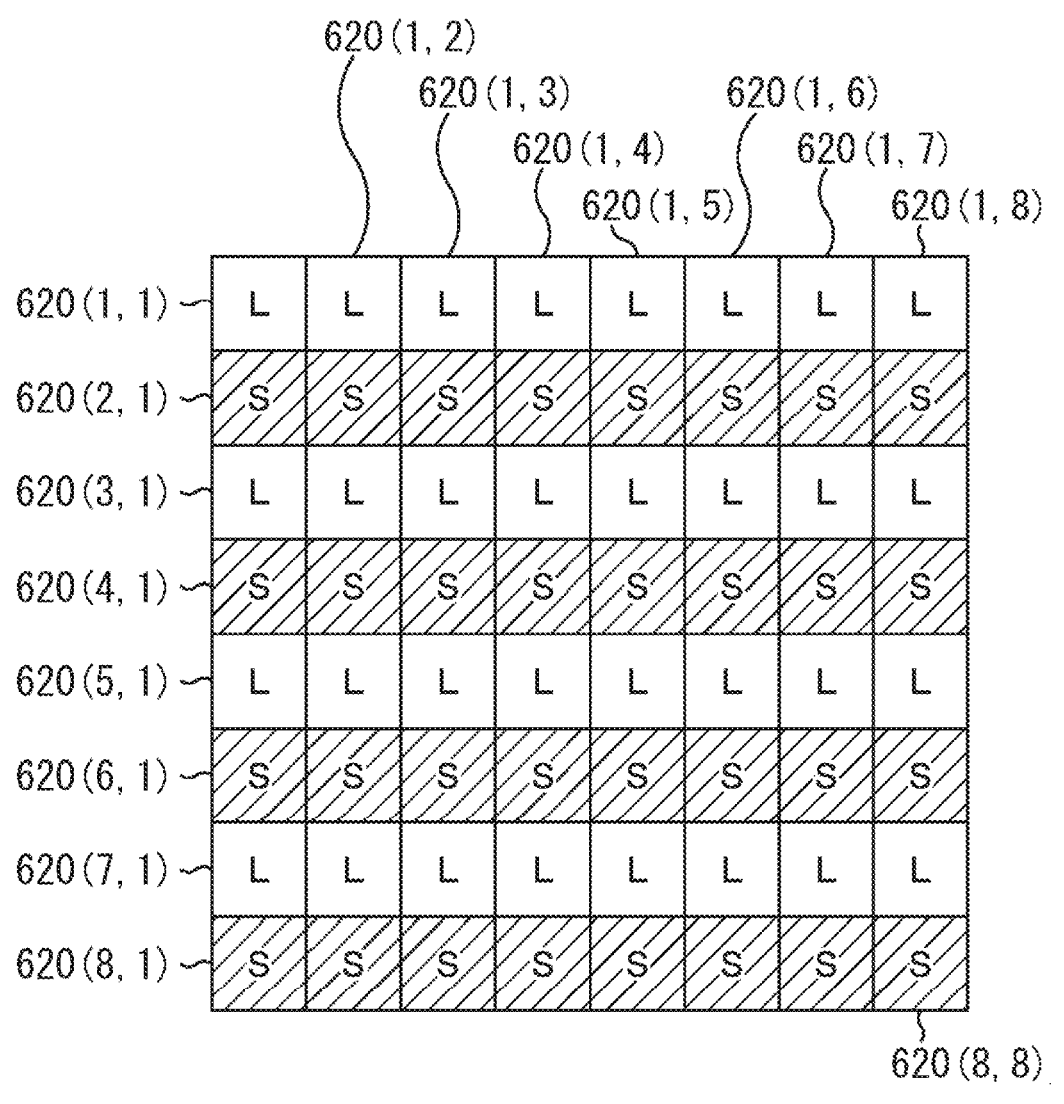

FIG. 33 is a diagram showing another example of the exposure pattern. FIGS. 33 to 40 show only the exposure patterns, and color arrangements are not shown. Therefore, in FIGS. 33 to 40, the long exposure pixels are represented by "L" and described as L pixels, and the short exposure pixels are represented by "S" and described as S pixels.

The exposure pattern shown in FIG. 33 is an example where the long exposure pixels and the short exposure pixels are arranged alternately in rows, that is, an example where the long exposure pixels and the short exposure pixels are arranged in a row unit. Specifically, the long exposure pixels are arranged in the first, third, fifth, and seventh rows, and the short exposure pixels are arranged in the second, fourth, sixth, and eighth rows. The present technique described above is also applicable to such an exposure pattern.

Figure 34:
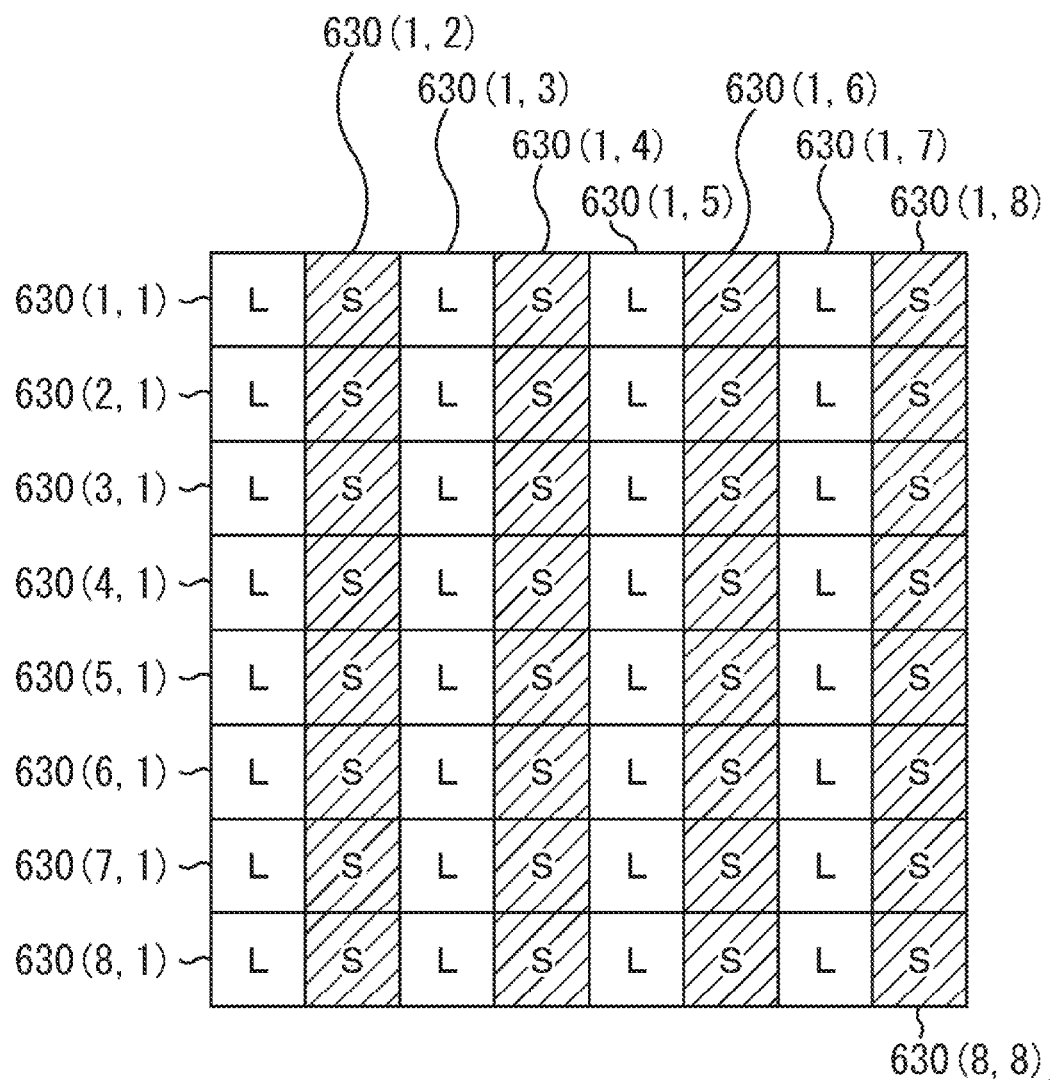
FIG. 34 A diagram showing an example of an exposure control pattern of an applicable image pickup device.

FIG. 34 is a diagram showing another example of the exposure pattern. The exposure pattern shown in FIG. 34 is an example where the long exposure pixels and the short exposure pixels are arranged alternately in columns, that is, an example where the long exposure pixels and the short exposure pixels are arranged in a column unit. Specifically, the long exposure pixels are arranged in the first, third, fifth, and seventh columns, and the short exposure pixels are arranged in the second, fourth, sixth, and eighth columns. The present technique described above is also applicable to such an exposure pattern.

Figure 35:
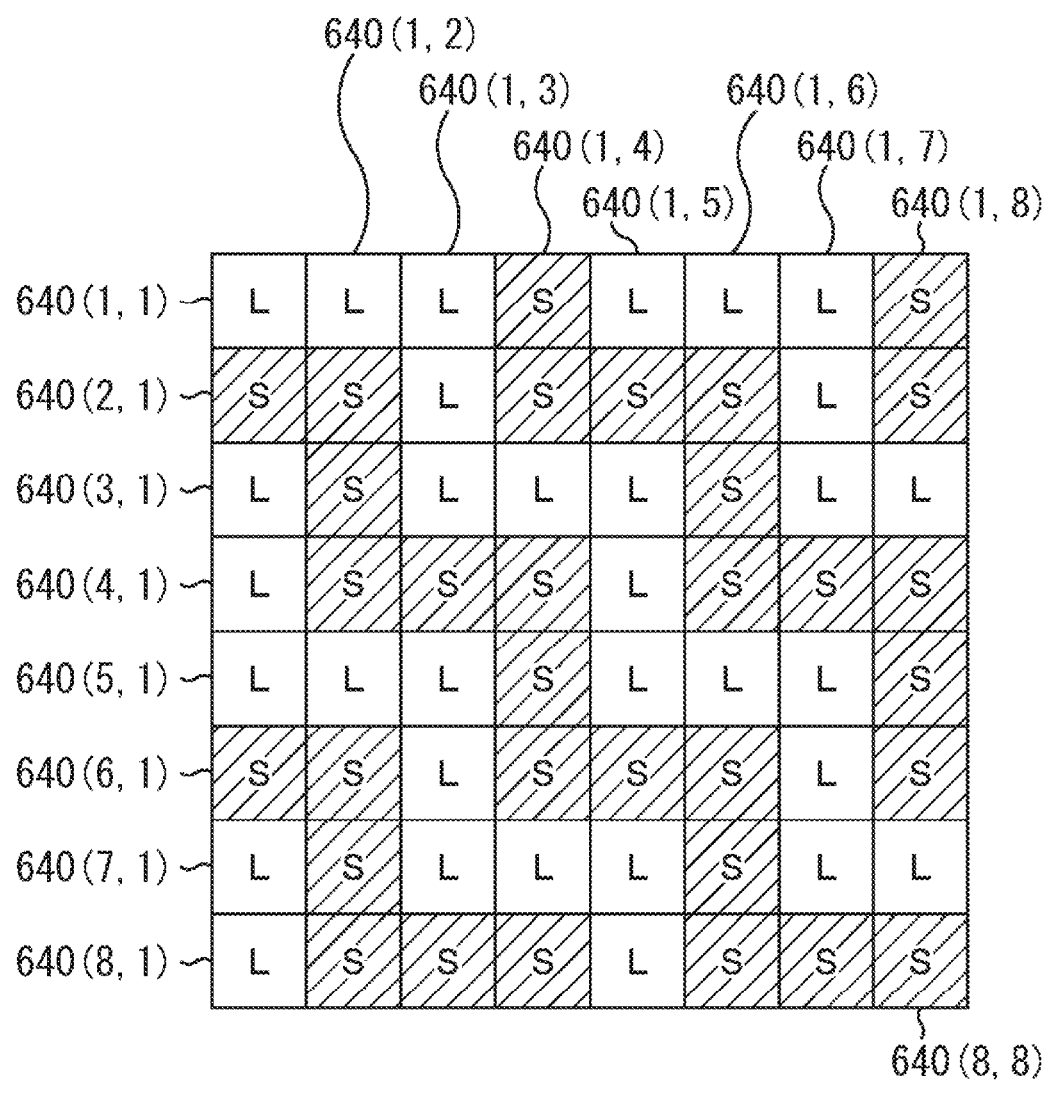

FIG. 35 is a diagram showing another example of the exposure pattern. In the first row in the exposure pattern shown in FIG. 35, the L pixel 640 (1, 1), the L pixel 640 (1, 2), the L pixel 640 (1, 3), the S pixel 640 (1, 4), the L pixel 640 (1, 5), the L pixel 640 (1, 6), the L pixel 640 (1, 7), and the S pixel 640 (1, 8) are arranged.

In the second row, the S pixel 640 (2, 1), the S pixel 640 (2, 2), the L pixel 640 (2, 3), the S pixel 640 (2, 4), the S pixel 640 (2, 5), the S pixel 640 (2, 6), the L pixel 640 (2, 7), and the S pixel 640 (2, 8) are arranged.

In the third row, the L pixel 640 (3, 1), the S pixel 640 (3, 2), the L pixel 640 (3, 3), the L pixel 640 (3, 4), the L pixel 640 (3, 5), the S pixel 640 (3, 6), the L pixel 640 (3, 7), and the L pixel 640 (3, 8) are arranged.

In the fourth row, the L pixel 640 (4, 1), the S pixel 640 (4, 2), the S pixel 640 (4, 3), the S pixel 640 (4, 4), the L pixel 640 (4, 5), the L pixel 640 (4, 6), the S pixel 640 (4, 7), and the S pixel 640 (4, 8) are arranged.

The fifth to eighth rows have the same arrangements as the first to fourth rows. The present technique is also applicable to such an exposure pattern.

Figure 36:
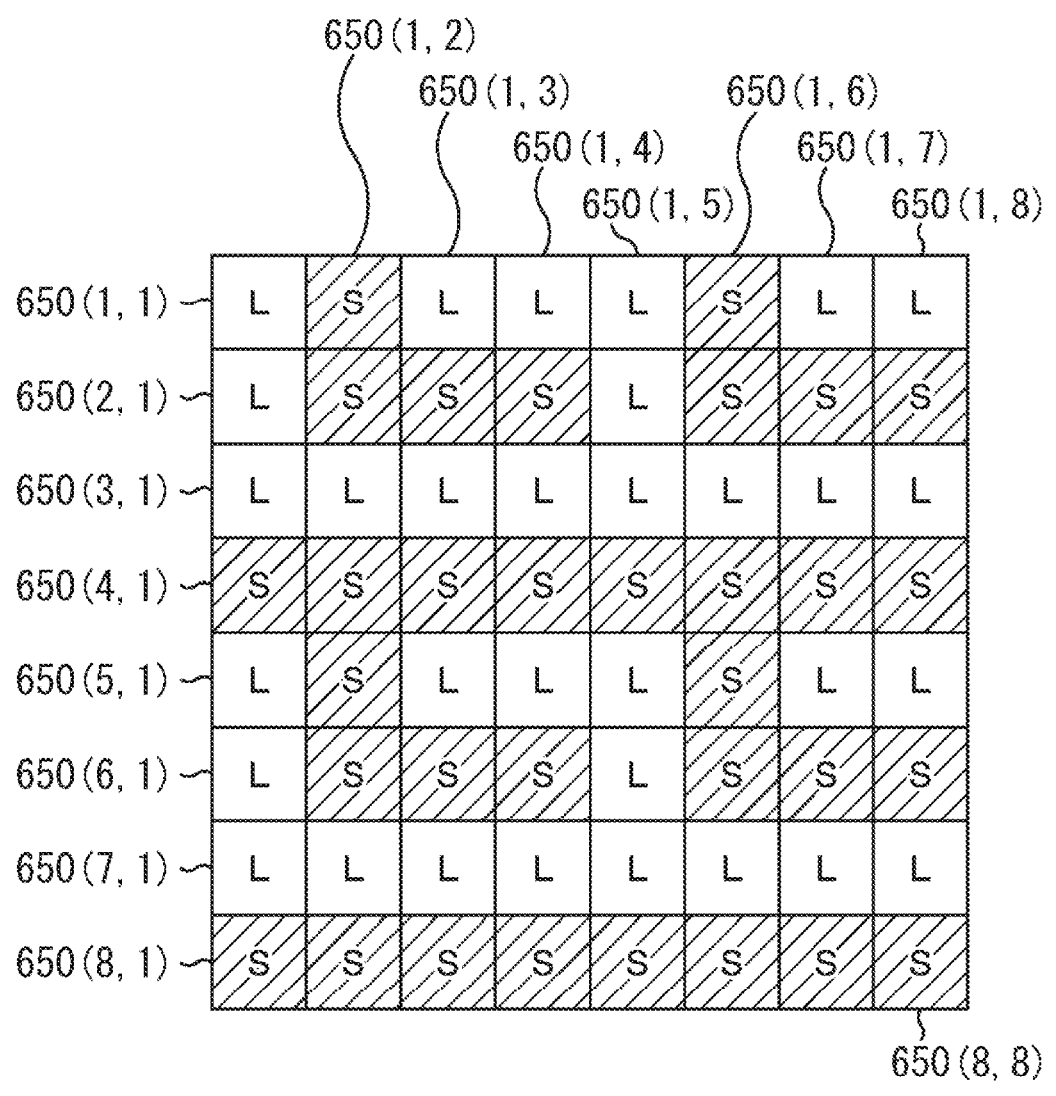

FIG. 36 is a diagram showing another example of the exposure pattern. In the first row in the exposure pattern shown in FIG. 36, the L pixel 650 (1, 1), the S pixel 650 (1, 2), the L pixel 650 (1, 3), the L pixel 650 (1, 4), the L pixel 650 (1, 5), the S pixel 650 (1, 6), the L pixel 650 (1, 7), and the L pixel 650 (1, 8) are arranged.

In the second row, the L pixel 650 (2, 1), the S pixel 650 (2, 2), the S pixel 650 (2, 3), the S pixel 650 (2, 4), the L pixel 650 (2, 5), the S pixel 650 (2, 6), the S pixel 650 (2, 7), and the S pixel 650 (2, 8) are arranged.

In the third row, the pixels are all L pixels. In the fourth row, the pixels are all S pixels.

The fifth to eighth rows have the same arrangements as the first to fourth rows. The present technique is also applicable to such an exposure pattern.

Figure 37:
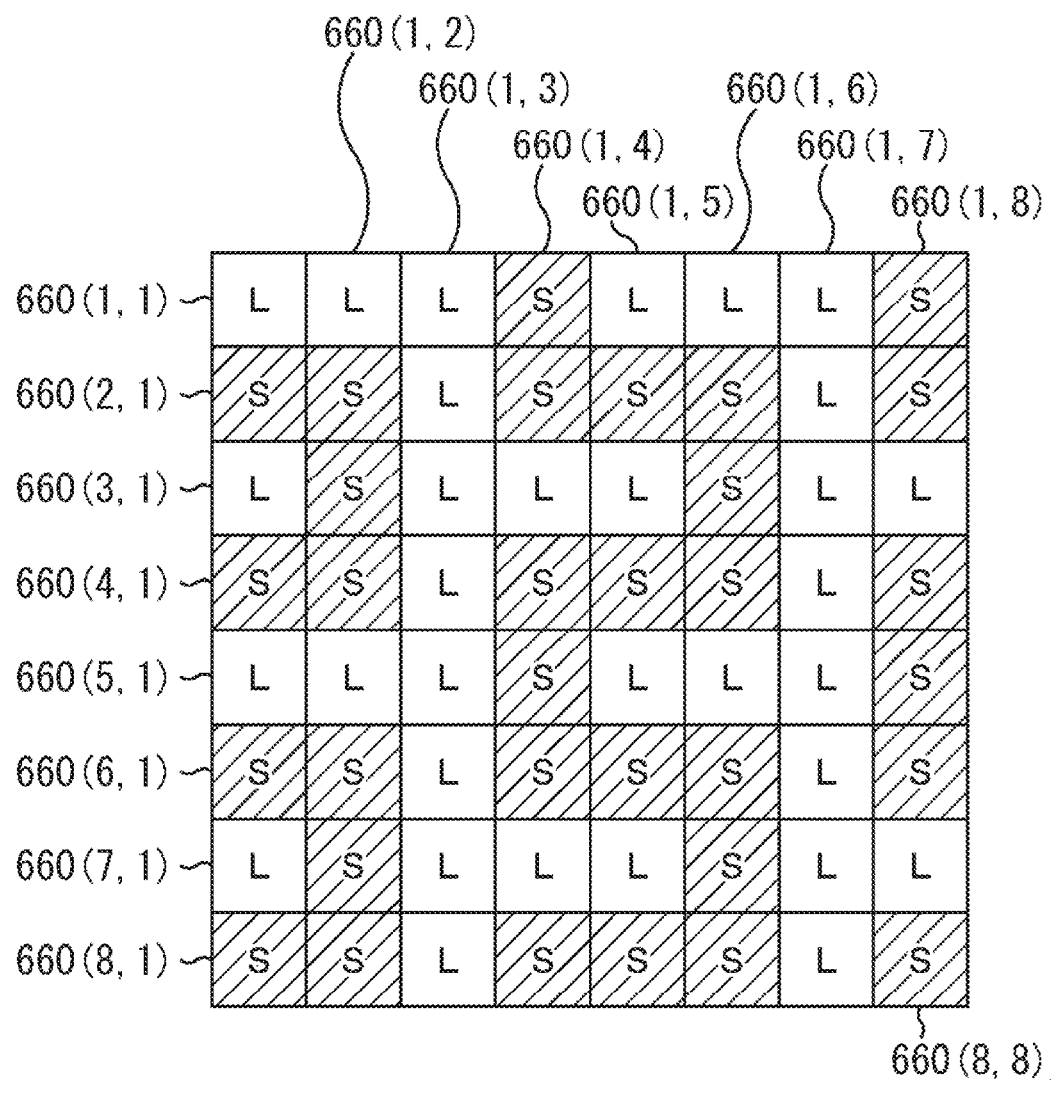

FIG. 37 is a diagram showing another example of the exposure pattern. In the first row in the exposure pattern shown in FIG. 37, the L pixel 660 (1, 1), the L pixel 660 (1, 2), the L pixel 660 (1, 3), the S pixel 660 (1, 4), the L pixel 660 (1, 5), the L pixel 660 (1, 6), the L pixel 660 (1, 7), and the S pixel 660 (1, 8) are arranged.

In the second row, the S pixel 660 (2, 1), the S pixel 660 (2, 2), the L pixel 660 (2, 3), the S pixel 660 (2, 4), the S pixel 660 (2, 5), the S pixel 660 (2, 6), the L pixel 660 (2, 7), and the S pixel 660 (2, 8) are arranged.

In the third row, the L pixel 660 (3, 1), the S pixel 660 (3, 2), the L pixel 660 (3, 3), the L pixel 660 (3, 4), the L pixel 660 (3, 5), the S pixel 660 (3, 6), the L pixel 660 (3, 7), and the L pixel 660 (3, 8) are arranged.

In the fourth row, the S pixel 660 (4, 1), the S pixel 660 (4, 2), the L pixel 660 (4, 3), the S pixel 660 (4, 4), the S pixel 660 (4, 5), the S pixel 660 (4, 6), the L pixel 660 (4, 7), and the S pixel 660 (4, 8) are arranged.

The fifth to eighth rows have the same arrangements as the first to fourth rows. The present technique is also applicable to such an exposure pattern.

Figure 38:
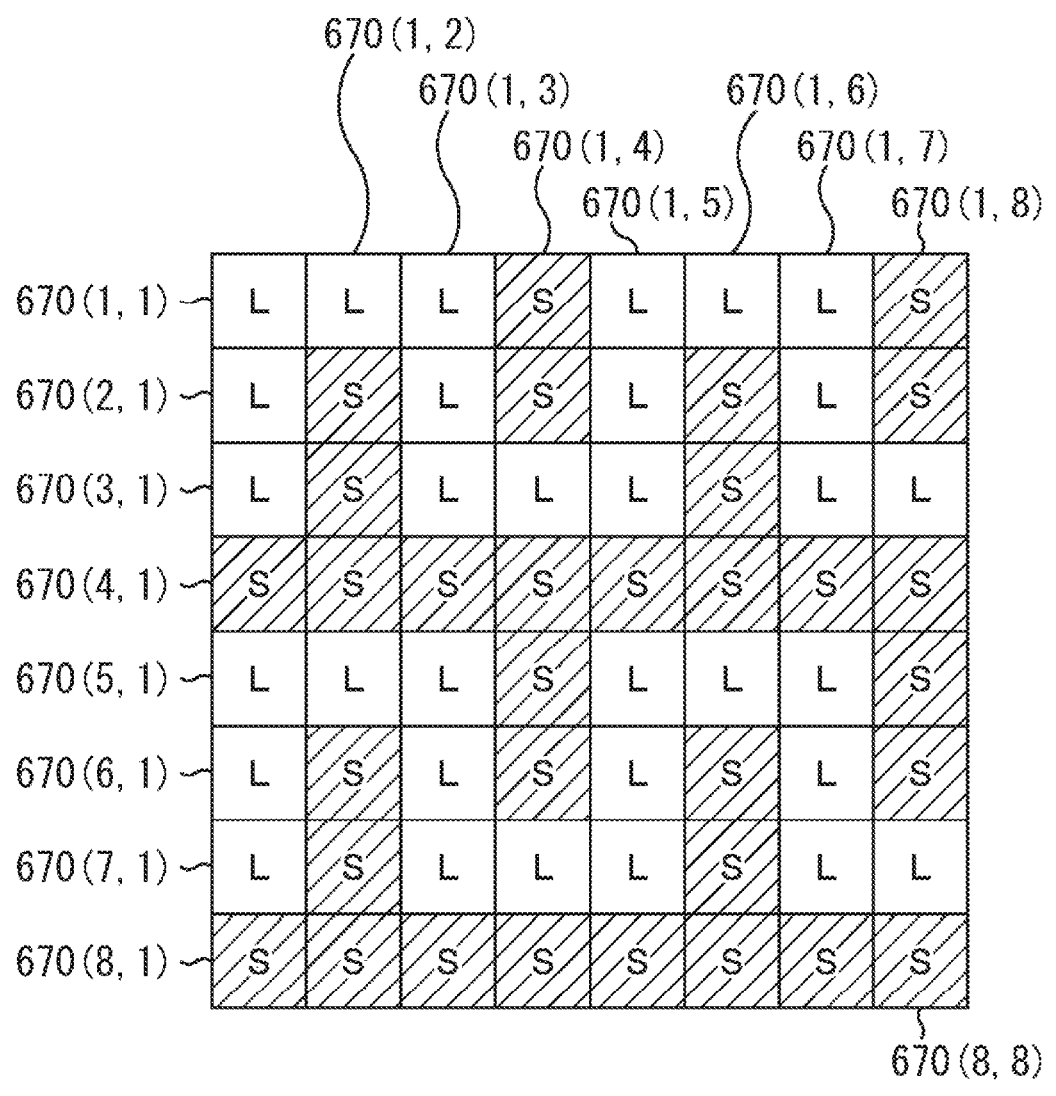

FIG. 38 is a diagram showing another example of the exposure pattern. In the first row in the exposure pattern shown in FIG. 38, the L pixel 670 (1, 1), the L pixel 670 (1, 2), the L pixel 670 (1, 3), the S pixel 670 (1, 4), the L pixel 670 (1, 5), the L pixel 670 (1, 6), the L pixel 670 (1, 7), and the S pixel 670 (1, 8) are arranged.

In the second row, the L pixel 670 (2, 1), the S pixel 670 (2, 2), the L pixel 670 (2, 3), the S pixel 670 (2, 4), the L pixel 670 (2, 5), the S pixel 670 (2, 6), the L pixel 670 (2, 7), and the S pixel 670 (2, 8) are arranged.

In the third row, the L pixel 670 (3, 1), the S pixel 670 (3, 2), the L pixel 670 (3, 3), the L pixel 670 (3, 4), the L pixel 670 (3, 5), the S pixel 670 (3, 6), the L pixel 670 (3, 7), and the L pixel 670 (3, 8) are arranged.

In the fourth row, the pixels are all S pixels. The fifth to eighth rows have the same arrangements as the first to fourth rows. The present technique is also applicable to such an exposure pattern.

Figure 39:
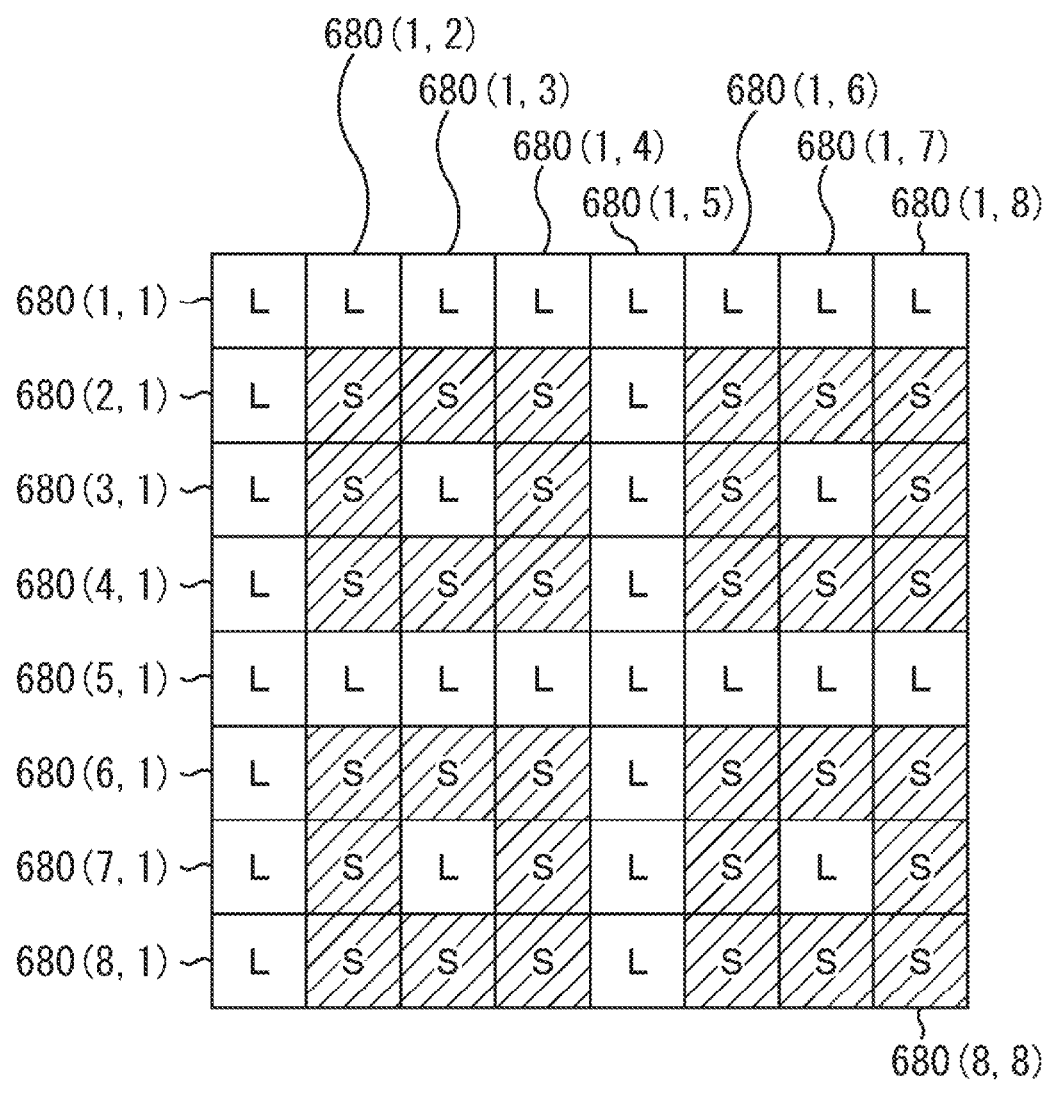

FIG. 39 is a diagram showing another example of the exposure pattern. In the first row in the exposure pattern shown in FIG. 39, the pixels are all L pixels.

In the second row, the L pixel 680 (2, 1), the S pixel 680 (2, 2), the S pixel 680 (2, 3), the S pixel 680 (2, 4), the L pixel 680 (2, 5), the S pixel 680 (2, 6), the S pixel 680 (2, 7), and the S pixel 680 (2, 8) are arranged.

In the third row, the L pixel 680 (3, 1), the S pixel 680 (3, 2), the L pixel 680 (3, 3), the S pixel 680 (3, 4), the L pixel 680 (3, 5), the S pixel 680 (3, 6), the L pixel 680 (3, 7), and the S pixel 680 (3, 8) are arranged.

In the fourth row, the L pixel 680 (4, 1), the S pixel 680 (4, 2), the S pixel 680 (4, 3), the S pixel 680 (4, 4), the L pixel 680 (4, 5), the S pixel 680 (4, 6), the S pixel 680 (4, 7), and the S pixel 680 (4, 8) are arranged.

The fifth to eighth rows have the same arrangements as the first to fourth rows. The present technique is also applicable to such an exposure pattern.

Figure 40:
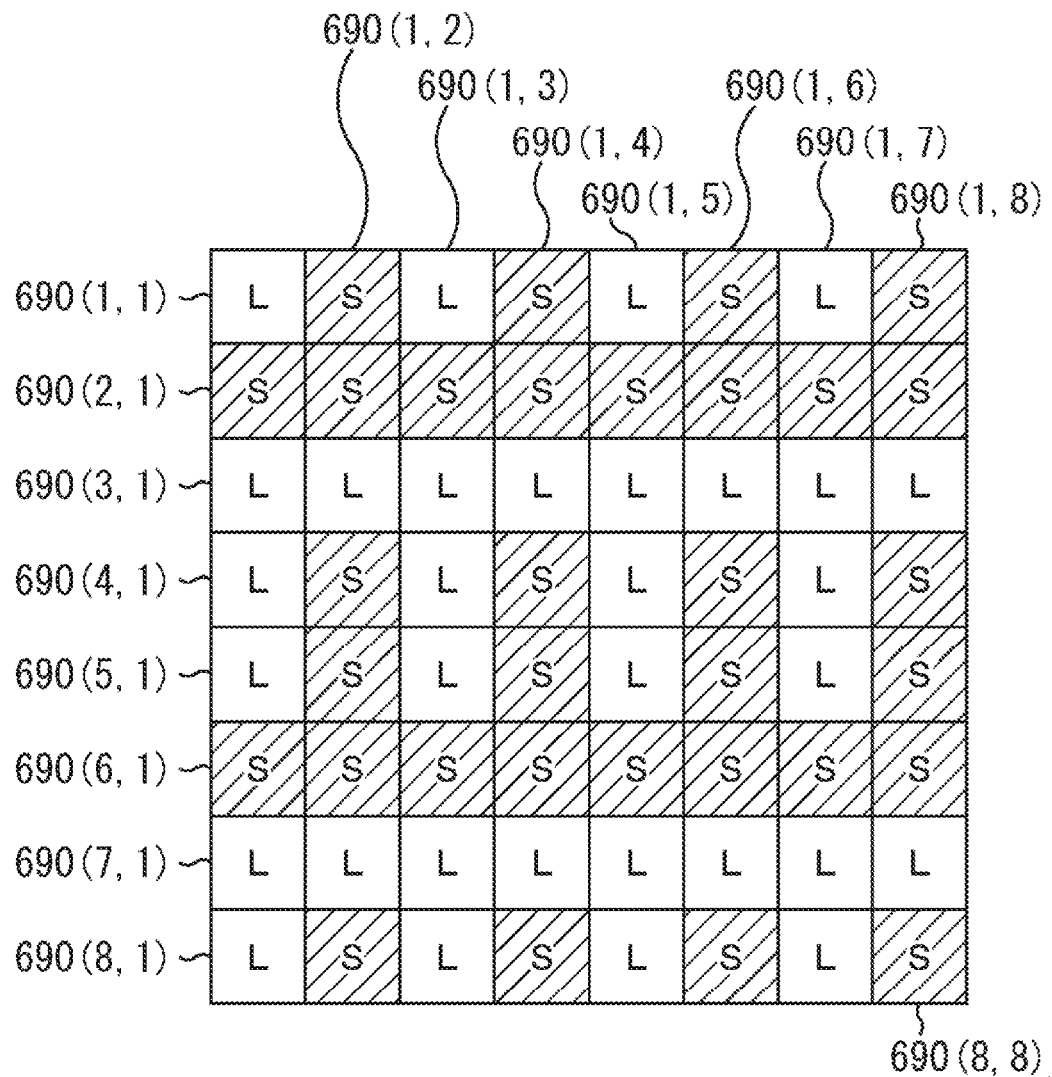
FIG. 40 A diagram showing an example of an exposure control pattern of an applicable image pickup device.

FIG. 40 is a diagram showing another example of the exposure pattern. In the first row in the exposure pattern shown in FIG. 40, the L pixel 690 (1, 1), the S pixel 690 (1, 2), the L pixel 690 (1, 3), the S pixel 690 (1, 4), the L pixel 690 (1, 5), the S pixel 690 (1, 6), the L pixel 690 (1, 7), and the S pixel 690 (1, 8) are arranged.

In the second row, the pixels are all S pixels. In the third row, the pixels are all L pixels. In the fourth row, the L pixel 690 (4, 1), the S pixel 690 (4, 2), the L pixel 690 (4, 3), the S pixel 690 (4, 4), the L pixel 690 (4, 5), the S pixel 690 (4, 6), the L pixel 690 (4, 7), and the S pixel 690 (4, 8) are arranged as in the first row.

The fifth to eighth rows have the same arrangements as the first to fourth rows. The present technique is also applicable to such an exposure pattern.

It should be noted that although the case where the spectral sensitivities of the pixels in the image pickup device are RGB+W has been exemplified in the embodiments described above, the types of spectral sensitivities are not to be limited in applying the present technique. In other words, pixels having spectral sensitivities other than RGB+W may be used. For example, a combination of 4 rows in which G is added to complementary colors such as Y (yellow), C (cyan), and M (magenta) may be used.

It should be noted that the embodiment of the present technique is not limited to the embodiments described above and can be variously modified without departing from the gist of the present technique.

The present technique may also take the following structures.

(1) An image pickup device, including
pixels having 4 types of spectral sensitivities, that include pixels having a panchromatic spectral sensitivity and are arranged on an image pickup surface,
pixels that realize a first exposure and pixels that realize a second exposure different from the first exposure being arranged on the image pickup surface with respect to the 4 types of spectral sensitivities.

(2) The image pickup device according to (1) above,
in which a first line in which first pixels having the panchromatic spectral sensitivity are arranged in a two-pixel cycle in a specific direction and a second line in which the first pixels are arranged while deviating by one pixel from the first line in the specific direction are arranged alternately in a direction orthogonal to the specific direction, and
in which pixels having spectral sensitivities different from the spectral sensitivity of the first pixels are arranged in a 2- or 4-pixel cycle in the specific direction for each of the spectral sensitivities and 2-dimensionally constitute a cyclic arrangement of 4×4 pixels in which the first spectral sensitivity pixels are arranged in a checkerboard arrangement.

(3) The image pickup device according to (2) above, further including
three pixel transfer control signal lines per line, each pixel transfer control signal line being used for controlling an exposure start timing and end timing of a plurality of pixels constituting the 1 line in the specific direction,
in which:
a first pixel transfer control signal line out of the pixel transfer control signal lines in the first line transmits a transfer control signal to the pixels that are arranged in the 2-pixel cycle in the first line and have the same spectral sensitivity;
a second pixel transfer control signal line out of the pixel transfer control signal lines in the first line transmits a transfer control signal to the pixels that are arranged in the 4-pixel cycle in the first line and have the same spectral sensitivity;
a third pixel transfer control signal line out of the pixel transfer control signal lines in the first line transmits a transfer control signal to the pixels that are arranged in the 4-pixel cycle in the first line and have the same spectral sensitivity;

the first pixel transfer control signal line out of the pixel transfer control signal lines in the second line transmits a transfer control signal to the pixels that are arranged in the 2-pixel cycle in the second line and have the same spectral sensitivity;
the second pixel transfer control signal line out of the pixel transfer control signal lines in the second line transmits a transfer control signal to the pixels that are arranged in the 4-pixel cycle in the second line and have the same spectral sensitivity;
the third pixel transfer control signal line out of the pixel transfer control signal lines in the second line transmits a transfer control signal to the pixels that are arranged in the 4-pixel cycle in the second line and have the same spectral sensitivity; and
each of the pixel transfer control signal lines transmits a pixel transfer control signal at a first timing to realize the first exposure or a second timing to realize the second exposure.

(4) The image pickup device according to (3) above, in which:
one A/D converter is shared by two adjacent pixels in the specific direction; and
exposure timings of the two adjacent pixels are shifted using at least two of the pixel transfer control signal lines.

(5) The image pickup device according to any one of (1) to (4) above,
in which one floating diffusion is shared by a pixel group constituted of a plurality of pixels.

(6) The image pickup device according to (3) above, in which:
the cyclic arrangement of 4×4 pixels includes the first line in which the first pixels and second pixels having a second spectral sensitivity are arranged alternately in the specific direction and the second line in which the first pixels are arranged in the 2-pixel cycle and third pixels having a third spectral sensitivity and fourth pixels having a fourth spectral sensitivity are arranged in the 4-pixel cycle at remaining pixel positions in the specific direction, the first line and the second line being arranged alternately in a direction orthogonal to the specific direction.

(7) The image pickup device according to (6) above, in which:
the first pixel transfer control signal line of the first line and the first pixel transfer control signal line of the second line are controlled to transmit control signals at different timings;
the second pixel transfer control signal line and the third pixel transfer control signal line of the first line are controlled to transmit control signals at different timings;
the second pixel transfer control signal line of the second line and the pixel transfer control signal line with respect to the third pixels in a fourth line are controlled to transmit control signals at different timings; and
the pixel transfer control signal line with respect to the fourth pixels in the second line and the pixel transfer control signal line with respect to the fourth pixels in the fourth line are controlled to transmit control signals at different timings.

(8) The image pickup device according to any one of (1) to (7) above, further including, at each pixel position:
a first processing section that calculates an interpolation value of signals for the first exposure of the first spectral sensitivity at the pixel position;
a second processing section that calculates an interpolation value of signals for the second exposure of the first spectral sensitivity at the pixel position;

a third processing section that calculates an interpolation value of signals for the first exposure of the second spectral sensitivity at the pixel position;

a fourth processing section that calculates an interpolation value of signals for the second exposure of the second spectral sensitivity at the pixel position;

a fifth processing section that calculates an interpolation value of signals for the first exposure of a third spectral sensitivity at the pixel position;

a sixth processing section that calculates an interpolation value of signals for the second exposure of the third spectral sensitivity at the pixel position;

a seventh processing section that calculates an interpolation value of signals for the first exposure of a fourth spectral sensitivity at the pixel position; and an eighth processing section that calculates an interpolation value of signals for the second exposure of the fourth spectral sensitivity at the pixel position.

(9) The image pickup device according to (8) above, further including a ninth processing section that calculates, from the interpolation values of the signals for the first exposure or the second exposure of the first to fourth spectral sensitivities at the pixel position, that have been calculated by the first to eighth processing sections, a combined interpolation value of the second spectral sensitivity, the third spectral sensitivity, and the fourth spectral sensitivity.

(10) The image pickup device according to (9) above, further including a conversion section that converts the interpolation value output from the ninth processing section into a Bayer arrangement.

(11) The image pickup device according to (9) above, in which the ninth processing section includes processing of converting signals read out from the pixels into a nonlinear gradation.

(12) The image pickup device according to (11) above, in which the processing of converting signals into a nonlinear gradation includes processing of converting signals based on upwardly-convex power function characteristic.

(13) The image pickup device according to (11) above, in which the processing of converting signals into a nonlinear gradation includes processing of converting signals based on logarithm gradation characteristics.

(14) The image pickup device according to (9) above, further including:

a logarithm conversion processing section that logarithmically converts signals from the pixels arranged on the image pickup surface; and a logarithm reverse conversion processing section that logarithmically reverse-converts the interpolation value output from the ninth processing section, in which the first to eighth processing sections carry out the processing using values obtained by the conversion of the logarithm conversion processing section.

(15) The image pickup device according to (10) above, further including:

a logarithm conversion processing section that logarithmically converts signals from the pixels arranged on the image pickup surface; and a logarithm reverse conversion processing section that logarithmically reverse-converts the interpolation value output from the conversion section, in which the first to eighth processing sections carry out the processing using values obtained by the conversion of the logarithm conversion processing section.

(16) An image pickup method for an image pickup device including pixels having 4 types of spectral sensitivities, that include pixels having a panchromatic spectral sensitivity and are arranged on an image pickup surface, pixels that realize a first exposure and pixels that realize a second exposure different from the first exposure being arranged on the image pickup surface with respect to the 4 types of spectral sensitivities, a first line in which first pixels having the panchromatic spectral sensitivity are arranged in a two-pixel cycle in a specific direction and a second line in which the first pixels are arranged while deviating by one pixel from the first line in the specific direction being arranged alternately in a direction orthogonal to the specific direction, and pixels having spectral sensitivities different from the spectral sensitivity of the first pixels being arranged in a 2- or 4-pixel cycle in the specific direction for each of the spectral sensitivities and 2-dimensionally constituting a cyclic arrangement of 4×4 pixels in which the first spectral sensitivity pixels are arranged in a checkerboard arrangement, the method including the step of transmitting, to three pixel transfer control signal lines provided per line, each pixel transfer control signal line being used for controlling an exposure start timing and end timing of a plurality of pixels constituting the 1 line in the specific direction, a pixel transfer control signal at a first timing to realize the first exposure or a second timing to realize the second exposure.

(17) A program that causes a computer to control an image pickup device including pixels having 4 types of spectral sensitivities, that include pixels having a panchromatic spectral sensitivity and are arranged on an image pickup surface, pixels that realize a first exposure and pixels that realize a second exposure different from the first exposure being arranged on the image pickup surface with respect to the 4 types of spectral sensitivities, a first line in which first pixels having the panchromatic spectral sensitivity are arranged in a two-pixel cycle in a specific direction and a second line in which the first pixels are arranged while deviating by one pixel from the first line in the specific direction being arranged alternately in a direction orthogonal to the specific direction, and pixels having spectral sensitivities different from the spectral sensitivity of the first pixels being arranged in a 2- or 4-pixel cycle in the specific direction for each of the spectral sensitivities and 2-dimensionally constituting a cyclic arrangement of 4×4 pixels in which the first spectral sensitivity pixels are arranged in a checkerboard arrangement, the program including processing including the step of transmitting, to three pixel transfer control signal lines provided per line, each pixel transfer control signal line being used for controlling an exposure start timing and end timing of a plurality of pixels constituting the 1 line in the specific direction, a pixel transfer control signal at a first timing to realize the first exposure or a second timing to realize the second exposure.

DESCRIPTION OF SYMBOLS 20 pixel
21-24 pixel transfer control signal line
300 image pickup apparatus
310 image pickup device
311 image processing section 312 recording control section
313 content storage section
314 display control section
315 display section
316 control section
317 operation reception section
351 WL high-frequency interpolation section
352 WS high-frequency interpolation section
353 WL low-frequency interpolation section
354 WS low-frequency interpolation section
355 GL low-frequency interpolation section
356 GS low-frequency interpolation section
357 RL low-frequency interpolation section
358 RS low-frequency interpolation section
359 BL low-frequency interpolation section
360 BS low-frequency interpolation section
361 W high-frequency HDR combination section
362 W low-frequency HDR combination section
363 G low-frequency HDR combination section
364 R low-frequency HDR combination section
365 B low-frequency HDR combination section
366 W-GCh correlation processing section
367 W-RCh correlation processing section
368 W-BCh correlation processing section

The invention claimed is:
1. An image pickup device, comprising
a plurality of pixels arranged according to a predetermined pattern comprising:

| WL | XL | WL | XS |
|----|----|----|----|
| XL | WS | XL | WS |
| WL | XS | WL | XL |
| XS | WS | XS | WS | wherein WL indicates a pixel configured to output a pixel signal according to incident white light by a long exposure,
wherein WS indicates a pixel configured to output a pixel signal according to incident white light by a short exposure,
wherein XL indicates a pixel configured to output a pixel signal according to incident one of (i) red light, (ii) blue light or (iii) green light by a long exposure,
wherein XS indicates a pixel configured to output a pixel signal according to incident one of (i) red light, (ii) blue light or (iii) green light by a short exposure.

2. The image pickup device according to claim 1, wherein one A/D converter is shared by two adjacent pixels.

3. The image pickup device according to claim 1, wherein one floating diffusion is shared by two adjacent pixels.

4. The image pickup device according to claim 2, wherein the one A/D converter is shared by two adjacent pixels in a specific direction.

5. The image device according to claim 4, wherein exposure timings of the two adjacent pixels are shifted using at least two pixel control signal lines.

6. An image pickup device, comprising
a plurality of pixels arranged according to a predetermined pattern comprising:

| WL | XL | WL | XL |
|----|----|----|----|
| XL | WS | XL | WS |
| WL | XS | WL | XS |
| XS | WS | XS | WS | wherein WL indicates a pixel configured to output a pixel signal according to incident white light by a long exposure,
wherein WS indicates a pixel configured to output a pixel signal according to incident white light by a short exposure,
wherein XL indicates a pixel configured to output a pixel signal according to incident one of (i) red light, (ii) blue light or (iii) green light by a long exposure,
wherein XS indicates a pixel configured to output a pixel signal according to incident one of (i) red light, (ii) blue light or (iii) green light by a short exposure.

7. The image pickup device according to claim 6, wherein one A/D converter is shared by two adjacent pixels.

8. The image pickup device according to claim 6, wherein one floating diffusion is shared by two adjacent pixels.

9. The image pickup device according to claim 7, wherein the one A/D converter is shared by two adjacent pixels in a specific direction.

10. The image device according to claim 9, wherein exposure timings of the two adjacent pixels are shifted using at least two pixel control signal lines.

11. An image pickup device, comprising
a plurality of pixels arranged according to a predetermined pattern comprising:

| WL | XL | WL | XL |
|----|----|----|----|
| XL | WS | XS | WS |
| WL | XS | WL | XS |
| XL | WS | XS | WS | wherein WL indicates a pixel configured to output a pixel signal according to incident white light by a long exposure,
wherein WS indicates a pixel configured to output a pixel signal according to incident white light by a short exposure,
wherein XL indicates a pixel configured to output a pixel signal according to incident one of (i) red light, (ii) blue light or (iii) green light by a long exposure,
wherein XS indicates a pixel configured to output a pixel signal according to incident one of (i) red light, (ii) blue light or (iii) green light by a short exposure.

12. The image pickup device according to claim 11, wherein one A/D converter is shared by two adjacent pixels.

13. The image pickup device according to claim 11, wherein one floating diffusion is shared by two adjacent pixels.

14. The image pickup device according to claim 12, wherein the one A/D converter is shared by two adjacent pixels in a specific direction.

15. The image device according to claim 14, wherein exposure timings of the two adjacent pixels are shifted using at least two pixel control signal lines.

* * * * *